United States Patent
Kamiya et al.

[11] Patent Number: 5,311,354
[45] Date of Patent: May 10, 1994

[54] TELESCOPE

[75] Inventors: Makoto Kamiya; Haruyuki Nagano; Katsuhito Akagi; Masatoshi Yoneyama; Yoshiharu Ohta, all of Sakai, Japan

[73] Assignee: Minolta Camera Kabushiki Kaisha, Osaka, Japan

[21] Appl. No.: 737,399

[22] Filed: Jul. 29, 1991

[30] Foreign Application Priority Data

| Jul. 30, 1990 | [JP] | Japan | 2-202754 |
| Jul. 30, 1990 | [JP] | Japan | 2-202755 |
| Jul. 30, 1990 | [JP] | Japan | 2-202756 |
| Sep. 3, 1990 | [JP] | Japan | 2-234096 |
| Sep. 5, 1990 | [JP] | Japan | 2-236484 |
| Sep. 10, 1990 | [JP] | Japan | 2-240431 |
| Sep. 11, 1990 | [JP] | Japan | 2-241829 |

[51] Int. Cl.$^5$ .............. G02B 23/00; G01J 1/20
[52] U.S. Cl. .................. 359/426; 359/399; 359/407; 359/425; 250/201.2; 250/201.8
[58] Field of Search ............ 359/696–698, 359/705, 399–421, 425, 426, 694–698, 705; 250/201.2, 201.8; 354/400–409, 195.1–195.13

[56] References Cited

U.S. PATENT DOCUMENTS

| 4,262,988 | 4/1981 | Ishibai et al. | 359/418 |
| 4,284,325 | 8/1981 | Ishibai et al. | 359/417 |
| 4,470,683 | 9/1984 | Nakajima | 354/406 |
| 4,557,577 | 12/1985 | Shinoda | 354/400 |
| 4,650,297 | 3/1987 | Ishibai | 359/418 |
| 4,816,856 | 3/1989 | Hamada et al. | 354/402 |
| 4,870,439 | 9/1989 | Tsuboi et al. | 359/697 |
| 4,967,224 | 10/1990 | Hamada et al. | 250/201.2 |
| 4,998,124 | 3/1991 | Ishida et al. | 354/402 |
| 5,005,040 | 4/1991 | Norita et al. | 354/402 |
| 5,053,800 | 10/1991 | Ishida et al. | 354/402 |

FOREIGN PATENT DOCUMENTS 59-226309 12/1984 Japan .
1-1252910 10/1989 Japan .

Primary Examiner—Bruce Y. Arnold
Assistant Examiner—Thong Nguyen
Attorney, Agent, or Firm—Price, Gess & Ubell

[57] ABSTRACT

In a telescope according to the present invention, defocus amount of an optical system constituting the telescope is calculated; whether or not the defocus amount is within a predetermined in-focus range obtained from a focal point adjusting ability of human eye is discriminated; and when the defocus amount exceeds the in-focus range as a result of the above discrimination, the optical system is driven. The optical system is driven in a shorter time than a time required for removing a defocus by human eye.

31 Claims, 39 Drawing Sheets

Excitation Sequence (Two-Phase Excitation)

One-Phase Excitation Method

One-Phase/Two-Phase Excitation Method

Fig. 24
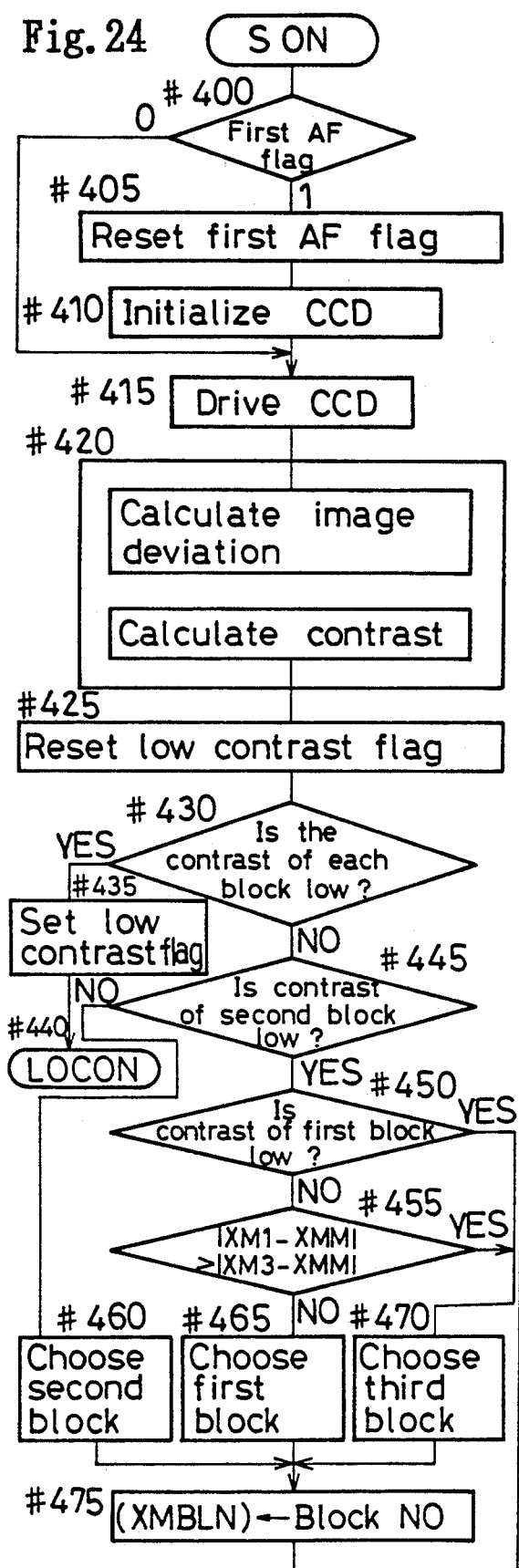
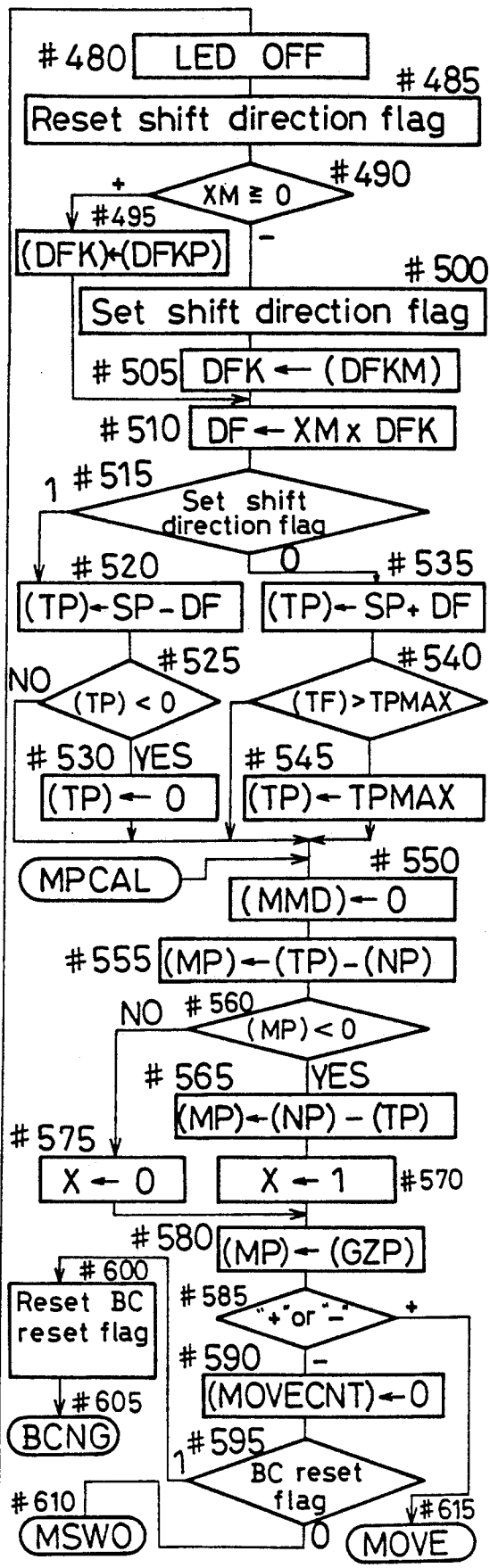

Fig. 25
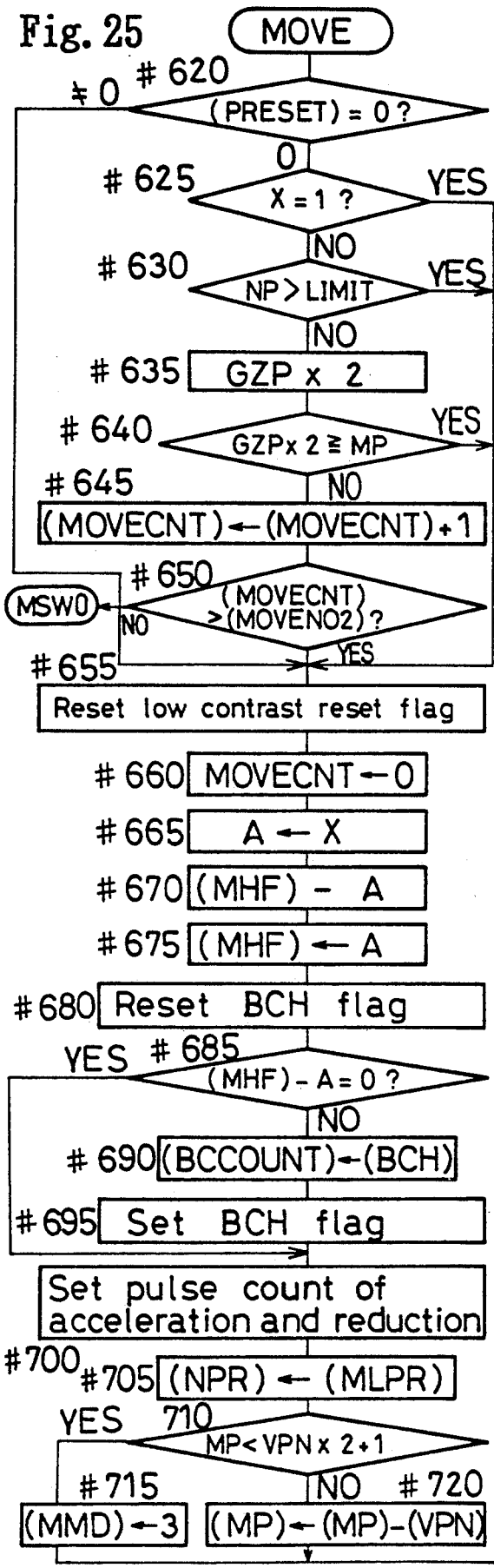
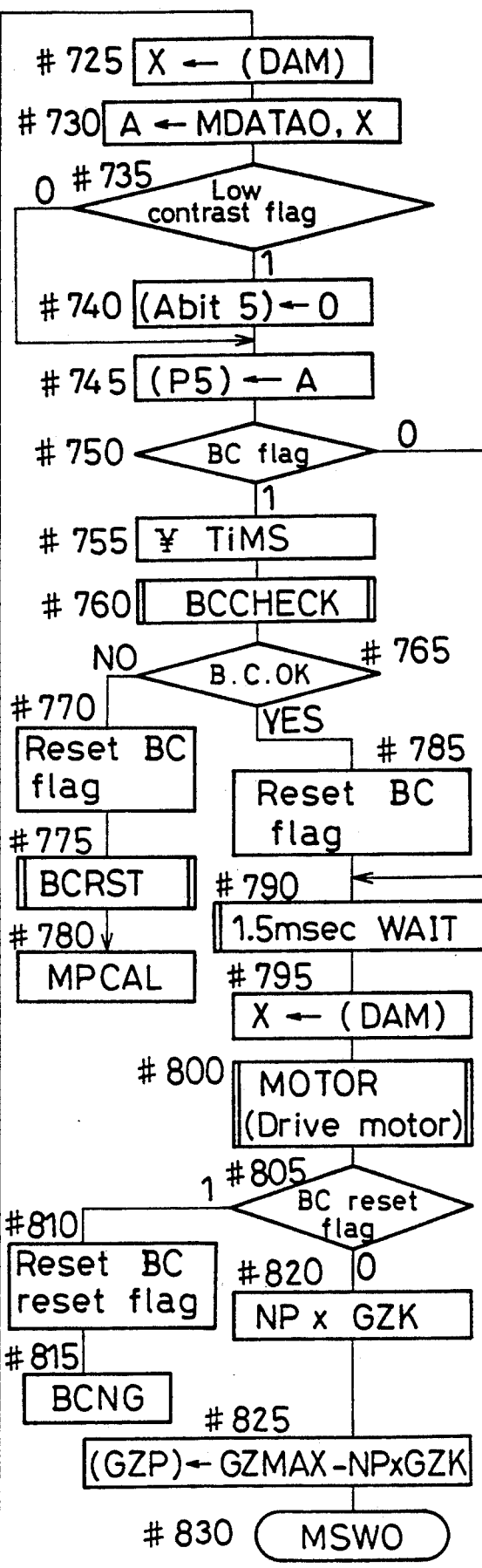

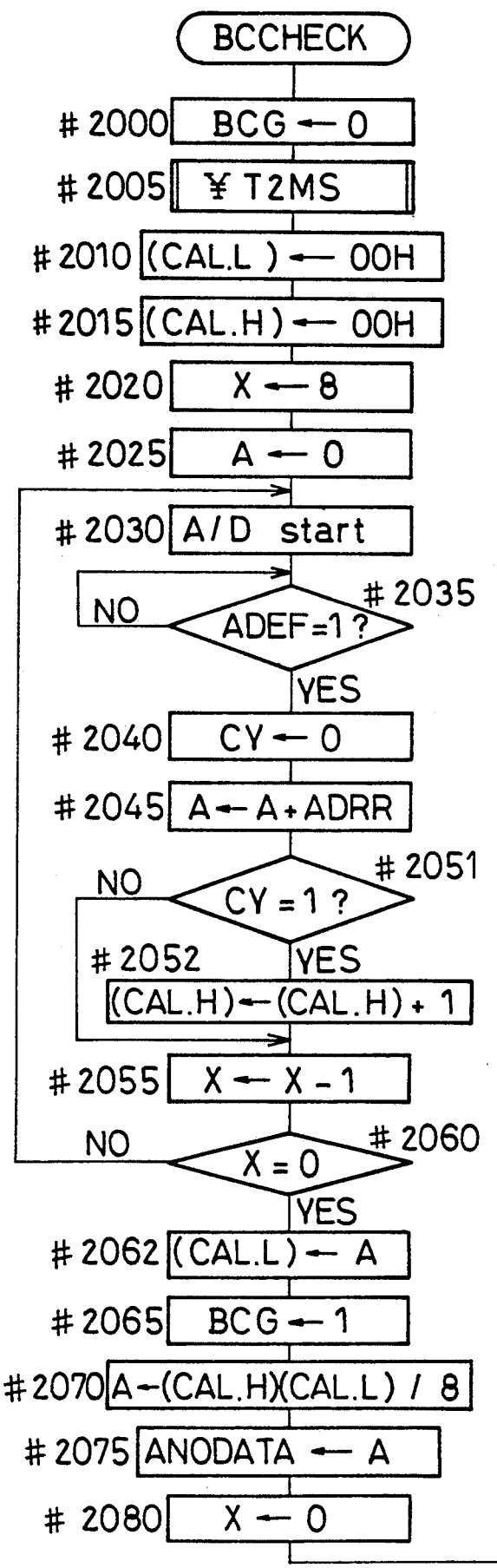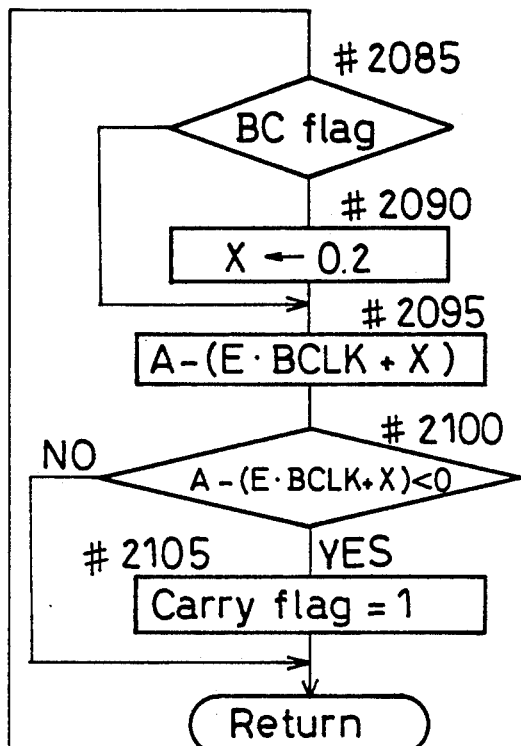
Fig. 27

SP : a pulse count of a reference position    constant (4m position)

DF : a shift pulse count    DF = XM × DFK

TP : a pulse count of a target position    TP = SP ± DF

NP : a pulse count of the present position

MP : a drive pulse count    MP = |TP−NP|
   TP obtained in the last operation

TPMAX : a pulse count of a nearest position
   constant (2m position)

Fig. 44A
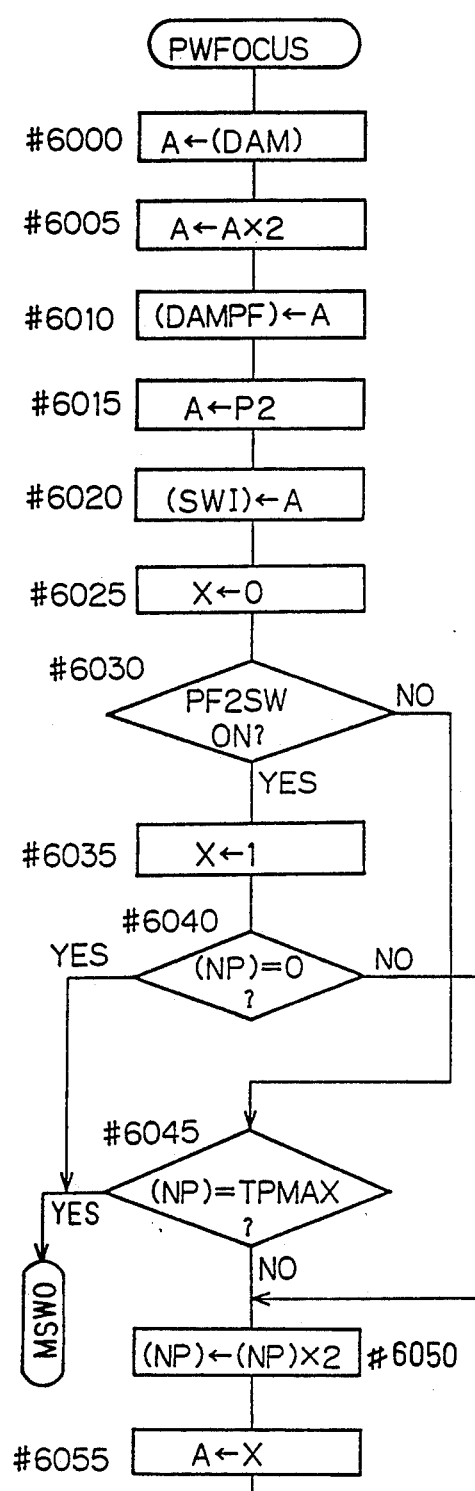
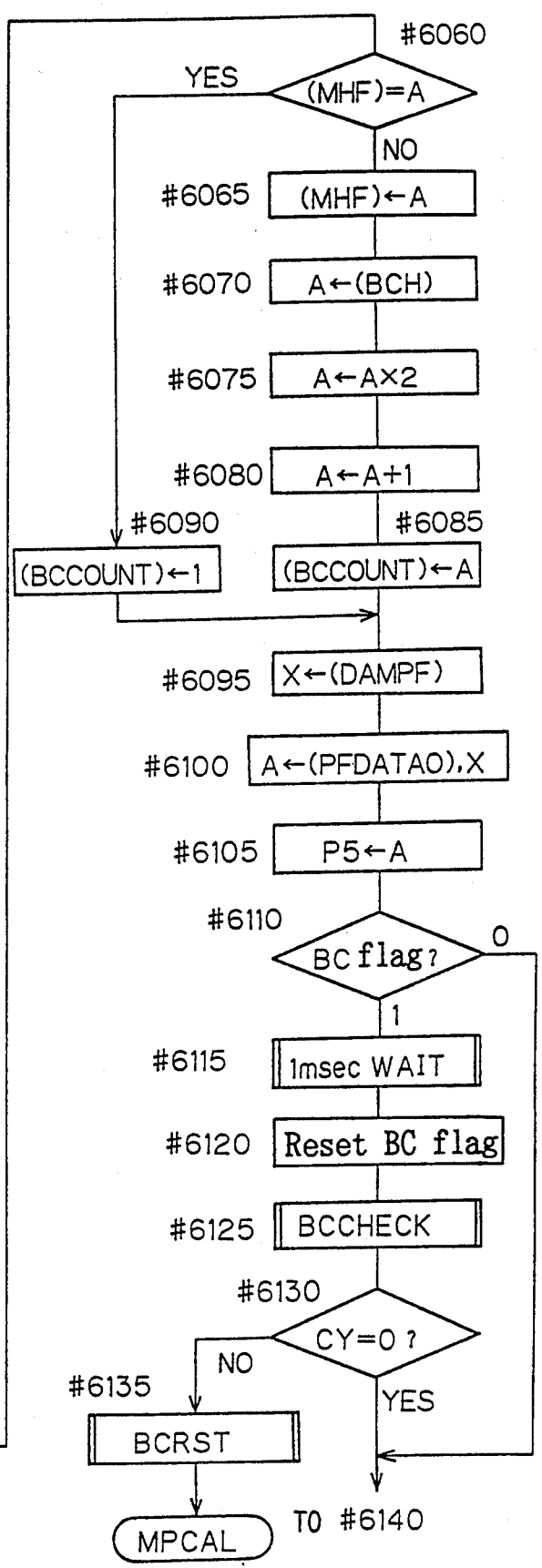

from #6130

Fig. 45

(a) Two-phase excitation driving data

| address | 0 | 1 | 2 | 3 |
|---|---|---|---|---|
| φ1 | 0 | 1 | 1 | 0 |
| φ2 | 0 | 0 | 1 | 1 |
| φ3 | 1 | 0 | 0 | 1 |
| φ4 | 1 | 1 | 0 | 0 |

(b) One/Two-phase excitation driving data

| address | 0 | 1 | 2 | 3 | 4 | 5 | 6 | 7 |
|---|---|---|---|---|---|---|---|---|
| φ1 | 0 | 1 | 1 | 1 | 1 | 1 | 0 | 0 |
| φ2 | 0 | 0 | 0 | 1 | 1 | 1 | 1 | 1 |
| φ3 | 1 | 1 | 0 | 0 | 0 | 1 | 1 | 1 |
| φ4 | 1 | 1 | 1 | 1 | 0 | 0 | 0 | 1 |

⟵ MHF=1
⟶ MHF=0

TELESCOPE

BACKGROUND OF THE INVENTION

1. Field of the Invention

The present invention relates to a telescope or a binocular, and more specifically to a telescope having an automatic focusing function.

2. Description of the Prior Arts

Japanese published Patent Application No. S62-6205, Japanese published Patent Application No. S60-46407 and Japanese laid-open Patent Application No. S56-154705 disclose binoculars having the automatic focusing function.

In performing an automatic focusing in a telescope, it is considered to employ the TTL (through the lens) method which is frequently employed for cameras as a distance measuring method or a focus detecting method. In a binocular, however, since the aperture of a lens is generally small, if a light beam received through a principal optical system is used for a distance measurement or a focus detection, an object and the background become dark. Therefore, an external light method is preferable to the TTL method as the distance measuring method. Further, since a binocular is generally used for viewing a distant object, it is not desirable that a binocular emits a light beam for a distance measurement toward an object. Therefore, a passive method should be employed where simply a light beam originating from an object is received.

An article on "Olympus IZM300" is described on and after page 81 of a magazine "Camera Industry" (No. 6, 1988). The article, which is on a camera, shows a distance measuring method according to an external light passive method where a distance measuring lens is fixed. The driving source of the distance measuring lens employed therein is a direct current motor (hereinafter referred to as DC motor), and operations such as accelerating, racing and braking, etc. for controlling the DC motor with a high precision are performed while an actual lens driving position is being detected.

However, when the DC motor is employed as a driving source of the distance measuring lens, a feedback mechanism such as an encoder, etc. for detecting a lens position and returning it to the DC motor is required. Consequently, a circuit and software with resect to the feedback mechanism are required, whereby the cost increases and it becomes difficult to make a telescope compact. Further, since a telescope such as a binocular, etc. is frequently used for following and viewing an object, a continuous automatic focusing is preferable. In the DC motor, however, errors are easily accumulated when the lens is moved in both directions. Therefore, the DC motor is not appropriate for the continuous automatic focusing.

Further, in the binoculars according to the above-mentioned prior arts, the automatic focusing mechanism similarly works both to a distant object and to a close object. Therefore, for example, when a close object comes into the visual field of a binocular under a condition where the binocular is in focus on a distant object, the binocular tends to be focused on the close object.

However, when some obstacle (such as a person, a car, an animal, etc.) passes between the object and the user while a relatively distant object is being viewed (since a binocular is generally used for viewing a distance object, there is a high possibility that an obstacle passes as described above), if the automatic focusing mechanism works so that the binocular is focused on the obstacle, the binocular would be greatly inconvenient.

Further, in the binoculars according to the above-mentioned prior arts, a motor is employed as a driving source for driving a focusing lens, and a battery is mounted as the power source of the motor.

Since the motor cannot work at a supply voltage lower than a predetermined voltage, there is a possibility that the motor stops at an undesirable point in an automatic focusing operation. In this case, since the lens cannot be moved to a desirable position in a binocular which does not have a manual focusing function, there are frequent occasions when the binocular cannot work as binocular according to a position where the lens stops (especially, a near focusing position).

Further, in Japanese published Patent Application No. S62-6205 and Japanese published Patent Application No. S60-46407, a focusing speed is not recited.

If a focusing speed is too low, not only a chance to view an object is lost, but also the eye becomes fatigued since human eye's own focusing function works. That is, in trying to carefully view an object, human eye tries to obtain an in-focus condition by changing a curvature of its crystalline lens within a limited range (different according to visual acuity and ages). The adjusting ability of human eye largely depends on ages as shown in FIG. 38 (FIG. 38 corresponds to FIG. 104 on page 56 of "Science of the Eye" by Masao Nita, second edition of the revision, published by Bunkoudou Ltd.). Although it is more than 10 diopters at the age of approximately 10, gradually decreased by the aging, it becomes approximately 1 diopter at the age of 60 or thereabout. Therefore, human eye which has the adjusting power tries hard to adjust the focus, and human eye which does not have the adjusting power tries even harder to adjust the focus. In either case, it would be a great strain for the eye.

Therefore, in a binocular where although the automatic focusing function is provided, the focusing function by human eye works before the automatic focusing function works, stress (tension) builds up on the eye, and such a binocular is not preferable especially in viewing for a long time period, since strain of the eye accumulates.

Further, in Japanese published Patent Application No. S62-6205 and Japanese published Patent Application No. S60-46407, an in-focus range is not specifically described.

For example, since the continuous automatic focusing is appropriate for, for example, viewing a moving object with a binocular having the automatic focusing function, a binocular is usually provided with the continuous automatic focusing function. However, since a binocular has a long focal length, a binocular shake is easily caused in a continuous automatic focusing operation, so that a measured distance is apt to vary widely by the binocular shake. Moreover, there are occasions when a variation in measured distance is caused by a noise, etc. to a circuit. When there is a variation in measured distance, a so called hunting phenomenon is caused in a lens driving operation. Therefore, some binoculars have a relatively large in-focus range in order to reduce the variation in measured distance.

Moreover, the farther away an object is situated, the lower its contrast becomes, which causes errors in measuring a distance. Therefore, it is desirable that the in-focus range is varied according to an object distance and that the in-focus range is large when an object is situated far away.

When the in-focus range is large, however, since the lens is not moved when the in-focus condition is not actually obtained due to a movement of an object, the view through the binocular is more or less out of focus, or since the eye is forced to adjust the focus, the eye becomes fatigued. And, when the in-focus position is situated at an end of the in-focus range, the above problems are especially conspicuous. Moreover, for the elderly, although an automatic focusing operation is performed, the view through the binocular is inevitably out of focus.

Further, Japanese published Patent Application No. S62-6205 and Japanese published Patent Application No. S60-46407 do not disclose binoculars having the automatic focusing function and a manual power focusing function. On the other hand, in the art of a camera, it is generally known to provide an automatic focusing function and power focusing function. In some cameras, a selection of these functions is made by a mode changing switch.

Generally, the automatic focusing function is not effective for all objects since it does not work effectively on some objects. For example, objects having no contrast or reflecting would not be suitable for the automatic focusing. Therefore, in order to view such objects under an excellent focusing condition, it is desirable to provide a binocular with the power focusing function.

Although it is considered that the frequency of use of the power focusing function is fairly lower than that of the automatic focusing function, operation members for the power focusing function are arranged at a place convenient for operating them since an excellent operationability is required for them. However, if the operation members for the manual power focusing function are provided at a place convenient for operating them, a possibility increases that an undesirable interruption is applied during an automatic focusing operation by operating the members by mistake. On the other hand, to employ a changing switch like in the cameras of the above-mentioned prior arts is inconvenient in another sense (that is, in a sense that the number of operations increases).

SUMMARY OF THE INVENTION

An object of the present invention is to provide a telescope where continuous automatic focusing is effectively realized while a low cost and required compactness are maintained.

Another object of the present invention is to provide a telescope where even if an obstacle passes between an object and the user while a distant object is being viewed, the automatic focusing function does not work so as to adjust the focus on the obstacle by mistake.

A further object of the present invention is to provide a telescope where the lens is fixed at a desirable position under a condition where supply voltage is too low to drive the motor (that is, move the lens).

An even further object of the present invention is to provide a telescope devised so as not to give stress to the eye.

An even further object of the present invention is to provide a telescope having a function to restrain a variation in measured distance as much as possible and where a desirable focusing condition is realized.

An even further object of the present invention is to provide a telescope where the operations of the automatic focusing function and those of the manual focusing function are rationally arranged without deteriorating the operationability of the operation members for the manual power focusing.

To achieve the above-described objects, the present invention provides a telescope comprising: calculation means for calculating a defocus amount of an optical system constituting the telescope; discriminating means for discriminating whether or not the defocus amount is within a predetermined in-focus range obtained from a focal point adjusting ability of human eye; and optical system driving means for driving the optical system to an in-focus position when the defocus amount exceeds the in-focus range as a result of the discrimination by the discriminating means.

The present invention further provides a telescope comprising: defocus amount calculating means for calculating a defocus amount of an optical system constituting the telescope; optical system driving amount calculating means for calculating a driving amount, of the optical system, to an in-focus position based on a defocus amount calculated by the defocus amount calculating means; and optical system driving means for driving the optical system by a driving amount calculated by said optical system driving amount calculating means in a shorter time than a time required for removing said defocus by human eye.

The present invention further provides a telescope comprising: a viewing optical system constituting the telescope; focal point detecting means for generating an electrical signal corresponding to an image shift amount of an object based on a light beam, coming from the object, received through an optical system for detecting a focal point; optical system driving amount calculating means for calculating a driving amount, of the viewing optical system, to an in-focus position based on an output by the focal point detecting means; and optical system driving means comprising a stepping motor for driving the viewing optical system based on an output by the optical system driving amount calculating means.

The present invention further provides a telescope comprising: focal point detecting means for detecting a focal point condition of an optical system constituting the telescope; defocus calculating means for calculating a defocus direction and a defocus amount according to a result of a focal point detection; optical system driving means for driving the optical system with an output by the defocus calculating means; and inhibiting means for inhibiting a driving of the optical system when a defocus removing direction is toward the near side and the defocus amount exceeds a predetermined amount.

BRIEF DESCRIPTION OF THE DRAWINGS

These and other objects and features of this invention will become clear from the following description taken in conjunction with the preferred embodiments with reference to the accompanied drawings in which:

FIGS. 23 to 30 are flow charts showing the details of the flow chart shown in FIG. 19;

FIGS. 44A and 44B show flow charts showing a power focusing operation of the embodiment; and FIGS. 45(a) and 45(b) are explanatory views of the operation shown in FIG. 44.

DETAILED DESCRIPTION OF THE PREFERRED EMBODIMENT

Figure 1:
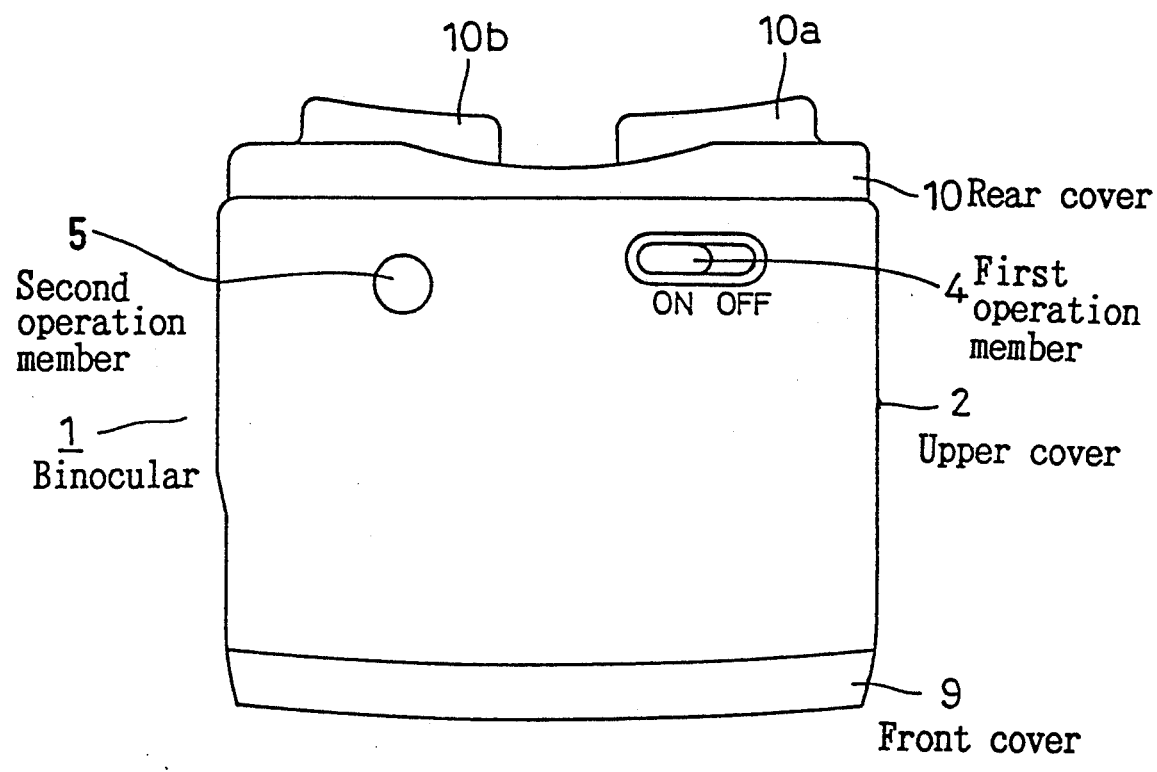
FIG. 1 is a plan view of a binocular as an embodiment of the present invention.

An embodiment of the present invention will hereinafter be described referring to the drawings.

Figure 2:
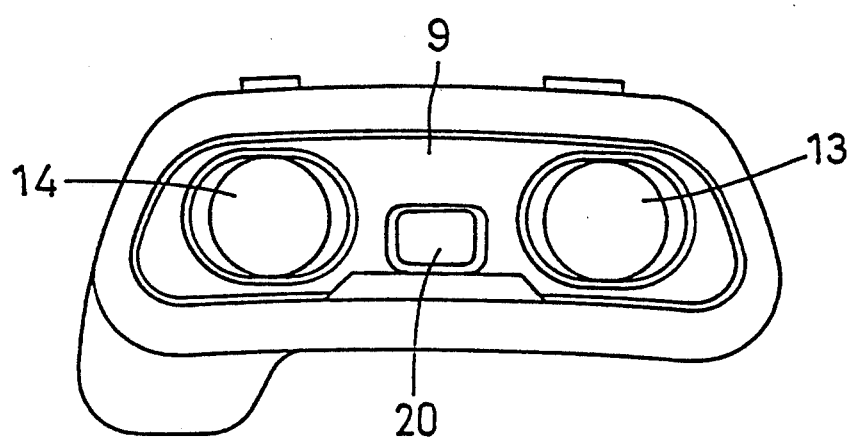
FIG. 2 is a front view of the binocular shown in FIG. 1.
Figure 3:
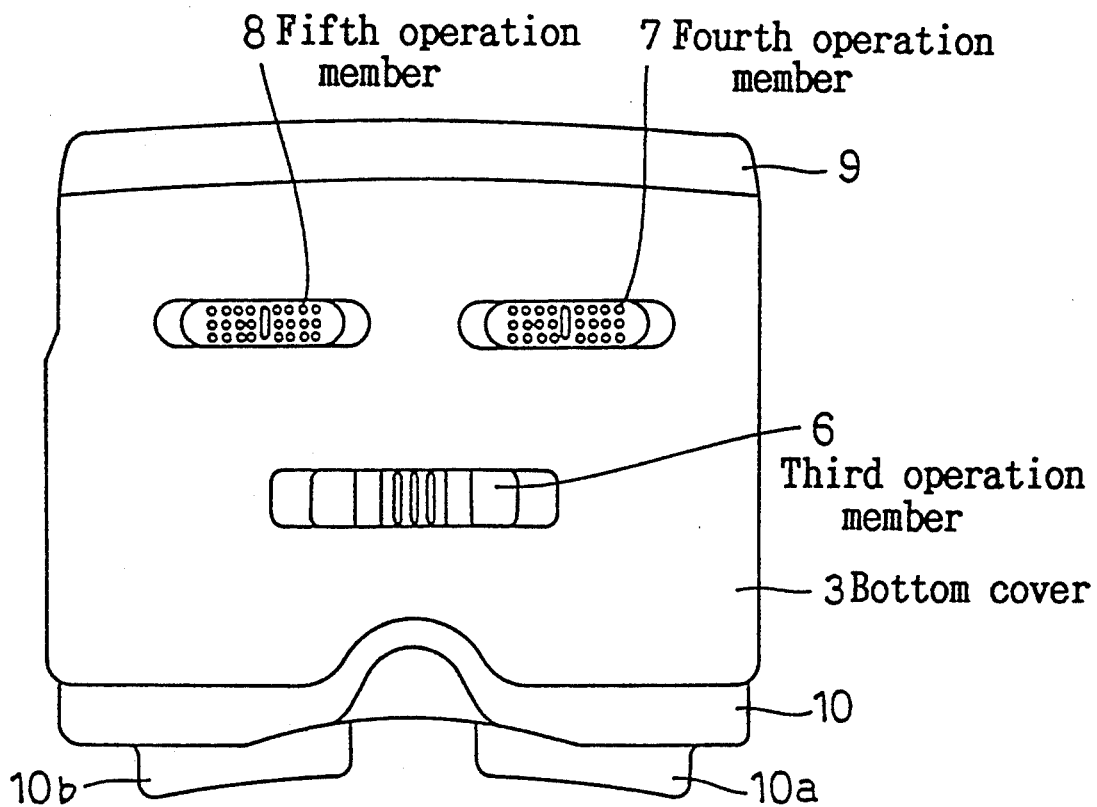
FIG. 3 is a rear view of the binocular shown in FIG. 1.

FIG. 1 is a plan view of a binocular which is an embodiment of the present invention. FIGS. 2 and 3 shows the front and bottom of the binocular, respectively. In the FIGS. 2 and 3 are upper and lower covers, respectively, of a cover constituting a housing of a binocular 1. The upper and lower covers 2 and 3 are made of plastic. On the upper cover 2 are provided a slidable operation member 4 (hereinafter referred to as a first operation member) for a main switch for turning on/off the binocular 1 and a push button operation member 5 (hereinafter referred to as a second operation member) for an automatic focusing (hereinafter referred to as AF) switch. On the lower cover 3 are provided a slidable operation member 6 (hereinafter referred to as a third operation member) for changing a pupil distance and slidable switches 7 and 8 (hereinafter referred to as a fourth and fifth operation members, respectively) for adjusting a dioptric power.

9 is a front cover, and 10 is a rear cover. To the front cover 9 is attached a transparent glass plate, and inside the front cover 9 are arranged a first and second objective lenses 13 and 14 attached to a first and second barrels 11 and 12 (see FIG. 4), respectively, and a light receiving window 20 having a light receiving lens for AF. The light receiving lens is fixed. The above-described optical system for measuring an object distance adopts the external light passive method. That is, a light receiving window and a light receiving lens for measuring and object distance are provided separately from the objective lenses 13 and 14. The length from top to bottom of the light receiving window 20 is determined so that it is shorter than that of the objective lenses 13 and 14. Therefore, the length from top to bottom (thickness) of the binocular 1 is not increased by the attachment of the light receiving window 20. On the rear cover 10 are provided eyepiece hoods 10a and 10b made of rubber.

Figure 4:
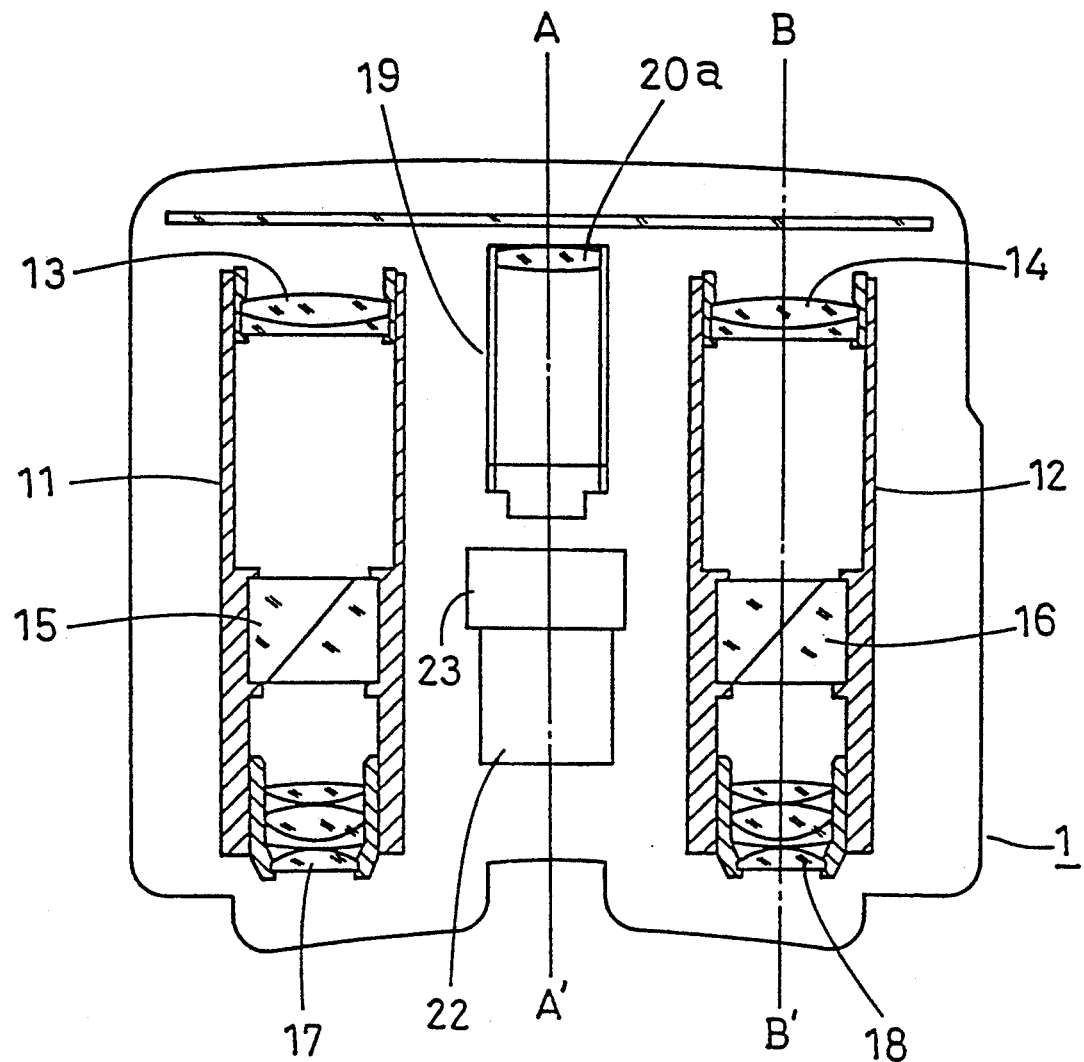
FIG. 4 is a plan view of an optical system and a focusing condition detection module inside the binocular shown in FIG. 1.

An arrangement of an optical system of the binocular 1 having the above-described appearance is shown in FIG. 4. On both sides of an axis of symmetry A—A' are arranged the first and second barrels 11 and 12. And the first and second barrels 11 and 12 are equipped with objective lenses 13 and 14 at the front, prisms 15 and 16 in the middle, and eyepieces 17 and 18 at the rear, respectively.

The objective lenses 13 and 14 simultaneously move inside the barrels 11 and 12 for AF. The eyepieces 17 and 18 separately move inside the barrels 11 and 12, respectively, for dioptric power adjustment. It is also possible to move eyepieces for AF. The distance between the first and second barrels 11 and 12 can be changed for adjusting pupil distance.

Along the axis of symmetry A—' is provided a focusing condition detection module 19. The focusing condition detection module 19 has a light receiving lens 20a fixed at the front. At the rear of the focusing condition detection module 19 is provided a stepping motor 22 for AF, and between the focusing condition detection module 19 and the stepping motor 22 is provided a reduction gear unit 23 for reducing and transmitting a driving force of the stepping motor 22 to the objective lenses 13 and 14. The focusing condition detection module 19 adopts the phase difference detection method shown in FIG. 5, although other methods are also adoptable.

Figure 5:
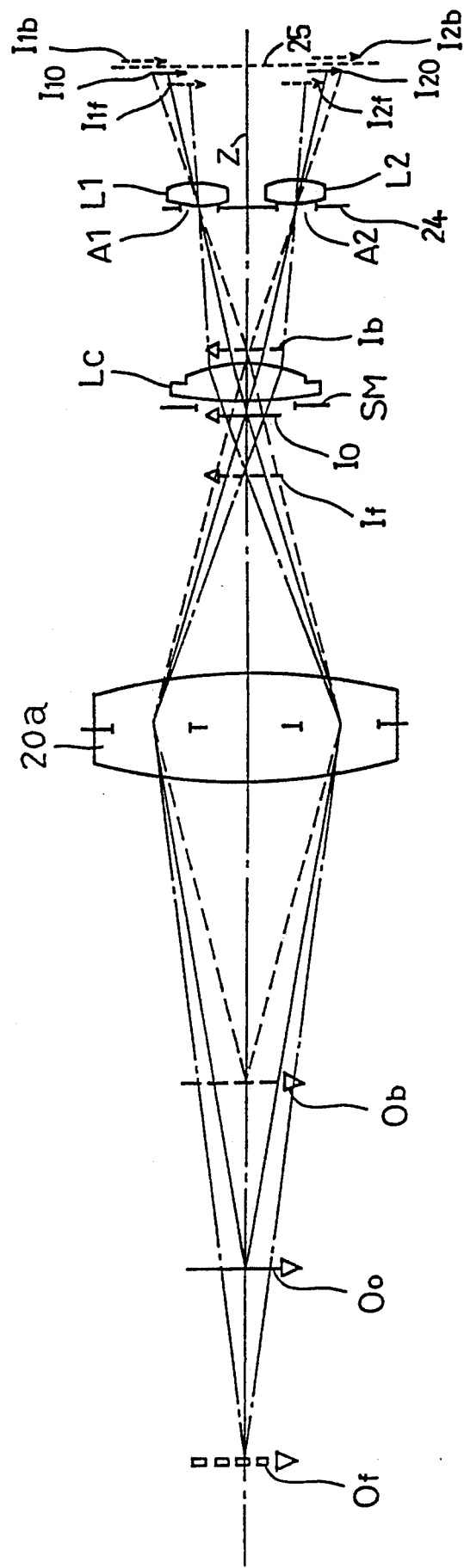
FIG. 5 is a cross-sectional view of an optical system of the focusing condition detection module.

In FIG. 5, a field masked SM and a condenser lens LC are arranged adjacent to a position where an image is formed by the light receiving lens 20a. At the rear of the condenser lens LC are symmetrically arranged image re-forming lenses L1 and L2 on both sides of an optical axis Z. At the front of the image re-forming lenses L1 and L2 are provided a mask plate 24 having apertures A1 and A2. At the focus point of each of the image re-forming lenses L1 and L2 is arranged a CCD (Charge Coupled Device) line sensor 25. The condenser lens LC has the optical power such that images at the apertures A1 and A2 of the mask plate 24 are focused at a predetermined position of the light receiving lens 20a. The diameter of the apertures A1 and A2 is chosen so that only a portion of light from an object passing through the light receiving lens 20a corresponding to a specific aperture value (e.g., F number 5.6) can pass through the apertures A1 and A2.

Images If, Io and Ib on the optical axis are the images of objects Of, Oo and Ob, respectively. Re-formed images of the images If, Io and Ib by the image re-formed lenses L1 and L2 are denoted by I1f, I1o, I1b and I2f, I2o, I2b, respectively. That is, the re-formed images I1o and I2o of the reference image Io of the object Oo situated in the middle are formed slightly in front of the CCD line sensor 25; the re-formed images I1f and I2f of the image If of the object Of situated farthest from the light receiving lens 20a, in front of the re-formed images I1o and I2o and closer to the optical axis Z; and the re-formed images I1b and I2b of the image Ib of the object Ob situated closest to the light receiving lens 20a, behind the re-formed images I1o and I2o and farther from the optical axis Z. A position of an image formed by the light receiving lens 20a corresponds to the distance between a pair of re-formed images of the image. The CCD line sensor 25 judges whether an object is situated close or far according to whether the distance between the re-formed images is longer or shorter than that of a pair of re-formed images of the reference image Io. The deviation amount of an image is detected by the difference between the distance between re-formed images of an image and that of the reference image Io. That is, the CCD line sensor 25 consists of a large number of picture forming elements arranged along a direction in which re-formed images move. The picture forming elements are divided into two groups, i.e., a reference group and a comparison group. The distance between a pair of re-formed images is detected according to the signals generated by the reference and comparison groups. The detected distance is processed by a microcomputer 30 to be described later. According to a result of the processing, the microcomputer determines whether or not the optical system is in the AF condition and calculates a defocus amount.

For the phase difference detection method, an optical system of large size is not required compared with the triangulation method which is an active method, since it is sufficient only to receive light coming from one direction. Therefore, the module 19 of the phase difference detecting type is suitable for being arranged in the center of a binocular.

As the AF operation method, the open-loop control method is adopted where a system controller to be described later calculates a defocus amount and a defocus direction from a predetermined focusing position based on the output of the CCD line sensor 25 and drives the stepping motor 22 (consequently, moves the objective lenses 13 and 14) according to the defocus amount and the direction. In this embodiment, since a focusing condition is detected without using the objective lenses 13 and 14, the detection is performed only once and according to the obtained data, the objective lenses 13 and 14 are moved to obtain an in-focus condition. The stepping motor 22 is used to increase an accuracy in the focusing operation. While the second operation member 5 is being pressed (that is, an AF switch is on), a continuous AF operation is performed. If a stepping motor is used like in this embodiment, focusing lens units are moved and stopped with an excellent accuracy, so that errors are not accumulated. Therefore, the method is advantageous to a continuous AF operation. There are two kinds of AF: a so called one-shot AF in which focus detection is carried out once and the lens movement is executed once and a so called continuous AF in which focus detection is repeatedly carried out with moving the lens. Normally, a mode button is provided to change the AF modes (that is, the one-shot AF mode and the continuous AF mode). In this embodiment, such button is not provided. The AF mode is changed by operating the second operation member 5 which is an AF switch (that is, whether a user, after performing an AF operation once, turns off the AF switch or continues to turn on the switch).

Figure 6:
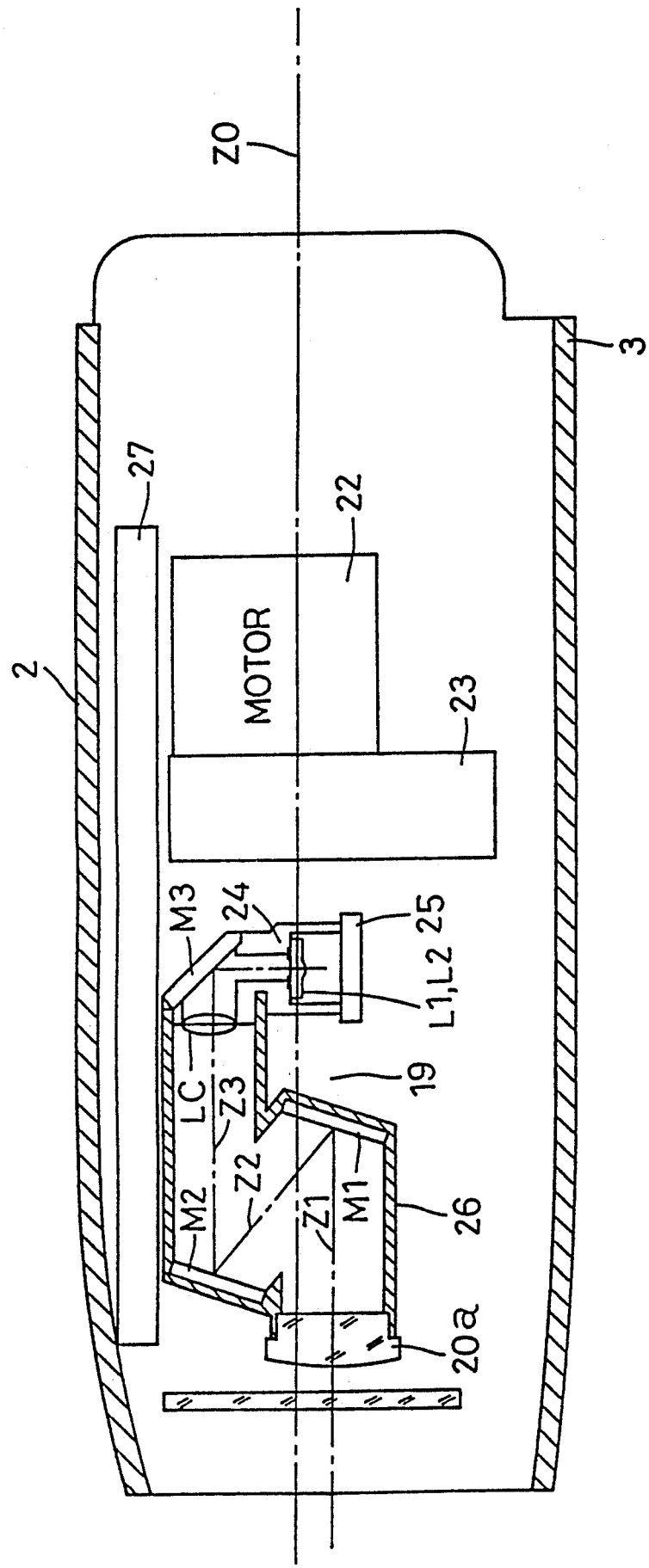
FIG. 6 is a cross-sectional view of the optical system and the focusing condition detection module shown in FIG. 4 taken along a line A—A'.

FIG. 6 is a cross-sectional view, taken along the central line A—A' in FIG. 4, of the focusing condition detection module 19, the stepping motor 22 and the reduction gear unit 23 arranged about the center of the binocular 1. In FIG. 6, the inside of the stepping motor 22 and the reduction gear unit 23 is not shown. In FIG. 6, to obtain a substantially long optical path in a compact optical system, a lens barrel 26 is z-shapedly bent; a first, second and third reflecting mirrors M1, M2 and M3 are arranged as shown in FIG. 6 so that the optical axis Z1 of the light receiving lens is situated below the optical axis Z0 of the objective lenses; the first reflecting mirror M1 reflects the optical axis in an upper front direction as shown by Z2; and the second reflecting mirror M2 reflects the optical axis in a rear direction as shown by Z3 so that an image of an object formed by the light receiving lens 20a is formed in the front vicinity of the condenser lens LC. This is because an accuracy of a focusing condition detection increases as the focal length of the light receiving lens increases. That is, a defocus amount of a lens from an infinity focusing position (defocus amount) is:

a defocus amount of a lens $= f^2/(l-f)$ wherein:

f represents a focal length of a lens; and
l represents a distance to an object.

For example, when $f = 30$ and $l = 4000$ mm,
$30^2/(4000-30) = 0.22$.

And when $f = 60$ and $l = 4000$ mm,
$60^2/(4000-60) = 0.9137$.

Therefore, to the phase difference detection method where a defocus amount is calculated, a lens with a longer focal length whose defocus amount largely changes with respect to a distance to an object is more advantageous in improving an accuracy.

Figure 8:
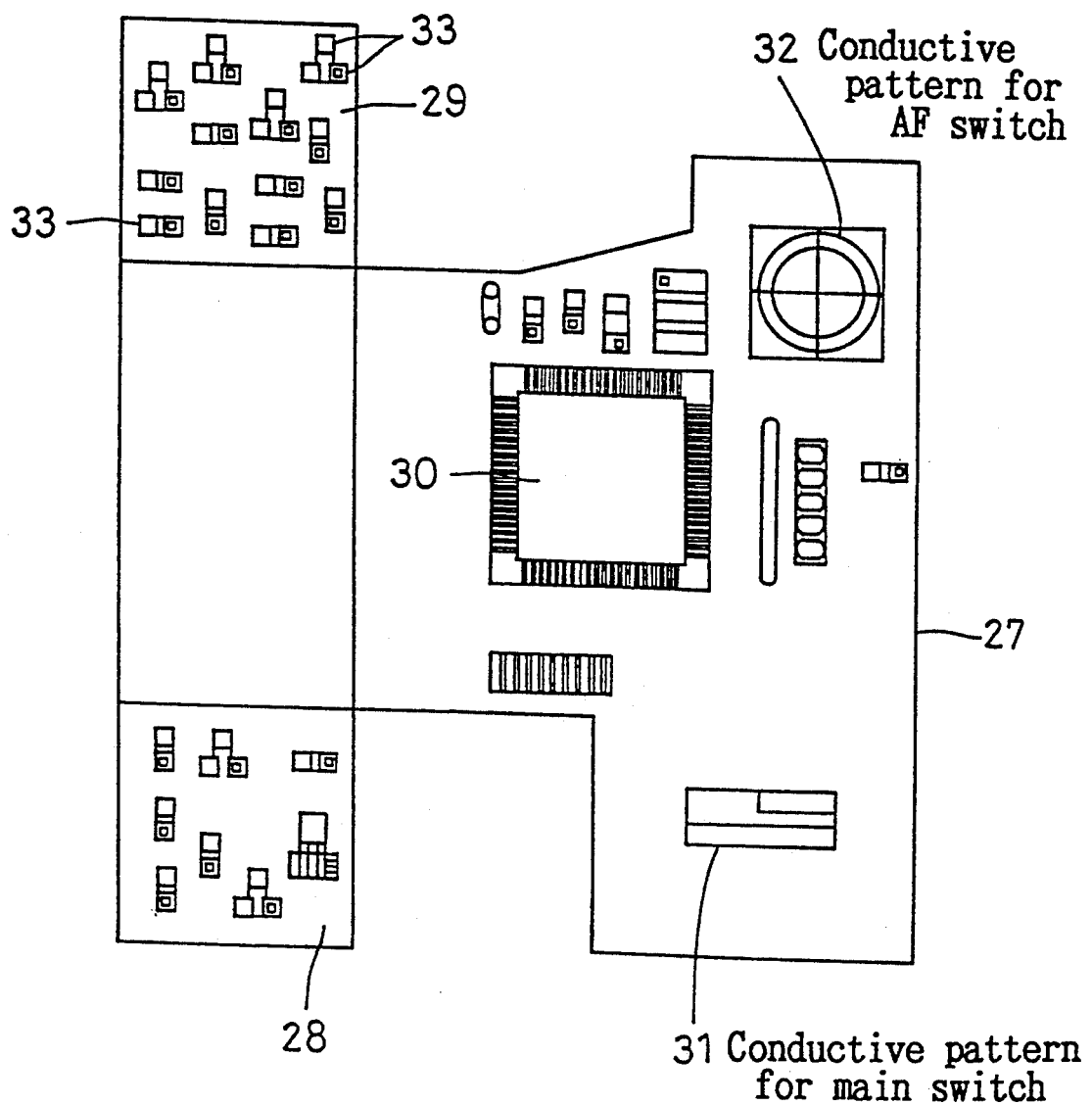
FIG. 8 is a plan view of a circuit substrate employed for an embodiment of the present invention.

Above the focusing condition detection module 19, the stepping motor 22 and the reduction gear unit 23 is arranged a circuit board 27, whose plan view is shown in FIG. 8. The circuit board 27 is composed of a flexible printed circuit board. Wings 28 and 29 at the front of the circuit board 27 are bent so that they wrap the focusing condition detection module 19. To be more specific, they are fixed to the side walls of the lens barrel 26 with double-faced tape, etc. At the rear of the circuit board 27 are provided a microcomputer 30 constituting a system controller to be described later, a conductive pattern 31 for the main switch and another conductive pattern 32 for the AF switch. The circuit board 27 also includes many electronic elements 33 constituting a predetermined circuit.

Figure 7:
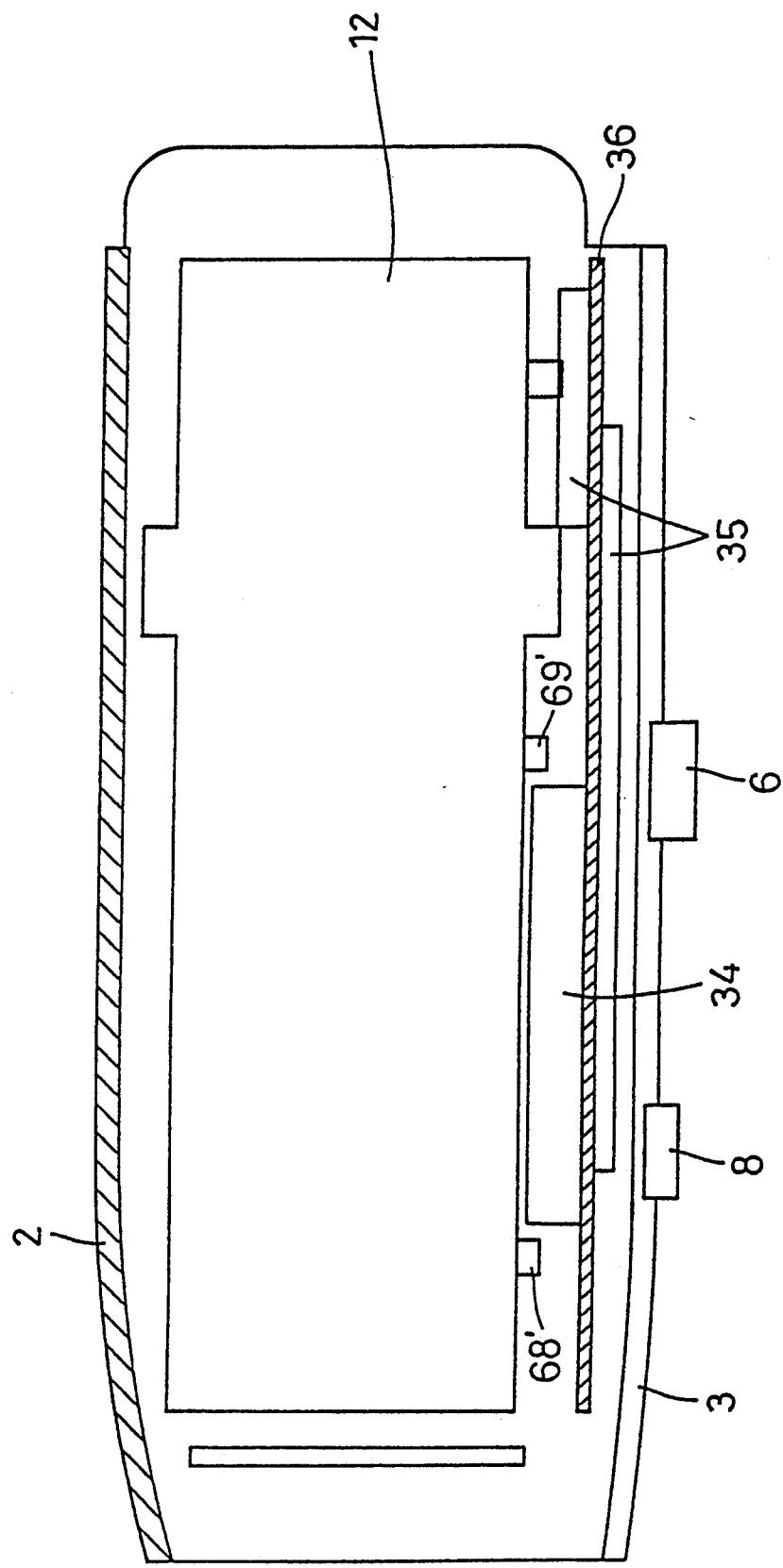
FIG. 7 is a cross-sectional view of the optical system and the focusing condition detection module shown in FIG. 4 taken along a line B—B'.

FIG. 7 is a cross-sectional view, taken along the line B—B' passing through about the center of the lens barrel 12 in FIG. 4, of the binocular 1. As shown in FIG. 7, under the lens barrels 11 and 12 are provided a pupil distance adjusting mechanism 34 and a dioptric power adjusting mechanism 35. The mechanisms 34 and 35 are placed on a base plate 36. 8 is the above-described fifth operation member for adjusting dioptric power, and 6 is the third operation member for pupil distance adjustment.

Inside the binocular 1, the space is effectively used since the circuit board 27 is arranged in the upper part and the mechanisms (the pupil distance adjustment mechanism 34 and the dioptric power adjustment mechanism 35) are arranged in the lower part, so that a compact body is realized. In addition, parts are easily changed since the electrical system and the mechanical system are separated. For example, when the electrical system of the circuit board 27 becomes out of order, the electric system or the circuit board 27 can be changed without touching any of the mechanical system.

It is also possible to arrange the circuit board 27 in the lower part and the mechanical system, in the upper part. However, since the pupil distance and the dioptric power are not so frequently adjusted, it is more convenient to arrange the pupil distance adjusting mechanism 34 and the dioptric power adjusting mechanism 35 which are not frequently used in the lower part and to arrange a circuit having reference to the first operation member 4 for the main switch and to the second operation member 5 for the AF switch which are frequently operated (and arranged in the upper part) adjacent to the operation members 4 and 5 (that is, in the upper part).

Figure 9:
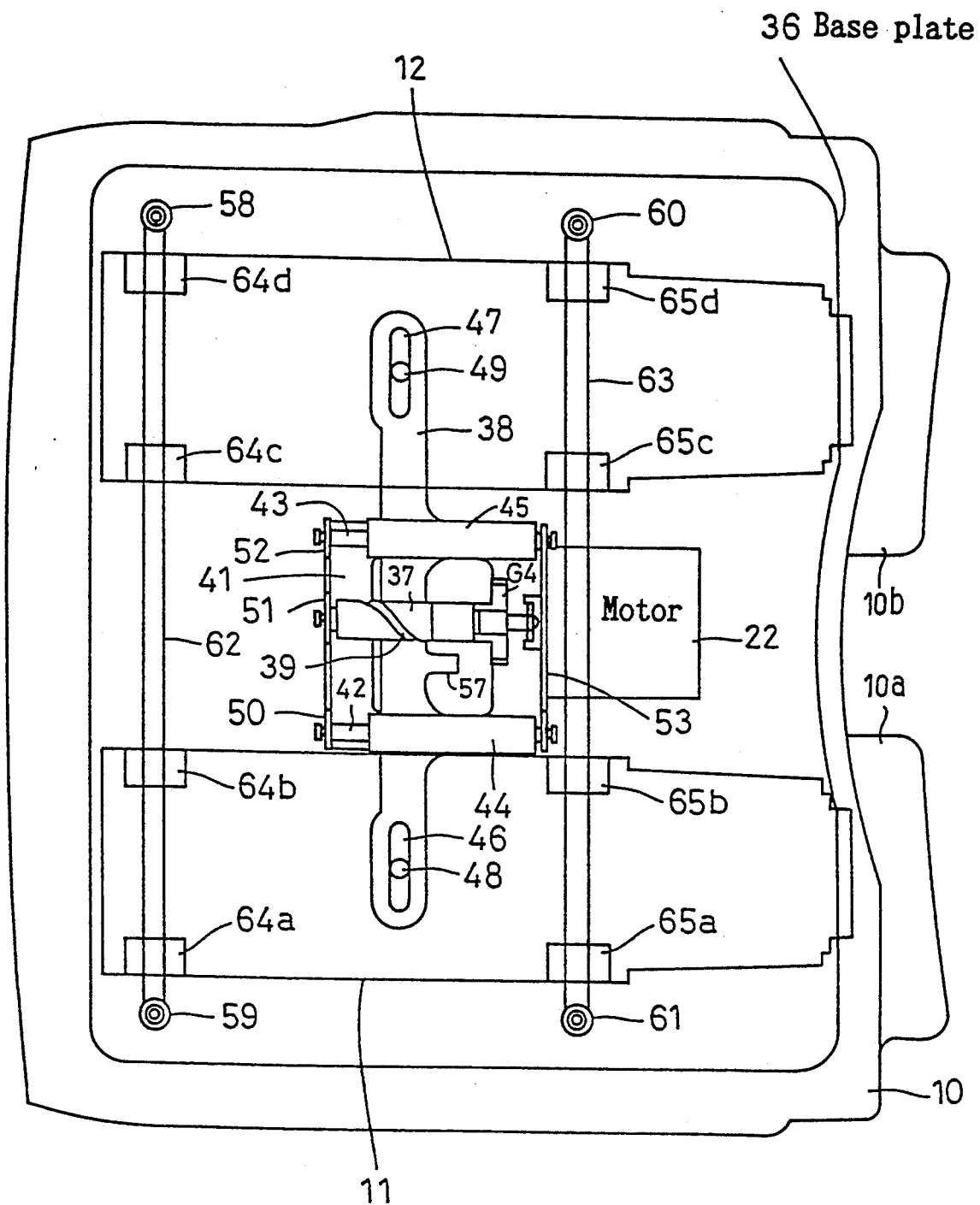
FIG. 9 is an upper plan view of a mechanical diagram of an AF lens drive mechanism.
Figure 10:
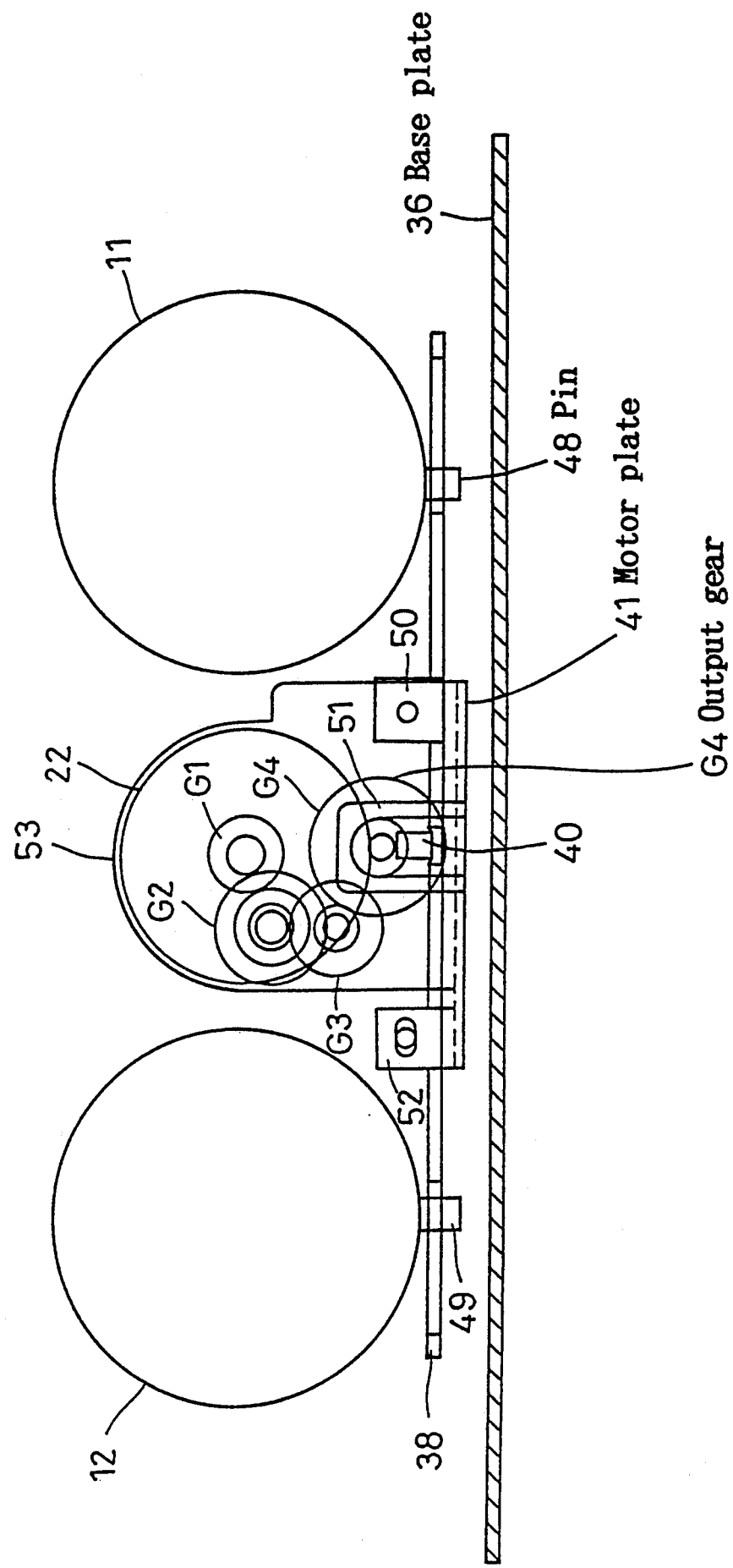
FIG. 10 is a front view of the mechanical diagram of the AF lens drive mechanism shown in FIG. 9.
Figure 11:
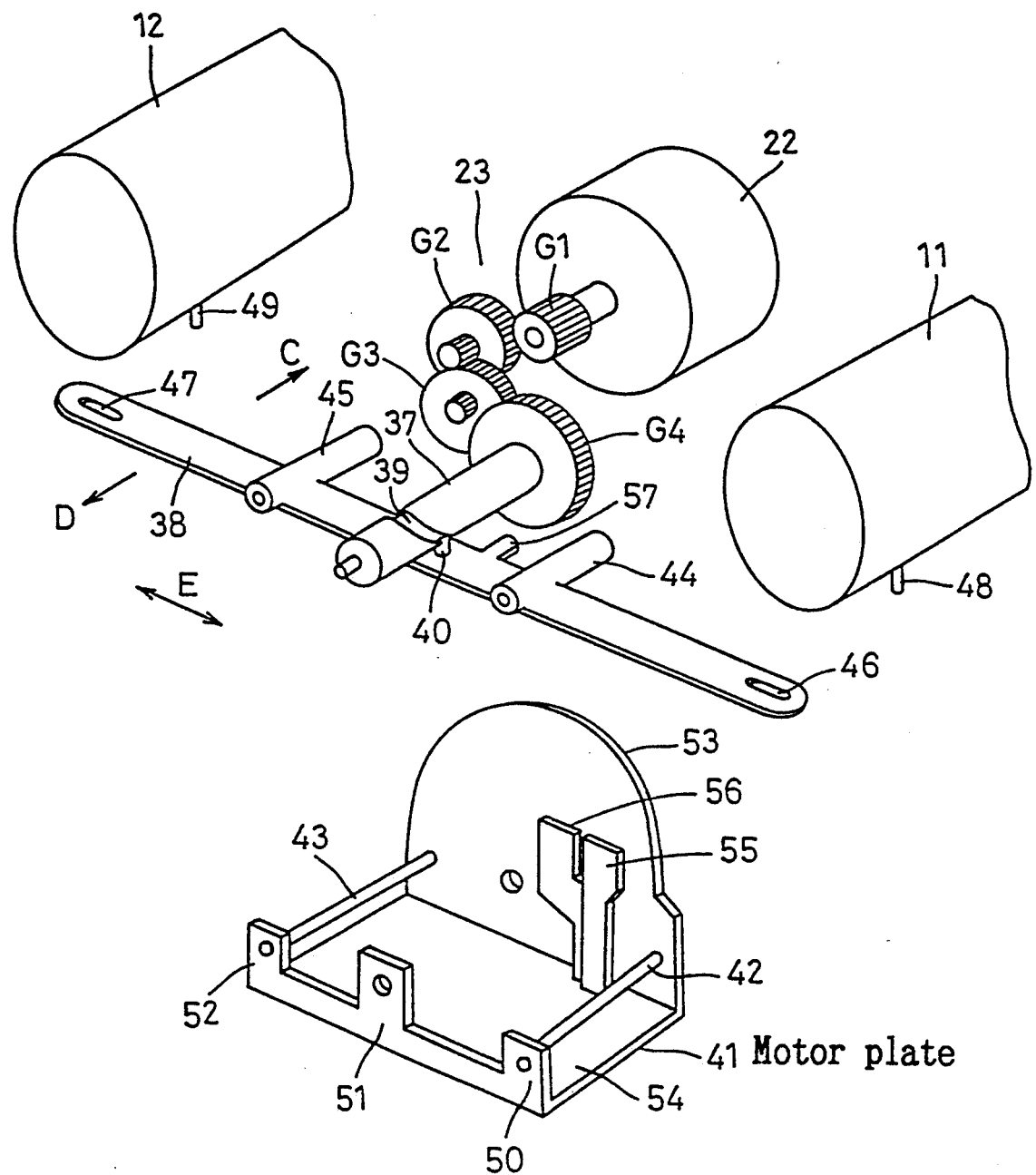
FIG. 11 is an exploded perspective view of the mechanical diagram of the AF lens drive mechanism shown in FIG. 9.

A lens drive mechanism for AF is provided from the center to the lower part of the lens barrels 11 and 12. As shown in FIGS. 9 to 11, the AF lens drive mechanism comprises the stepping motor 22, the reduction gear unit 23 having four gears G1 to G4 for reducing a rotation speed of the stepping motor 22, a cam shaft 37 directly connected to the output gear G4 of the reduction gear unit 23, and a lens drive lever 38 is actuated by the cam shaft 37. On the cam shaft 37 is helically formed a cam groove 39, with which a pin 40 of the lens drive lever 38 is engaged. Therefore, when the cam shaft 37 rotates, the lens drive lever 38 moves in a direction C or D (shown in FIG. 11).

The lens drive lever 38 has hollow cylinders 44 and 45 inside which lever guiding shafts 42 and 43 are fitted. The lens drive lever 38 stably moves by being held and guided by the lever guiding shafts 42 and 43 through the cylinders 44 and 45. On both ends of the lens drive lever 38 are provided holes 46 and 47, with which pins 48 and 49 of the objective lenses 13 and 14 are engaged. The holes 46 and 47 are made long vertically to the direction of the movement of the lens drive lever 38 to allow the lens barrels 11 and 12 to shift in directions E.

A motor base 41 has, at the front, three supporting plates 50, 51 and 52 extending upward to support the front ends of the lever guiding shafts 42 and 43 and that of the cam shaft 37, and has, at the rear, a supporting plate 53 for supporting the rear ends of the stepping motor 22, reduction gear unit 23 and cam shaft 37. On the bottom 54 of the motor plate 41 are provided a pair of metal plates 55 and 56 (illustrated only in FIG. 11, and not illustrated in FIGS. 9 and 10). The metal plates 55 and 56 serve as an infinity switch for detecting the end of a direction C (an infinity end). When a projection 57 of the lens drive lever 38 meets the metal plate 55, both of the metal plates 55 and 56 meet each other. In FIG. 9, shafts 62 and 63 supported by columns 58, 59 and 60, 61 provided on the base plate 36 serve as pupil distance guiding shafts in a pupil distance adjustment operation. The pupil distance guiding shafts 62 and 63 movably support the lens barrels 11 and 12, respectively. 64a to 64d and 65a to 65d are brackets projecting downward from the lens barrels 11 and 12. The pupil distance guiding shafts 62 and 63 pass through cavities and holes formed on the brackets 64a to 64d and 65a to 65d.

Figure 12:
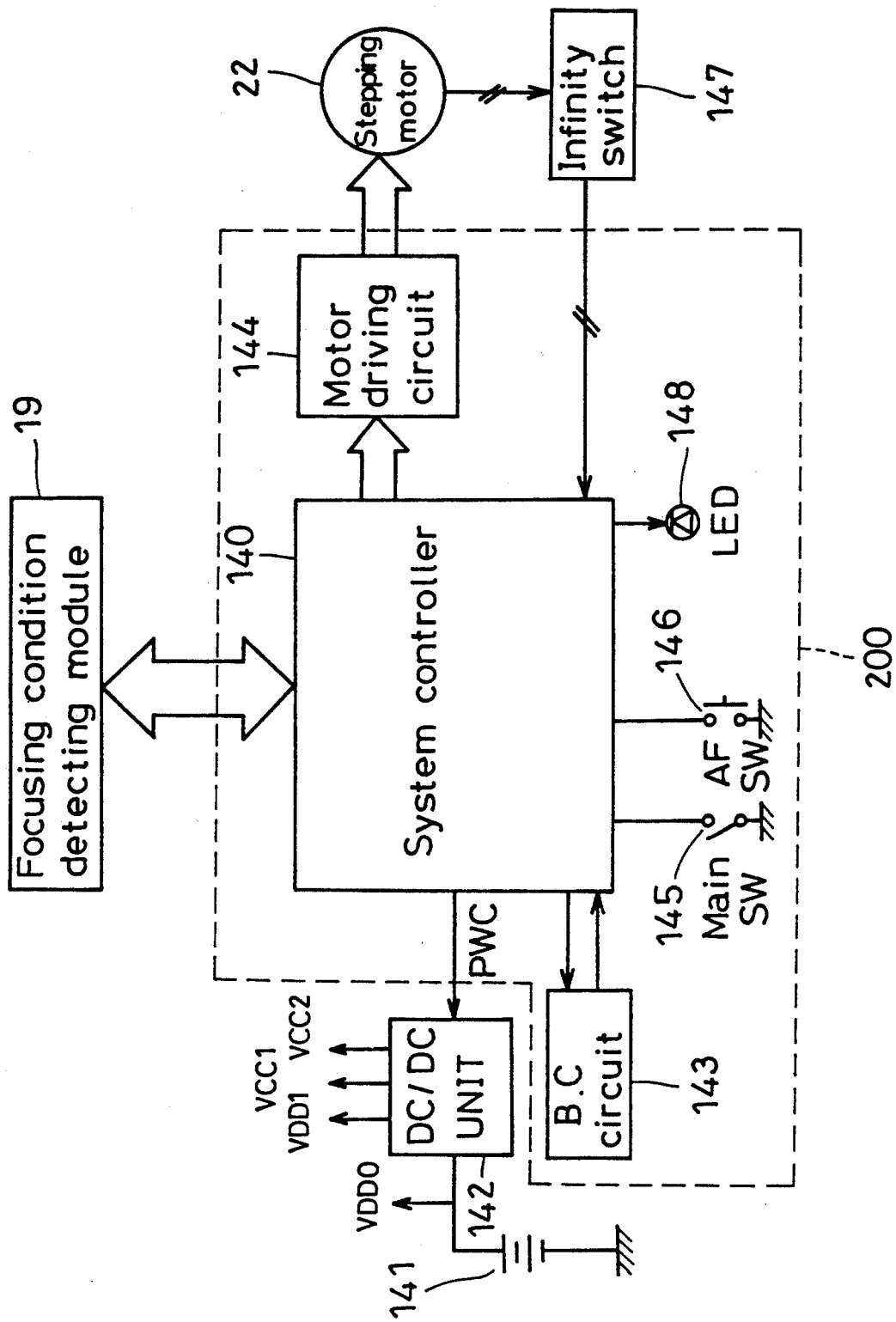
FIG. 12 is a block diagram of a circuit of an embodiment of the present invention.

FIG. 12 shows a circuit system of the binocular 1 of the present invention. In FIG. 12, 140 is a system controller including the microcomputer. The output voltage VDD0 (direct voltage) of a battery 141 is provided to a DC/DC (direct current to direct current) converter unit 142 as well as to the stepping motor 22 as the power source. The DC/DC converter unit 142 provides VCC1 and VCC2 to the focusing condition detection module 19 as well as provides a predetermined output voltage VDD1 (direct voltage) to the system controller 140 in response to a power control (PWC) signal provided by the system controller 140. At the system controller 140 and at the focusing condition module 19, VDD1 and VCC1 are adjusted to be 5 V, and VCC2, to be 12 V, respectively. The system controller 140, for example, controls the DC/DC converter unit 142 so that VCC1 and VCC2 are ceased to save a battery power while the focusing condition module 19 is not being driven. 143 is a battery checking circuit, which checks an output voltage of the battery 141 according to an instruction of the system controller 140 and sends the result to the system controller 140. The battery checking circuit 143 is detailed in FIG. 32.

A motor drive circuit 144, which is driven by a control signal from the system controller 140, drives the stepping motor 22. 145 is a slidable main switch, 146 is a push-button AF switch, and 147 is an infinity switch consisting of the metal plates 55 and 56 shown in FIG. 11. 148 is an LED (light emitting diode) for displaying a warning. The LED 148 emits light to give a warning to a user when the output voltage of the battery is not greater than a predetermined value or when the contrast of an object viewed through the binocular is low. In FIG. 12, the portion in the dotted closure 200 is provided on the circuit board 27 shown in FIG. 8.

Figure 13A:
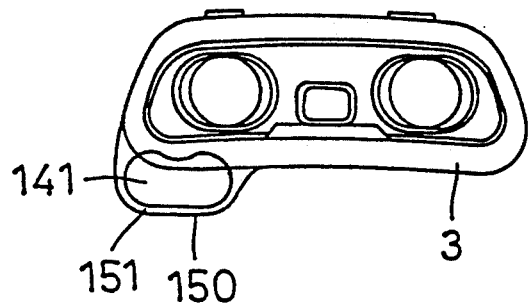
FIGS. 13A, 13B and 13C show a battery holder.
Figure 13B:
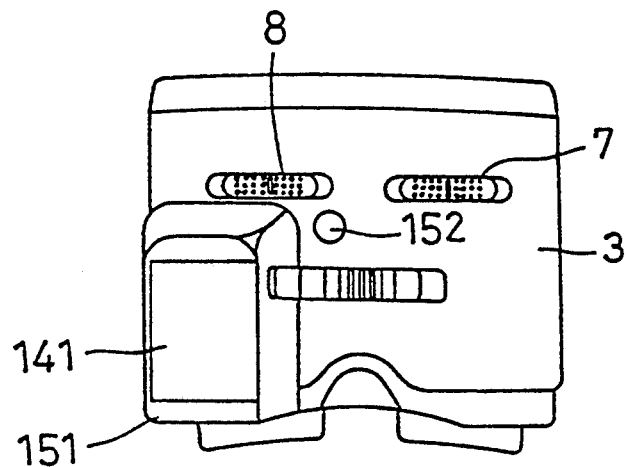
Figure 13C:
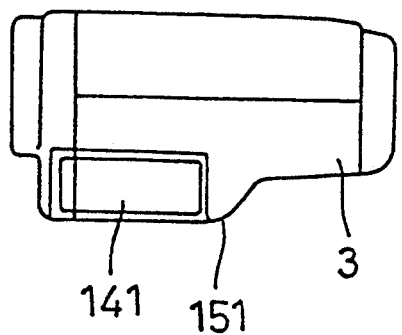

FIG. 13 shows a portion of the binocular 1 where the battery 141 is housed. FIGS. 13A and 13B are views corresponding to FIGS. 2 and 3, respectively, to which the portion where the battery 141 is housed is added. FIG. 13C shows the right side of the binocular shown in FIG. 13A. 150 is a grip consisting of a battery cover 151 attached to the lower cover 3 of the binocular 1. The binocular 1 is easily held by holding the grip 150 with fingers. Inside the grip 150 is housed a battery of 6 V. The battery 141 is held by attaching and fixing the battery cover 151 to the lower cover 3. That is, the battery 141 is supported by the battery cover 151. To prevent an inadvertent separation of the battery cover from the binocular 1, it is preferable to provide a battery cover releasing button 152 with which the battery cover 151 is detached from the binocular 1.

Figure 14:
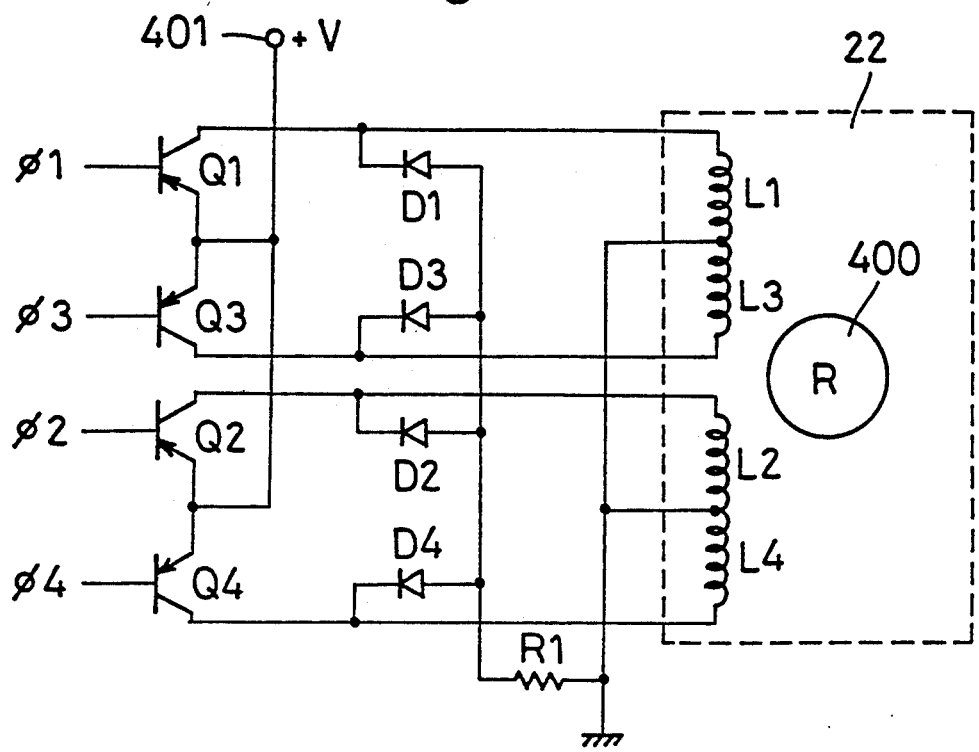
FIG. 14 is a circuit diagram of a drive circuit of a stepping motor.

FIG. 14 shows a unipolar driver circuit for the stepping motor 22. A bipolar driver circuit is another type of driver circuit. The coil of the bipolar driver circuit is wound differently from that of a unipolar circuit. If the sizes are the same, a bipolar circuit has larger torque, but has a more complicated circuit arrangement. However, it has been more and more used recently because the adoption of an IC (integrated circuit) reduces the complication of the circuit arrangement. Therefore, in this embodiment, a bipolar driver circuit can also be used.

In FIG. 14, the stepping motor 22 consists of a rotor 400 and four excitation coils L1 to L4. The driver circuit of the stepping motor 22 comprises, as shown in FIG. 14, PNP-type transistors Q1 to Q4, diodes D1 to D4 and a resistor R1. The emitters of the transistors Q1 to Q4 are connected to a direct-current power source through a terminal 401, bases connected to a motor drive signal source and each collector connected to each of diodes D1 to D4, respectively, as well as to one end of each of the coils L1 to L4, respectively. The other end of each of the coils L1 and L4 is grounded.

Figure 15:
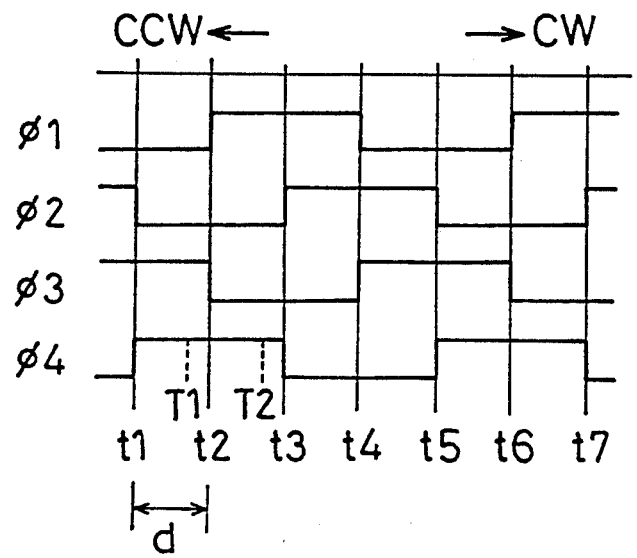
FIG. 15 shows a sequence of the two-phase excitation method of the circuit shown in FIG. 14.

FIG. 15 shows a two-phase excitation sequence (time chart) of the circuit shown in FIG. 14. The arrow CW shows a rotation of the stepping motor 22 in a clockwise direction, and the arrow CCW, in a counter clockwise direction. At a low level, driver signals $\phi 1$ to $\phi 4$ activate on the coils by turning on the corresponding transistors, and at a high level, disable the coils by turning off the corresponding transistors. In FIG. 15, each of longitudinal lines t1 to t7 corresponds to 18° of a rotation angle of the stepping motor 22. Between t1 and t2 where the levels of the driver signals $\phi 1$ and $\phi 2$ are low, the transistors Q1 and Q2 are turned on, so that electric current is applied to the coils L1 and L2 to two-phase excite the coils L1 and L2 to rotate the stepping motor 22. In this specification, a rotation of the rotor 400 is referred to as a rotation of the stepping motor 22. The rotation of the stepping motor 22 starts at t1 and stops at T1 between t1 and t2. The stepping motor 22 does not rotate between t1 and t2. Between t2 and t3, the transistors Q2 and Q3 are turned on by the driver signals $\phi 2$ and $\phi 3$, so that electric current is applied to the coils L2 and L3 to two-phase excite the coils L2 and L3. The stepping motor 22 starts again at t2 and stops at T2. The stepping motor 22 does not rotate between T2 and t3. In the same manner, two low-level signals of the driver signals $\phi 1$ to $\phi 4$ sequentially drive the stepping motor 22. Distances d between t1 and t2, t2 and t3, ... are the same. If the distance d is decreased, the stepping motor 22 rotates faster; if the distance d is increased, it rotates more slowly.

Figure 16:
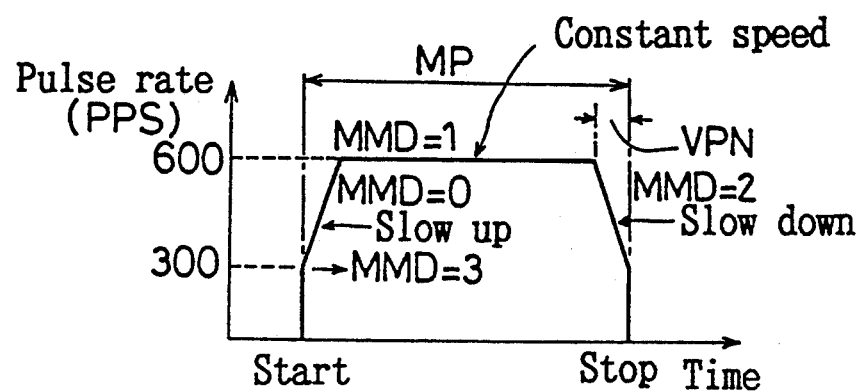
FIG. 16 shows a speed control characteristic of the stepping motor.

FIG. 16 shows a speed control characteristic of the stepping motor 22 for excellently starting and stopping the stepping motor 22. The stepping motor 22 is controlled in accordance with the speed control characteristic having a trapezium portion as shown in FIG. 16 from starting to stopping. In FIG. 16, the lateral line represents time, and the longitudinal line represents speed (pulse rate). At the time of starting, speed is not abruptly increased to raise torque. The motor is started to rotate at a speed of 300 PPS (PPS stands for pulse per second, or pulse rate). After the starting, the speed is gradually increased until it becomes 600 PPS. Then, the motor 22 is rotated at a constant speed of 600 PPS. Before the motor 22 is stopped, the speed is gradually decreased from 600 PPS to 300 PPS. Then, the motor is stopped. The period when the speed is gradually increased and the period when it is gradually decreased will hereinafter be referred to as an acceleration period and a reduction period, respectively. In the motor control of an embodiment to be described later, there is no acceleration time when, for example, a shift amount of a lens is small. In this case, the motor is rotated at a constant speed from the beginning.

Figure 17:
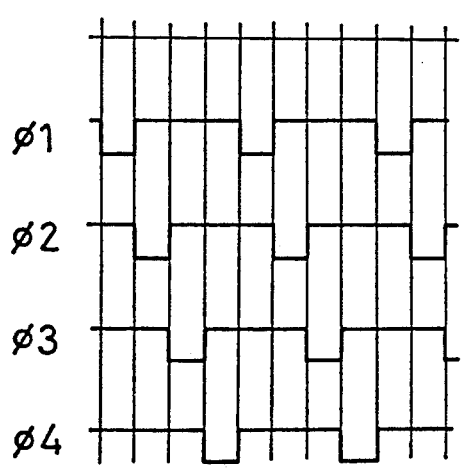
FIGS. 17 and 18 show a sequence of the one-phase excitation method and that of the one-/two-phase excitation method, respectively.
Figure 18:
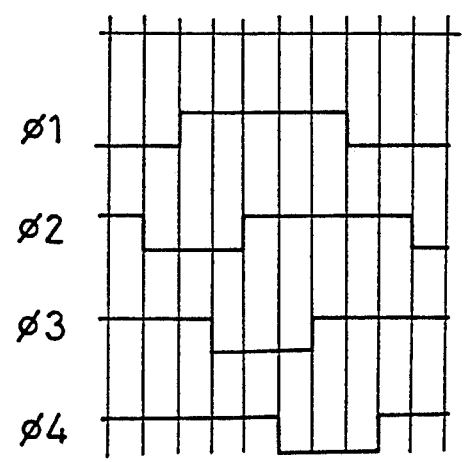

The foregoing is an explanation of a driving of a stepping motor with reference to the two-phase excitation method. In this embodiment, the one-phase excitation method and the one-/two-phase excitation method (a combination of the one-phase excitation method and the two-phase excitation method) are also applicable. The excitation sequence of the one-phase excitation and one-/two-phase excitation methods are shown in FIGS. 17 and 18, respectively. Each method will briefly be explained in the following:

1. One-Phase Excitation Method

A method where only one phase is always excited. An excellent efficiency is obtained since torque is not so much decreased although only a small amount of electric power is required. However, the method is unsuitable when vibration must be avoided, because a damped vibration at a stepping is large and a hunting is liable to be caused.

2. Two-Phase Excitation Method

A method where two phases are always excited. Since two phases are excited, the required electric power is twice as much as that of the one-phase excitation method, and the temperature is liable to be higher. However, it is frequently used since high torque is obtained and the damped vibration is small. The step angle is the same as that of the one-phase excitation method.

3. One-/Two-Phase Excitation Method

A method where one phase and two phases are alternately excited. The required electric power of the one-/two-phase excitation method is 1.5 time that of the one-phase excitation method. The value of torque takes an intermediate value between the values of torque of the one-phase excitation method and the two-phase excitation method. Since the step angle is half that of the one-phase excitation method or the two-phase excitation method, the resolution and pulse reply of the system become twice those of the one-phase excitation method or the two-phase excitation method.

Next, a control operation of the microcomputer 30 constituting the system controller 140 in this embodiment will be explained referring to the flow charts shown in FIGS. 19 to 21.

Figure 19:
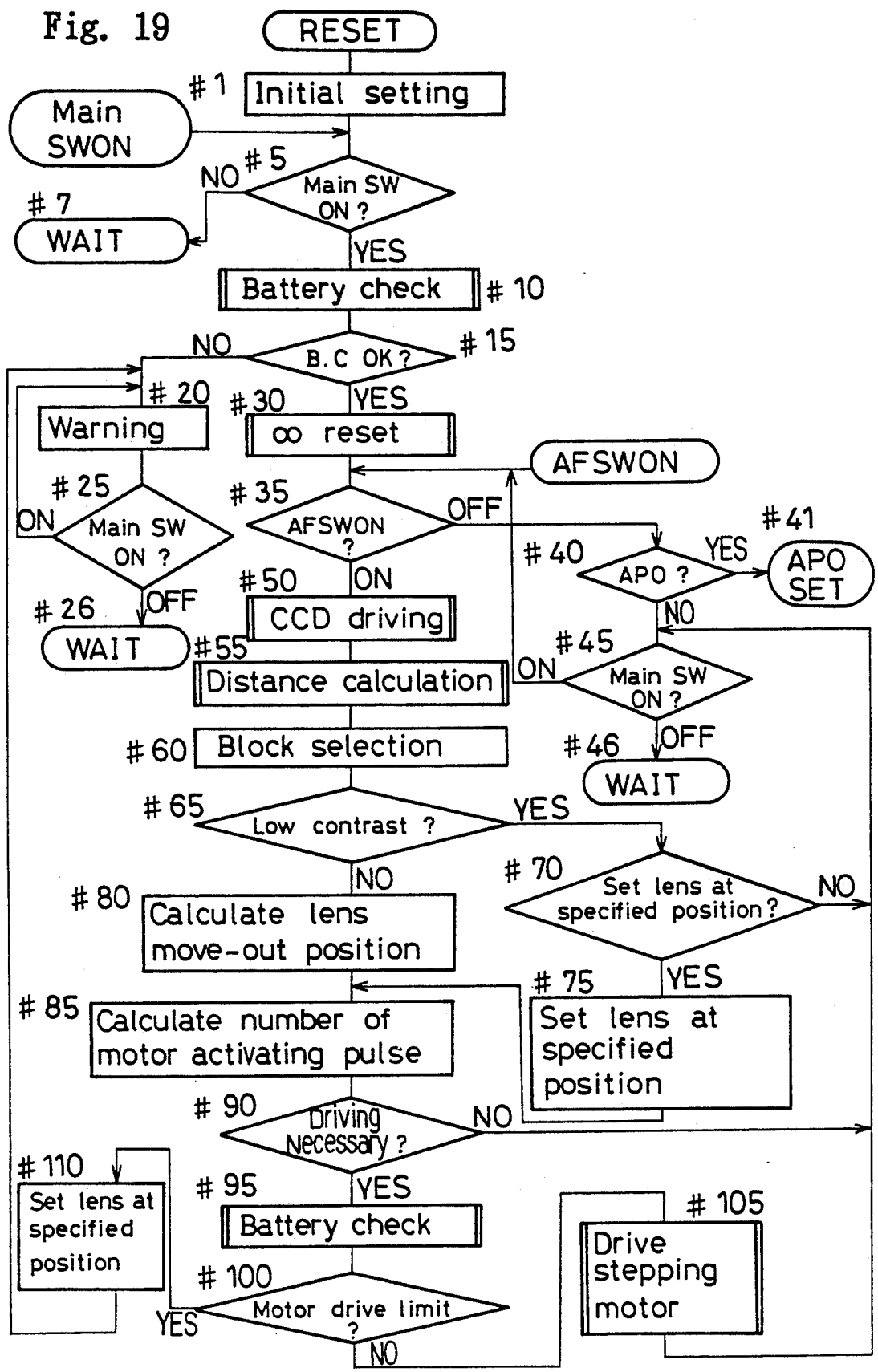
FIG. 19 is a schematic flow chart showing a control of a microcomputer constituting a system controller.

FIG. 19 shows a general operation. Firstly, when a battery 141 is attached to the binocular, a reset operation is performed in each part of the microcomputer 30 to conduct an initial setting (step #1). According to this, initial settings of the output/input port and data of the microcomputer 30 are done. Whether or not a main switch 145 is ON is important after the initial setting. At step #5, whether or not the main switch 145 is ON is determined. When it is OFF, the process proceeds to step #7 to enter a wait condition. That is, the microcomputer 30 does not operate although electric power is provided. When the main switch 145 is determined to be ON at step #5, the process proceeds to the next step #10 where the battery is checked. At step #15, a result of the battery check, that is, whether or not the battery is OK is determined. When it is not OK, the process proceeds to step #20, where a warning is displayed. The warning is displayed by a light emitting diode (LED) 148. The warning is displayed all the time while the main switch 145 is ON (step #25), and the process does not proceed. In this condition, when the main switch 145 becomes OFF, the process enters the wait condition (step #26). When the battery is determined to be OK (that is, when the battery has sufficient voltage) at step #15, the process proceeds to the next step #30 where a lens is moved to an infinity position. This is because at least one lens position is required to be obtained. The infinity position for the one position is detected in response to a lens movement to a stop plate after an infinity switch 147 is ON when the projection 57 abuts the metal plate 55 shown in FIG. 11. The infinity position is used as the reference position for the succeeding lens movements.

Figure 22A:
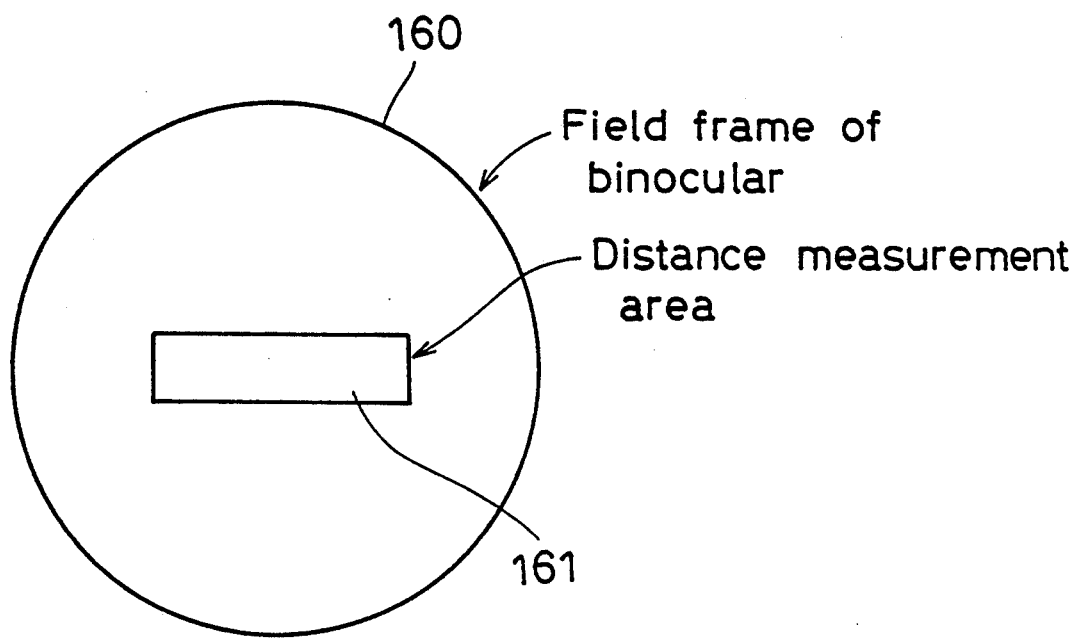
FIGS. 22A and 22B are explanatory views of object distance measurement area in the field frame and the CCD sensor.
Figure 22B:
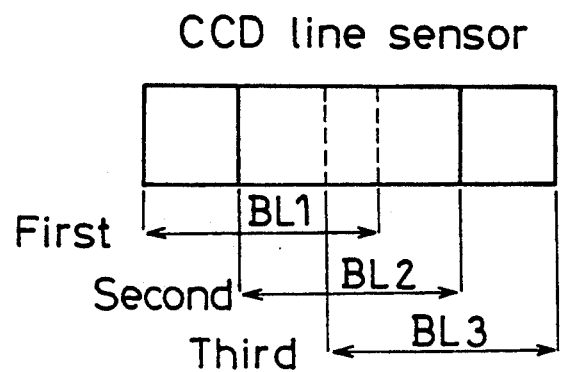

After the lens is reset to the infinity position at step #30, whether an AF switch 146 is ON or OFF is determined at step #35. When it is OFF, the process proceeds to step #40, where whether or not an auto power off function has been set is determined. When the auto power off function has been set, the process enters a routine APOSET to be described later (step #41). When the auto power off function has not been set, the process proceeds to the next step #45, where whether the main switch 145 is ON or OFF is determined. When the main switch 145 is OFF, the process enters the wait condition (step #46). When it is ON. The process returns to step #35, where whether the AF switch 146 is ON or OFF is determined. When the AF switch 146 is ON, a CCD for measuring a distance is driven at step #50. Then, after a distance is calculated at step #55, a block for measuring a distance is selected. As shown in FIG. 22B, a CCD line sensor for measuring a distance is divided into three blocks (a first block BL1, a second block BL2 and a third block BL3) in a software manner, with respect to each of which a distance calculation (including a contrast calculation) is performed. At step #60, one of the three blocks is selected according to an image shift and a contrast of each block. This makes it possible to select an appropriate object to be focused on in an AF operation among objects close to and far from the binocular.

At step #65, a low contrast, that is, whether or not the contrast of an object calculated in each block is equal to or lower than a predetermined contrast is determined. The determination is made based on output data of the CCD. When the contrast is determined to be low, the process proceeds to step #70, where the lens should be set at a predetermined position or not is determined. When the lens does not have to be set at the predetermined position, the process proceeds to step #45. When it should be set, it is set at the predetermined position at step #75, and then the process proceeds to step #85. The lens is set at a predetermined position when the contrast is low because on which object the binocular is focused cannot be determined if a low contrast is frequently detected. For example, when the horizon is viewed through a binocular, it is preferable that the binocular is focused on infinity. In this embodiment, the infinity position is used as the predetermined position. It may, however, be replaced by other positions.

When the contrast is determined not to be low at step #65, the process proceeds to step #80, where an in-focus position of the lens is calculated, and then, proceeds to step #85. In FIG. 19, whether or not the contrast is low is determined (step #65) in all the blocks BL1, BL2 and BL3 after the block selection (step #60). The low contrast determination can be made before the block selection. In a flow chart shown in FIG. 24 to be described later, the low contrast determination is made before the block selection.

At step #85, the number of pulses (hereinafter, referred to as "a pulse count") for driving the motor to move the lens to the in-focus position is calculated. Since the motor is not required to be driven when the present position of the lens is in the in-focus range, whether or not the motor should be driven is determined at step #90. When the motor drive is determined to be unnecessary, the process returns to step #45. When it is determined to be necessary, the process proceeds to step #95, where the battery is checked, and further to step #100, where whether or not the battery voltage for driving the motor exceeds a predetermined value (hereinafter, referred to as the limit) is determined based on the battery voltage detected at step #95. When it exceeds the limit, the process proceeds to step #110, where the lens is moved to the predetermined position, and then, proceeds to step #20, where a warning is displayed. The lens is moved to the predetermined position when the battery voltage exceeds the limit because, when the motor cannot be driven because of a consumption of the battery, it is more convenient that the lens is situated at the infinity side than it is situated at the near side, since objects situated from closer to the binocular to farther away from the binocular can be viewed under an in-focus condition than when the lens is situated at the near side. For the predetermined position at the low contrast, the infinity position is suitable, since a binocular is frequently used for viewing an object situated extremely far away and having a low contrast (such as the sky, the sea, etc.), although it is optically preferable that an object situated slightly closer than infinity is focused on. Thereby, there would be a higher probability that an in-focus image can be viewed when the contrast is low. However, for the predetermined position at the battery check, a position slightly closer to the near side is proper.

When the battery voltage is determined not to exceed the limit at step #100, the process proceeds to step #105, where the motor is driven, and returns to step #45.

In the flow chart shown in FIG. 19, the stepping motor 22 is driven by the two-phase excitation method. Therefore, at step #105, the motor is driven with two phases being excited. It is also possible to jointly use the two-phase excitation method and the one-phase or one-/two-phase excitation method.

Figure 20:
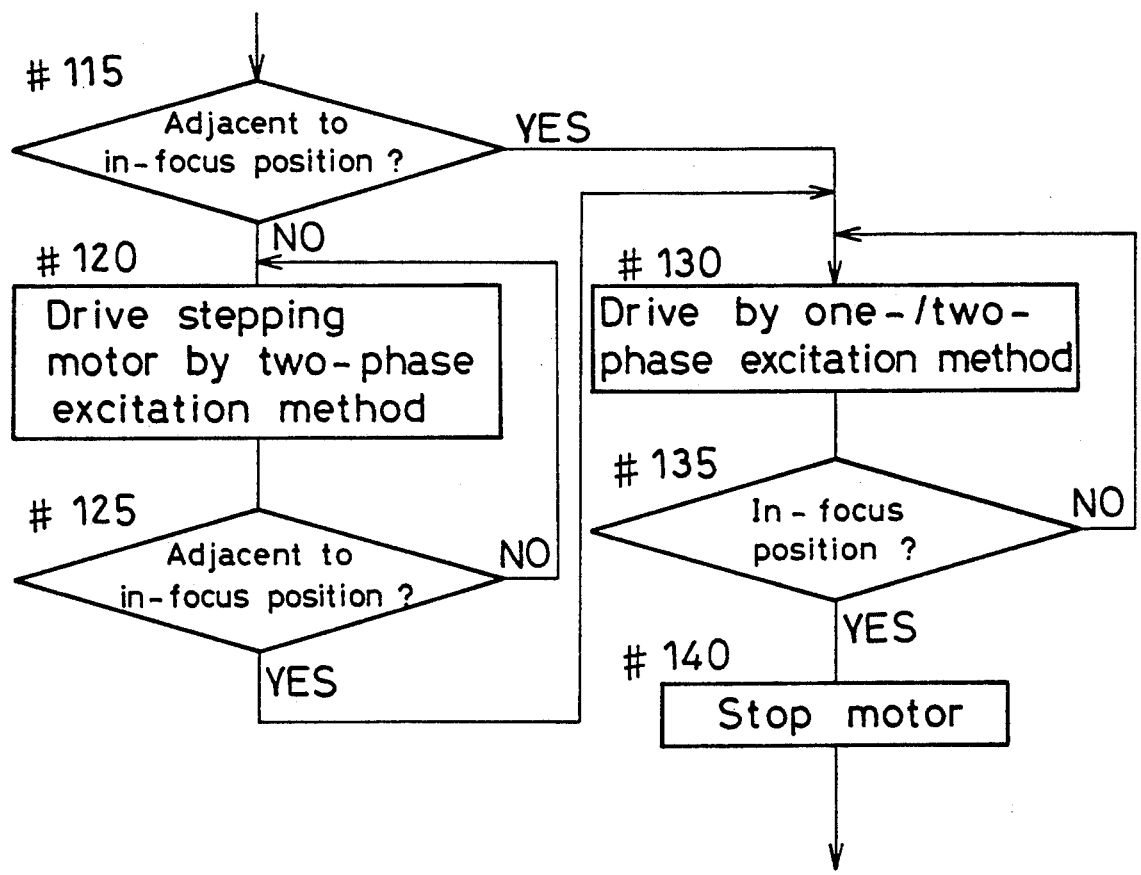
FIGS. 20 and 21 are flow charts showing examples of the stepping motor driving.
Figure 21:
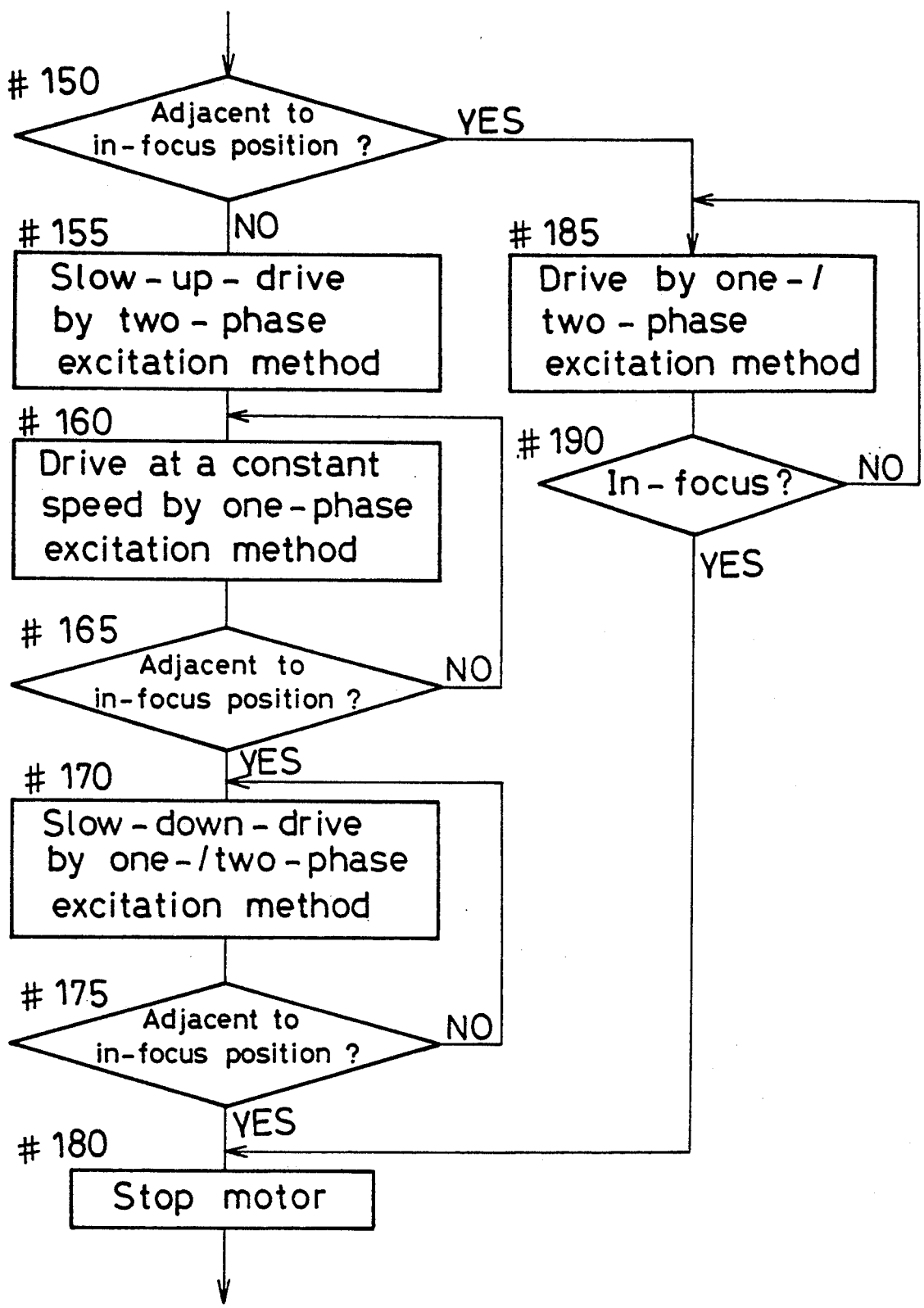

FIGS. 20 and 21 show flow charts (corresponding to step #105 of the flow chart in FIG. 19) of an embodiment where the two-phase excitation method and the one-phase excitation method are used and of an embodiment where the two-phase excitation method and the one-/two-phase excitation method are used, respectively.

In the embodiment shown in FIG. 20, the step angle is decreased in the vicinity of the in-focus position by use of the one-/two-phase excitation method to increase an accuracy. When a lens movement amount to the in-focus position is large, the lens is moved at a high speed firstly by the two-phase excitation method having a large step angle, and then, the driving method is switched to the one-/two-phase excitation method in the vicinity of the in-focus position.

In the embodiment shown in FIG. 21, the motor is slow-up-driven by the two-phase excitation method at the time of starting when high torque is required. When the load decreases, the driving method is switched to the one-phase excitation method where the torque is smaller but less electric power is consumed to save the battery.

In the flow chart shown in FIG. 20, whether or not the lens is in the vicinity of the in-focus position is determined at step #115. When the lens is not in the vicinity of the in-focus position, the process proceeds to step #120, where a two-phase excitation method is performed. At step #125, whether or not the lens reaches the vicinity of the in-focus position as a result of the driving is determined. The operations from step #120 to step #125 are repeated until the lens reaches the vicinity of the in-focus position. When the lens is in the vicinity of the in-focus position at step #115 or step #125, the process proceeds to step #130, where the motor is driven by one-/two-phase excitation method. At the next step #135, whether or not the lens is in-focus is determined. When it is not in-focus, the process returns to step #130, where the one-/two-phase excitation method is continued. When it is in-focus, the motor is stopped (step #140).

In the flow chart shown in FIG. 21, whether or not the lens is in the vicinity of the in-focus position is determined at step #150. When it is not in the vicinity of the in-focus position, after a slow-up driving is performed by the two-phase excitation method at step #155, the lens is driven at a constant speed by the one-phase excitation method at the next step #160. Then, whether or not the lens reaches the vicinity of the in-focus position as a result of the driving is determined at step #165. When it does not reach the in-focus position, the process returns to step #160, where the lens continues to be driven at a constant speed by the one-phase excitation method. When it reaches the vicinity of the in-focus position, a slow-down driving is performed by the one-/two-phase excitation method (step #170), and then, whether or not the lens reaches the focus position is determined (step #175). When the lens is not in-focus, the process returns to step #170, where the one-/two-phase excitation method is continued. When it reaches the in-focus position, the motor is stopped (step #180). At the above-described step #150, when the lens reaches the vicinity of the in-focus position, the operations from step #185 to step #190 are executed until the lens reaches the in-focus position. When the lens reaches the in-focus position, the motor is stopped (step #180).

Next, the operations shown in FIG. 19 will be described referring to the flow charts shown in FIGS. 23 to 30.

Figure 23:
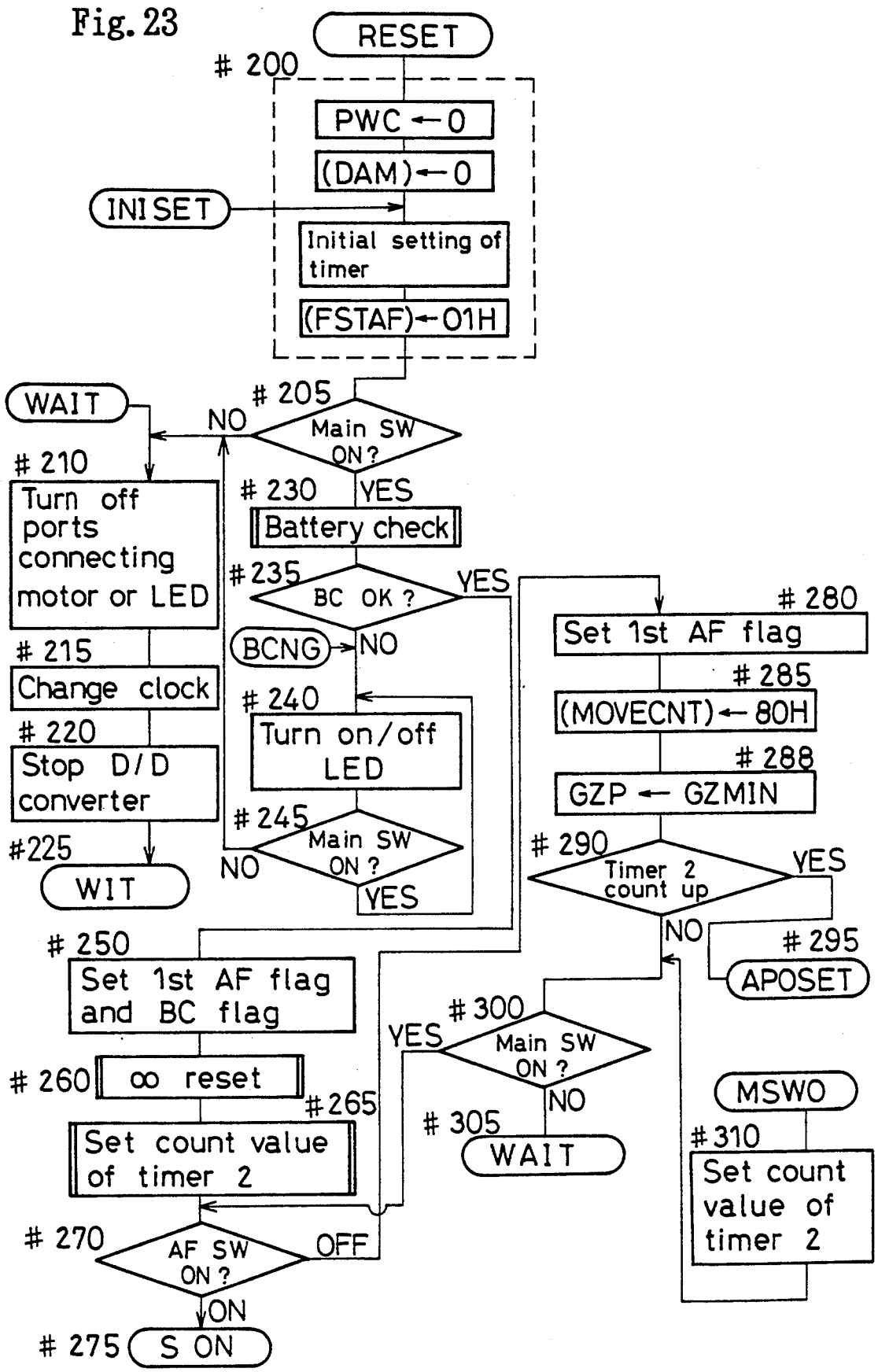

When a battery is fitted into the battery holder of the binocular 1, a reset routine shown in FIG. 23 is executed. Then, an initial setting is performed at step #200. Among the various operations in the initial setting, only typical operations described in FIG. 23 will be explained. Firstly, the level of a PWC terminal which controls the DC/DC converter unit 142 is set to be at a low level. Secondly, the memory of a DAM to be described later used for a motor driving is cleared. Thirdly, a timer is reset. Lastly, a first AF flag FSTAF is set to be 1.

After the above-described initial setting is completed, whether or not the main switch 145 is ON is determined at step #205. When the main switch 145 is OFF, the process proceeds to the steps from #210 to #220 where the process enters a WIT condition (step #225). First, at step #210, output ports, to which the stepping motor 22 and the LED 148 are connected, of the microcomputer 30 is turned off. Next, at step #215, a clock frequency is changed from a high-speed clock frequency to a low-speed clock frequency. Then, at step #220, the DC/DC converter unit 142 is stopped, so that the process enters the WIT condition (step #225). Under the WIT condition where the microcomputer 30 generates a clock of low-speed frequency, less electric power is consumed than when the microcomputer 30 generates a clock of high-speed frequency.

At the above-mentioned step #205, when the main switch 145 is ON, the process proceeds to step #230, where the battery is checked. At the next step #235, the result of the battery check is determined. When the battery voltage is not sufficient, a warning is displayed by alternately turning on and off the LED 148 (step #240). At this time, the frequency of the turning on and off of the LED 148 is 2 Hz. The frequency is not necessarily 2 Hz. The warning by the LED 148 is continuously displayed when the main switch 145 is ON as comprehended from step #245. When the main switch 145 is turned off, the process returns from step #245 to step #210, where the process enters the WIT condition as described above.

When the battery voltage is determined to be sufficient at step #235, the process proceeds to step #250, where the first AF flag and a battery check flag are set. After the setting is completed, an infinity (∞) reset is performed at step #260. The infinity reset is performed for setting the lens at a predetermined position (that is, the infinity position) after the main switch 145 is turned on, since the direction and amount of the lens movement cannot be determined later unless the initial position of the lens is known. The routine will be described later referring to FIG. 29. After the infinity reset is completed, a count of a timer 2 is set (step #265). That is, the time for entering an APO (auto power off) SET to be described later is set.

At step #270, whether or not the AF switch is ON is determined. When it is ON, the process proceeds to a routine SON shown in FIG. 24. When it is OFF, the process proceeds to step #280, where the first AF flag is set. Thereafter, a move count MOVECNT is set to be 80H at step #285, and the in-focus range GZP is set to the smallest in-focus range GZMIN at step #288. Then, whether or not the timer 2 has proceeded to a predetermined count value is determined (step #290). When it has proceeded to the predetermined count value, the process proceeds to a routine APOSET (step #295).

Although the routine APOSET is basically the same as the wait condition, it is different in the following respect: under the wait condition, time passes with no operation being performed; however, under the APOSET condition, the circuit is controlled to be activated at regular intervals. To be specific, when the main switch 145 is ON and the AF switch 146 was not turned on for the last fifteen seconds, the DC/DC converter unit 142 is stopped as well as the clock frequency is decreased to save electric power. After the routine APOSET is completed, the process returns to step #265.

When the timer 2 is determined not to have proceeded to a predetermined count value at step #290, the process proceeds to the next step #300, where whether or not the main switch 145 is ON is determined. When it is OFF, the process enters the wait condition (step #305). When it is ON, the process returns to step #270, and the operations of the succeeding steps are performed. That is, the operations of steps #270 to #300 are repeated, and if the timer 2 has proceeded to a predetermined count value during the operation, the process enters the routine APOSET. If the timer 2 has not proceeded before the main switch 145 is turned off, the process enters the wait condition.

Next, the routine SON shown in FIG. 24 will be described. The routine SON is the main routine of all the routines of the binocular 1. First, whether or not the first AF flag has been set is determined (step #400). When it has been set, it is reset at step #405. Then, the CCD is initially (that is, some data are imitatively inputted, and are accumulated and dumped to stabilize the data later produced by the CCD). After the initialization of the CCD is completed, the CCD is activated. The above-described initialization of the CCD is performed only when the first AF flag has been set at the time of step #400, that is, only when the AF switch 146 is switched from OFF to ON. Since the first AF flag is being reset thereafter, the routine of the initialization is not executed; the process proceeds directly to step #415, where the CCD is activated. The CCD activation consists of accumulating the photo-charge for a predetermined period of time and dumping data corresponding to the amount of the accumulated photo-charge.

After the CCD activation is completed, an object distance is measured at step #420. The object distance measurement includes a calculation of a deviation amount of an image on the comparison portion of the CCD from an image on the reference portion, and a calculation of a contrast of each of the three blocks BL1, BL2 and BL3 (see FIG. 22B) for the AF object distance measurement. The reference and comparison portions of the CCD are provided in a software manner on each of the three blocks for calculating a deviation amount (defocus amount) by the phase-different detection method. With respect to the two images of an object in each AF block separated and formed in a direction along the longer side of the CCD line sensor 25, one corresponds to the image on the reference portion; the other, to the image on the comparison portion.

After the object distance measurement is completed, a low contrast flag is reset to be 0 (step #425), and then a low contrast determination routine is started. In the low contrast determination routine, whether or not the contrast of all the blocks BL1 to BL3 is low is determined. When the contrast of all the three blocks is low, the low contrast flag is set (step #435), and a low contrast processing is started (step #440).

Figure 30:
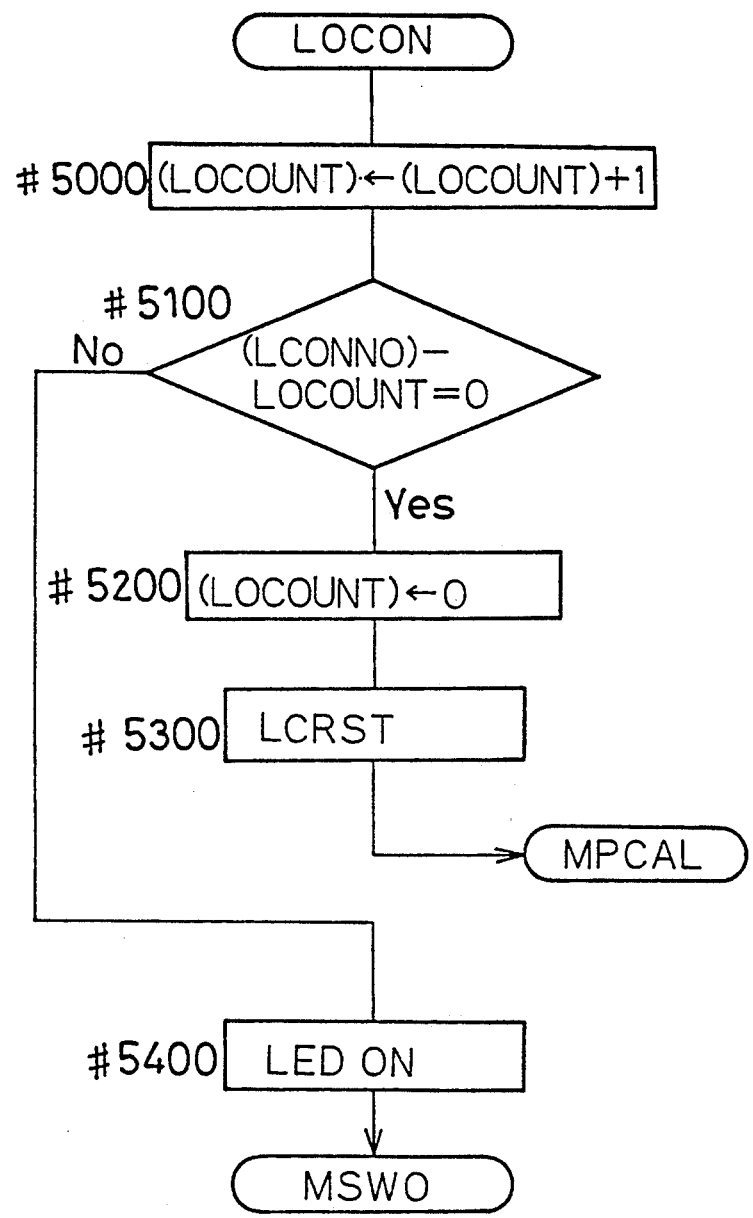

The low contrast processing will be explained referring to the flow chart shown in FIG. 30. In the low contrast flag LOCON, firstly, the count value of a low contrast counter is increased by one to confirm how many times low contrast is detected (step #5000). Then, the process proceeds to step #5100, where whether or not the preset count value LCONNO minus the count value of the low contrast counter equals 0 is determined (step #5100). When it does not equal 0, the process proceeds to step #5400, where the LED is turned on to display a warning, and the process goes to a routine MSWO. When it equals 0, the low contrast counter is reset to 0 (step #5200), and after a low contrast reset routine (see FIG. 28 to be described later) is executed at the next step #5300, the process goes to a routine MPCAL, where the process proceeds to step #550 (see FIG. 24). In the above-mentioned routine MSWO, the process returns to step #300 through step #310 (see FIG. 23).

At step #430 shown in FIG. 24, when the contrast of any one of the three blocks BL1, BL2 and BL3 is not low, the process proceeds to step #445, where whether or not the contrast of the second block BL2 is low is determined. When the contrast of the second block BL2 is not low, the block BL2 is chosen (that is, the data from the second block BL2 is chosen) at step #460. When the contrast of the second block BL2 is determined to be low at step #445, the process proceeds to the next step #450, where whether or not the contrast of the first block BL1 is low is determined. When the contrast of the first block BL1 is low, the third block is chosen (step #470) since the third block is the only block whose contrast is not low. When the contrast of the first block BL1 is determined not to be low at step #450, whether $|XM1-XMM| > |XM3-XMM|$ or not is determined (step #455). When $|XM1-XMM|$ is larger, the third block BL3 is chosen (step #470). When it is not larger, the first block BL1 is chosen (step #465). In the above inequality, XM1 represents a deviation amount of an image in the first block BL1 calculated in the current operation, XM3 represents that of an image in the third block BL3 calculated in the current operation, and XMM represents a deviation amount (a deviation amount corresponding to the present position of the lens) calculated in the last operation.

As described above, the second block BL2 is given priority in this embodiment. Since, when an object is viewed through a binocular, the object is situated in the center of a field frame 160 as shown in FIG. 22A, it is reasonable to preferentially use the distance measurement data of the central block in a distance measurement area 161, that is, the second block BL2. When the contrast of the second block BL2 is low, of the data of the first and third blocks BL1 and BL3, the data having the smaller shift amount from the present position of the lens is adopted (steps #450 to #470).

After a block is chosen as described above, information on which block is chosen is loaded into a memory (step #475). Since that a block is chosen means that the contrast is not low, the LED for displaying a warning of low contrast is turned off (step #480).

Figure 31:
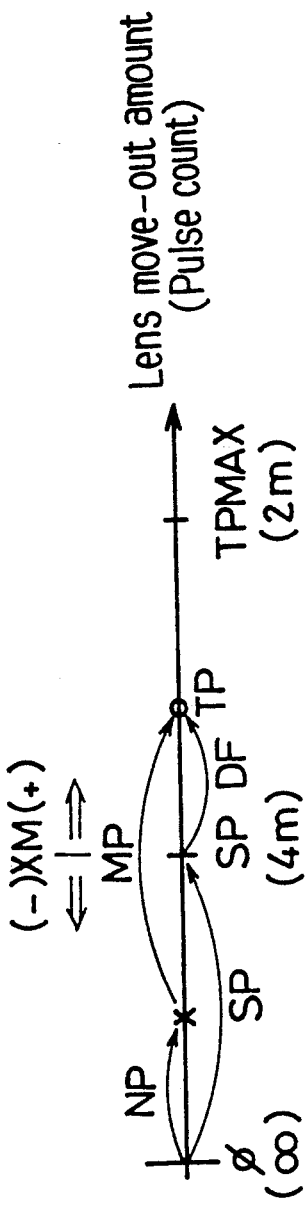
FIG. 31 is an explanatory view of the flow charts shown in FIGS. 23 to 30.

As shown in FIG. 31, the lens can be shifted from the infinity ($\infty$) position to a 2 m position. A shift direction flag showing in which direction from a 4 m position (which is the central position) the lens is shifted is reset to be 0 (step #485). Thereafter, the sign of a shift amount XM is plus or minus is determined (step #490). A focal point detection module is set so that the shift amount is measured as 0 when an object distance is 4 m. As shown in FIG. 31, the shift amount at the central position (the 4 m position) is 0, and the shift amount on the near (2 m position) side is plus and that on the infinity side is minus. When XM is minus, the shift direction flag is set (step #500). Therefore, when the shift direction flag has been set, the lens is situated on the infinity side of the 4 m position. After the shift direction flag is set at set #500, DFK is made into DFKM. The sign of DFK corresponds to that of XM, and M of DFKM indicates that the sign of DEKM is minus (that is, on the infinity side). When XM is on the (+) side at step #490, DFK is made into DFKP at step #495. P of DFKP indicates that the sign of DFKP is plus (that is, on the near side).

After the operation at the above-described step #495 or #505 is completed, the process proceeds to step #510. A shift pulse count DF is a value obtained by multiplying the above-mentioned shift amount XM by DFK. DFK is a constant to convert the shift amount XM into a pulse count (a pulse count for driving the motor). At the next step #515, whether the shift direction flag has been set or reset is determined. When the shift direction flag has been set, since the object is situated on the infinity (−) side from a position of 4 m distant, the process proceeds to step #520 (shown by an arrow 1), where (SP-DF) is substituted as a target position pulse count TP. SP is a pulse count between the infinity position ∞ and the 4 m position (reference position) as shown in FIG. 31. After step #520, the process proceeds to step #525, where whether the above-mentioned TP is larger or smaller than 0 is detected. When TP is smaller than 0, it is increased to be 0 at step #530, and then, the process proceeds to step #550. When TP is larger than 0, the process proceeds directly to step #550. To prevent an erroneous operation in driving the motor when TP becomes smaller than 0 affected by noises, etc., in a CCD, etc., for detecting a shift amount, whether or not TP is smaller than 0 is detected at step #525 and when it is smaller, it is increased to be 0 at step #530 as described above.

When the shift direction flag has not been set at step #515 (shown by an arrow 0), since the object is situated on the near side from a position of 4 m distant, i.e. the (+) side, the target position pulse count TP is a value obtained by adding the shift pulse count DF to the pulse count SP between the infinity position ∞ and the 4 m reference position (SP+DF) (step #535). At the next step #540, whether or not the above-described TP is larger than TPMAX is determined. When TP>TPMAX, after the value of the TP is reduced to that of the TPMAX, the process proceeds to step #550. When TP≦TPMAX, the process proceeds directly to step #550. TPMAX represents a maximum lens movement amount, that is, pulse count up to the 2 m position.

The operations from step #550 are performed not only after the above-described steps but also when the process enters the routine MPCAL. First, at step #550, a motor drive mode MMD is set to be 0. At the next step #555, a drive pulse MP is set to be a value (TP-NP). The (TP-NP) represents a pulse count between the present position and a target position. Then, at step #560, whether the above-mentioned MP is plus or minus is determined. When it is minus, (NP-TP) is set to be MP, and X which indicates whether the direction in which the lens should be moved to be in-focus is plus or minus is set to be 1. When the MP is plus at step #560, X is set to be 0 at step #575. In the above description, MP, TP, NP and SP are address names of RAM; X is a register name of a CPU. The content of the register X indicates plus or minus against the present position at the above-described step and the later-described step #625; however, it is used for other various purposes in another flow to be described later.

After the above-described step #570 or #575, the process proceeds to step #580, where an in-focus zone pulse count GZP is subtracted from the drive pulse count MP. Then, whether the result of the subtraction is plus or minus is determined at step #585. When it is minus, the motor is not driven since the lens is situated within the in-focus zone. That is, when the result is minus, the process proceeds to step #590, where a count value MOVECNT for counting a motor drive designation pulse count is set to be 0. Then, at step #595, whether or not BC (battery check) reset flag has been set is determined. When it has been set, after the BC reset flag is reset at step #600, the process proceeds to step #605 where it enters a routine BCNG. When the BC reset flag has not been set, the process proceeds to step #610 where it enters a routine MSWO. In the routine MSWO, after the timer 2 is set at step #310 shown in FIG. 23, the process proceeds to step #300. In the above-mentioned routine BCNG, the process returns to step #240, where a warning is displayed. At the above-mentioned step #585, when (MP-GZP) is determined to be plus, the process proceeds to step #615 where a motor drive routine MOVE is executed since the shift amount is larger than the in-focus zone. The routine MOVE will hereinafter be described referring to FIG. 25.

In the routine described in the flow chart in FIG. 25, first, whether or not a register has a preset flag is determined at step #620. When it has the present flag, the process jumps to step #655 to drive the motor unconditionally. When it does not have the preset flag, the process proceeds to step #625. As an example of the preset flag, the low contrast flag, etc., is cited. At the above-mentioned step #625, whether the shift is directed toward the infinity side or toward the near side of the present position is determined. The determination is made according to the value of the above-described X (that is, whether X=1 or X=0). When X=1 (that is, the shift direction X is toward the infinity side of the present position), the process proceeds to step #655 to drive a motor. When X=0 (that is, the shift direction X is toward the near side of the present position), the process proceeds to step #630, where whether or not the present position exceeds a predetermined limit value LIMIT is determined. When the present position exceeds the LIMIT to be situated on the near side, which means not that an object passed close by while a user is looking at a distant object but that a user was previously looking at a close object, the process proceeds to step #655 to drive the motor.

However, even if the present position NP is on the near side at step #630, when the present position NP is at the predetermined limit value LIMIT or does not reach it, the process proceeds to step #635 where two times of the in-focus zone GPZ×2 is calculated. Then, at step #640, whether or not the pulse count MP up to a target position is less than the predetermined value GPZ×2 is determined. When GPZ×2≧MP, the process proceeds to step #655 to drive the motor. When GPZ×2<MP, that is, when a shift amount up to a target position is shifted toward the near side by an amount more than the predetermined value (GPZ×2), the count value MOVECNT indicating the number of distance measurements is increased by one at step #645. At the next step #650, whether or not the count value exceeds a predetermined count value is determined. MOVENO2 in the step #650 in FIG. 25 is a constant representing the predetermined number of times of distance measurement. As the predetermined number of times, three or four times is chosen, which is not necessarily three or four.

When the number of distance measurements is equal to or less than the predetermined number at step #650, the process proceeds to a routine MSWO, where the motor is not driven. However, when the number exceeds the predetermined number, the process proceeds to step #655 to drive the motor. This means that when a shift amount at step #645 is more than the predetermined amount, the motor is not driven as a rule since there is a strong possibility that something passed between a user and an object, and that when the above shift is detected predetermined times, the motor is driven since there is a strong possibility that a user intentionally looked at a close object.

At step #655, the low contrast reset flag is reset. The low contrast reset flag is a flag set for moving a lens to a predetermined position when the contrast is low and for skipping the above-mentioned steps #625 to #650. It is reset here since it has completed the function thereof. Next, at step #660, the count value of a distance measurement counter is set to be 0. Then, at step #665, data included in the register X and representing a shift amount is loaded into a register A. At the next step #670, with respect to a motor rotation direction flag MHF, a direction A (the content of the register A) of the current operation is subtracted from MHF representing a direction before the distance measurement (a rotation direction of the last operation). At step #675, the direction A of the current operation is set to be the rotation direction flag MHF. Next, after a flag (BCH flag) representing that a backlash correction has been completed is reset at step #680, whether MHF−A=0 or not is determined at step #685. When MHF−A=0 (that is, the direction is the same as that of the last operation), the process proceeds to step #700. When MHF−A≠0 (that is, the direction is opposite to that of the last operation), a backlash correction value BCH is loaded into a register BCCOUNT at step #690, and the BCH flag is set at step #695. The above-described steps #685 to #695 are a routine for previously preventing a shake caused by a backlash when the motor rotates in a direction opposite to that of the last operation. The correction value of a backlash is added to a pulse count since, when a motor rotates in the opposite direction, a shake is caused by a backlash of a gear, which results in slipping despite the existence of pulses during the backlash.

Next, at step #700, an acceleration/reduction pulse count of the motor is set. That is, with respect to the control characteristics of the motor shown in FIG. 16, the pulse counts of the acceleration period (with respect to a mode, MMD=0) and the reduction period (MMD=2) are determined. The pulse counts of the acceleration period and the reduction period are set to be the same pulse count VPN, and by doubling the VPN (VPN×2), a total pulse count of the acceleration period and the reduction period is obtained. After the step #700, the process proceeds to step #705, where a maximum pulse rate MLPR is inputted into a pulse rate NPR as the initial value. Specifically, a numerical value for producing 300 pps which is the first pulse rate of the acceleration period of the speed control characteristic of the motor shown in FIG. 16. Then, at step #710, whether or not the pulse count MP up to a target position is smaller than a value obtained by adding 1 to the total pulse count of the acceleration and reduction periods (VPN×2+1) is determined. In FIG. 16, MP is a pulse count corresponding to a period from a starting to a stopping of the motor. At the determination, when MP is smaller than (VPN×2+1), the process proceeds to step #715, where a motor drive mode MMD is set to be 3. MMD=3 means that the motor is driven at a low speed from the starting since the distance between the present position and the next position is short. On the contrary, when MP is equal to or larger than (VPN×2+1), MP is set to be a value obtained by subtracting an acceleration value VPN from the value of MP of the last operation.

Figure 33:
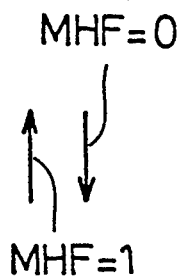
FIGS. 33 to 36 are explanatory views in support of FIGS. 23 to 30 of the abovementioned flow charts.

After the above-described steps #715 and #720, motor drive data are set at step #725 or #730. First, at step #725, data of an address DAM of the RAM are inputted into the register X of the CPU. At step #730, MDATA0, X (drive data shown in FIG. 33) are inputted into the register A. Thereafter, whether the low contrast flag is 1 or not is determined at step #735. When it is 1, after a port A bit 5, to which the LED 148 and the stepping motor 22 are connected, of the microcomputer 30 is set to be 0 (when it is set to be 0, the LED 148 becomes ready to operate), the process proceeds to step #745. When the low contrast flag is 0, the process proceeds to step #745 with the port A bit 5 being equal to 1 (that is, the motor is ready to operate). At step #745, the content of the register A is given to a motor drive data output P5.

Next, at step #750, whether the battery check flag is 1 or not (that is, whether the battery is checked or not at the time of motor driving) is determined. The reason why whether the battery is checked or not is determined at the time of motor driving is that in this embodiment, the battery is checked not while the AF switch 146 is ON but when the AF switch 146 is turned on.

First, the case where the AF switch 146 is turned on will be described. The battery is checked at step #230 shown in FIG. 23. When the battery voltage is sufficient, the battery check flag is set at step #250. When the AF switch 146 is turned on under the above condition, the process proceeds from step #270 to the routine SON. At this time, the battery check flag is determined to be 1 at the above-mentioned step #750. Therefore, the battery is checked at the next step #760. When the battery check is completed, whether the battery voltage is sufficient or not, the battery check flag is reset to be 0 at step #770 or #785. Even if the AF switch 146 continues to be ON under the above condition (that is, even if the AF switch is determined to be ON at step #270), since the battery check flag is being reset, step #760 where the battery is checked is skipped when the process proceeds again to step #750. Therefore, the battery is not checked.

Next, the case where the AF switch is turned off will be described. When the AF switch is turned off, the process proceeds from step #270 to step #280, where the process enters the routine APOSET when the timer 2 proceeded to a predetermined count value. In the routine APOSET, where the battery check flag is set, the AF switch is turned on again. Consequently, the process proceeds to step #270 and enters the routine SON. When the process proceeds to step #750, the battery check flag is determined to be 1, so that the battery is checked.

As described above, the battery check at the time of motor driving is performed when the AF switch 146 is turned on; it is not performed when the AF switch is ON.

At the above-mentioned step #750, when the battery check flag is 0, the process proceeds to step #790; when it is 1, the process proceeds to step #755, where the process waits for 1 ms. That is, when, in a circuit shown in FIG. 32, the level of two of the signals φ1 to φ4 is made to be low and electric current is applied to the coils, since the voltage is unstable just after the application, the process waits for the voltage to become stable. Otherwise, the battery cannot accurately be checked since the electric potential of a J point used for the battery check is also unstable. After waiting for the voltage to become stable at step #755, the process proceeds to step #760 where the battery is checked. The result of the battery check is determined at step #765. When the battery voltage is not sufficient, the BC flag is reset at step #770, and after the battery check resetting routine is executed at step #775, the process enters the routine MPCAL (step #780).

Figure 28:
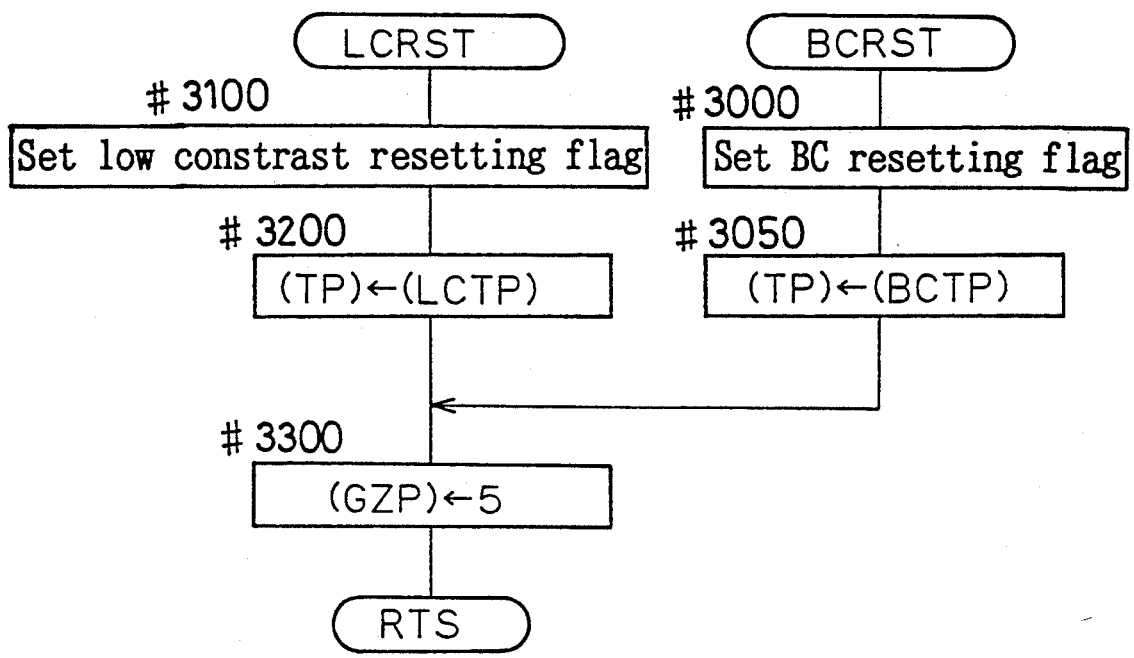

Now, a predetermined position resetting routine at the time of battery check and low contrast will be described referring to FIG. 28. First, at the time of battery check, a battery resetting flag for moving the lens to a predetermined position is set at step #3000. Then, at step #3050, a predetermined position BCTP at the time of battery check is inputted as a target position pulse count TP. When the contrast is low, the low contrast resetting flag is set at step #3100. Then, the process proceeds to step #3200, where a predetermined position LCTP at the time of low contrast is inputted as a target position pulse count TP. When the above predetermined positions are infinity, TP is equal to 0; when they are 50 m, TP is equal to a pulse count corresponding to that. At the next step #3300, the in-focus range GZP is reduced to the range of five pulses, and the process returns. To make it easier to move the lens to a predetermined position, the in-focus range GZP is reduced at the above-mentioned step #3300. That is, since a wide in-focus zone is previously provided on the infinity side according to steps #820 and #825 in the routine MOVE, when the lens is driven to a predetermined position in the predetermined position resetting routine, the lens is not driven if the lens is situated in the wide in-focus range. Therefore, the in-focus range is reduced in this routine. In this embodiment, GZP is set to be the range of five pulses. It is natural that the in-focus range GZP be set to be smaller than an infinity in-focus range GZMAX to be described later. If it is set to be smaller than a near position in-focus range GZMIN, the effect of the predetermined position resetting increases.

Returning to FIG. 25, when the battery voltage is determined to be sufficient at the above-mentioned step #765, the battery check flag is reset at step #785, and then, the process waits for 1.5 msec at step #790. The process waits at step #790 so that the width of the first pulse when the motor is driven becomes wide. By increasing the width of the first pulse, sufficient torque is more easily obtained at the time of starting of the motor.

Figure 36:
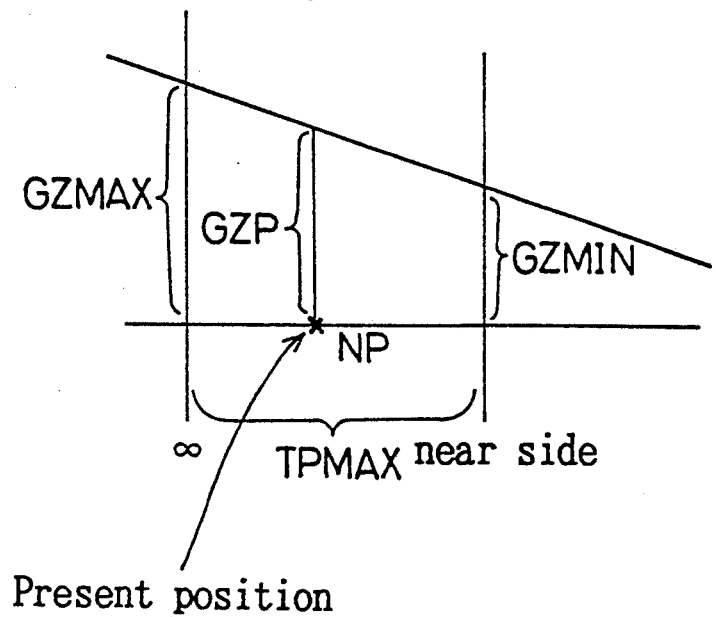

Next, at step #795, the content of the address DAM of the RAM is inputted into the register X. Then, the process proceeds to step #800, where the motor drive routine MOVE is executed. After the motor drive routine MOVE is completed, whether or not the battery check resetting flag is 1 is determined at step #805. The battery check resetting flag is 1 when the lens is moved to a predetermined position at the time of battery check. When the battery check resetting flag is 1 at the above-mentioned step #805, after the battery check resetting flag is reset to be 0 at step #810, the process enters a routine BCNG. When the battery check resetting flag is 0 at step #805, the in-focus range is calculated at steps #820 and #825. Specifically, the in-focus range is changed according to a distance from an object. That is, an in-focus range differs among users and the ages of users, and generally, in the natural world, the contrast becomes lower as a distance from an object increases. On that account, the difference among distance measurement data increases, so that it becomes possible that the lens is inadvertently moved (hunting phenomenon). To prevent this, a wider in-focus range is provided as the range moves closer to the infinity side according to a distance to an object. NP corresponds to the present position. GZK shows a curve of an in-focus range characteristic shown in FIG. 36. From the relation shown in FIG. 36, GZK is defined by the following equation:

$$GZK = (GZMAX - GZMIN)/TPMAX$$

wherein GZMAX represents an infocus range at an infinity position, GZMIN represents an in-focus range at the nearest position, and TPMAX represents a distance between the infinity and the nearest positions. At step #820, NP and GZK are multiplied. At step #825, the in-focus range GZP is obtained by calculating the difference between the maximum GZMAX of GZ and NP×GZK.

The main routine is completed at the above-described step #825. Next, the motor drive routine at the above-mentioned step #800 will be explained referring to FIG. 26.

Figure 26:
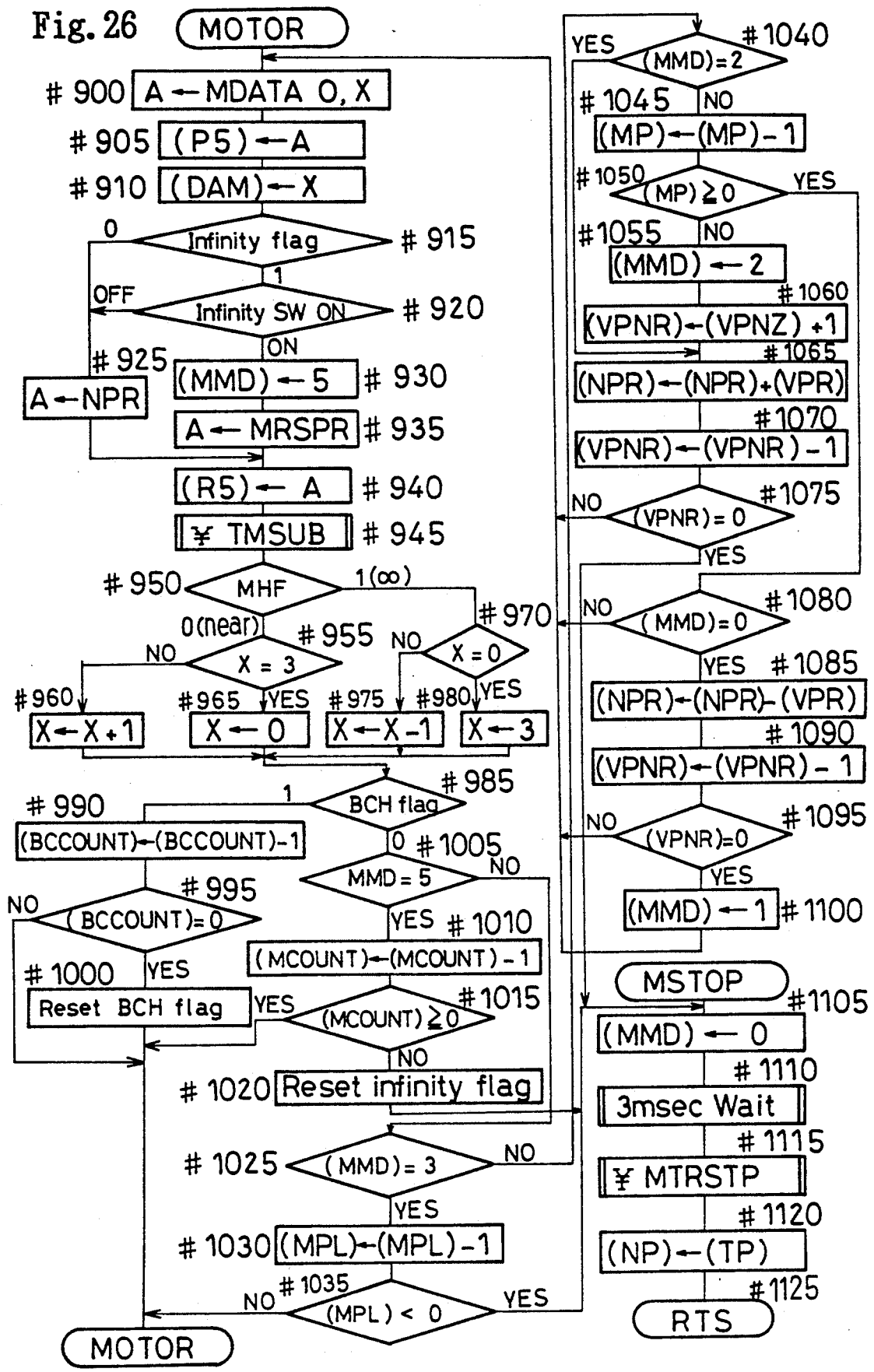

In FIG. 26, first, the motor drive data MDATAO, X are inputted into the register A of the CPU at step #900. MDATAO represents the motor drive data shown in FIG. 33, and X represents that the data is the Xth data. Then, the content of the register A is read out and supplied to the output port P5 at step #905, and the content of register X is inputted into the address DAM of the RAM at step #910.

Next, whether or not an infinity flag is 1 is determined at step #915. The infinity flag becomes 1 when the process passes through a routine INFINITY shown in FIG. 29. When the infinity flag is 1, the process proceeds to step #920, where whether or not the infinity switch 147 is ON is determined. When it is ON, the mode MMD is set to be 5 at step #930. The MMD5 is a mode for driving the motor at a constant speed after the lens turned on the infinity switch 147. Next, at step #935, a constant-speed drive rate MRSPR is inputted into the register A at step #935. The constant-speed drive rate MRSPR is 400 pps in this embodiment. After step #935, the process proceeds to step #940. When the infinity flag is 0 at the above-mentioned step #915, or when the infinity switch 147 is OFF at step #920, after an initial value of the counter is inputted into the register A at step #925, the process proceeds to step #940.

At step #940, the content of the register A is inputted into a register R5. The counter reaches time-up when the value of the register A is counted down to 0. Step #945 is a sub-routine of the timer; specifically, the process waits for the time-up. In other words, the value of the pulse rate is examined. And, a time is set according to the pulse rate.

Next, at step #950, a flag MHF showing a direction from a present position is determined. When the flag MHF shows an infinity direction, whether X=0 or not is detected at step #970. When the relation among the motor drive data is as described in FIG. 33, since X is changed in the order (direction) of 3→2→1→0→3 when MHF=1, whether X=0 or not is determined at step #970. When X=0, X is set to be 3; when X≠0, X is set to be X−1.

When MHF=0, since X is changed in the order (direction) of 0→1→2→3→0, when MHF is determined to be on the near side (=0) at step #950, whether X=3 or not is judged at step #955. When X=3, X is set to be 0 (step #965); when X≠3, X is set to be X+1 (step #960).

After X is set (that is, the data showing the order of the motor drive data is inputted into the register X), the process proceeds to step #985, where whether or not the backlash flag (BCH flag) is 1 is determined. When the BCH flag is 1, the count value of a backlash counter is decreased by one at step #990. At the next step #995, whether or not the counter value of the backlash counter becomes 0 is determined. When it does not become 0, the process returns to the first step #900 of this routine; when it becomes 0, the BCH flag is reset to be 0 at step #1000.

In this backlash correction routine, the motor is driven at a constant speed with a minimum pulse rate (low speed). The following is the reason: the motor is in the condition of idling where the motor is not being loaded during the backlash correction, and since there is a possibility that the load suddenly increases to put the motor irregular condition when the backlash correction is completed, it is required to drive the motor with a pulse rate having high torque.

Figure 34:
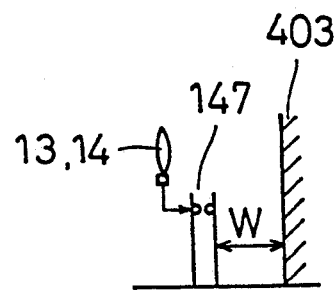

When the BCH flag is 0 at the above-mentioned step #985, whether the mode MMD=5 or not is determined at step #1005. When MMD=5, a count value MCOUNT corresponding to the drive pulse of a distance W shown in FIG. 34 is decreased by one at step #1010, and at the next step #1015, whether MCOUNT≧0 or not is determined. When MCOUNT≧0, the process returns to the first step #900. When MCOUNT<0, after the infinity flag is reset to be 0 at step #1020, the process proceeds to a motor stopping routine MSTOP.

Practically, it is preferable to set the counter value MCOUNT to be higher than the pulse count corresponding to the distance W, because the distance relatively varies according to the difference of the strokes, for turning on the infinity switch 147, of the metal plate. By setting the counter value as described above, when the lens moving system collides with a stop plate 403 (described as a supporting plate 53 in the explanation of FIGS. 9 to 11) the lens moving system is prevented from being broken because of a working of a gear clutch. In moving the lens to the infinity position, or a reference position, the lens is moved not up to a point at which the infinity switch 147 is turned on but further to the stop plate 403. This is because a mechanical stopping is more reliable and accurate than an electrical stopping. However, if it is also reliable and accurate to move the lens to the point at which the infinity switch 147 is turned on, the point at which the infinity switch is turned on to stop the motor can also be applied as the infinity position. Then, the control operation is facilitated and the above-described gear clutch is no more required.

When MMD≠5 at the above-mentioned step #1005, whether MMD=3 or not is determined at the next step #1025. When MMD=3, a distance MPL by which the lens is moved is decreased by one at step #1030, and at the next step #1035, whether MPL<0 or not is determined. When MPL≧0, the process returns to the first step #900 of this routine; when MPL<0, the process proceeds to the motor stopping routine MSTOP. In this case, the distance is represented by MPL (L stands for low order) since the data exists only in the lowest 8 bits of the register MP because the distance is short.

Figure 35:
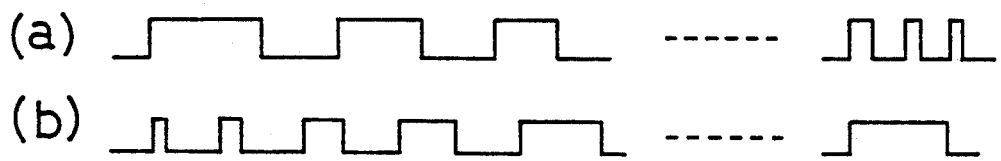

When MMD≠3 at step #1025, the process proceeds to step #1040, where whether MMD=2 or not is determined. As described above, the condition of MMD=2 corresponds to the reduction period. When MMD=2, the process proceeds directly to step #1065. When MMD≠2, since this means that MMD equals 1 or 0, MP is decreased by one at step #1045, and whether MP≧0 or not is determined at the next step #1050. When MP<0, since this means that the mode changes from MMD=1 to MMD=2, MMD is set to be 2 at step #1055, and a pulse count VPNR at MMD=2 is set to be (VPNR+1) at step #1060. The pulse count VPNR is previously increased by one at step #1060 because the pulse count becomes short by one during the reduction period. Otherwise, correct determination could not be made at the succeeding step #1075. When the mode changes to MMD=2 or it is originally MMD=2 at step #1055 (that is, when MMD is judged to be 2 at step #1040), a predetermined value VPR is added to the present pulse rate NPR at step #1065. This is for sequentially increasing a pulse width, as shown in FIG. 35B, to decrease the rotation speed of the motor as much as possible when MMD=2 (that is, during the reduction period).

At the next step #1070, to reduce a predetermined pulse count every time, the pulse count is set to be (VPNR−1). At step #1075, whether or not the pulse count becomes 0 is determined. When it is not 0, the process returns to the first step #900. When it becomes 0, the process proceeds to a motor stopping routine MSTOP.

At the above-mentioned step #1050, when MP≧0, that is, when the mode is not changed, the process proceeds to step #1080, where whether or not the mode MMD=0 (that is, an acceleration period) is determined. When MMD≠0, the process returns to the first step #900, and the routines starting at step #900 are executed. The process finally proceeds to step #1055 by way of the above-mentioned step #1050. However, when MMD=0 at the above-mentioned step #1080, the pulse rate is set to be the difference between the present pulse rate and a predetermined value VPR at step #1085. This is because a pulse width is sequentially reduced in accelerating the motor as shown in FIG. 35A. At the next step #1090, the pulse count is reduced by 1, and whether or not the value becomes 0 is determined at step #1095. When it does not become 0, the process returns to the first step #900; when it becomes 0, the next mode MMD=1 is formed at step #1100, and the process returns to the first step #900.

Next, in the motor stopping routine MSTOP, the mode MMD of the motor is set to be 0 at step #1105. This is because the motor should be in the initial condition (MMD=0) when it is activated again after being stopped. Next at step #1110, the process waits for 3 msec to obtain a long pulse width in stopping the motor as well as in starting the motor. By this, the motor stops smoothly. Thereafter, the motor is stopped at step #1115. Specifically, the level of all the motor drive output ports of the microcomputer 30 are set to be high (therefore, $\phi 1 = \phi 2 = \phi 3 = \phi 4 = 1$). Finally, the target position TP is set to be the present position NP at step #1120, because the lens has reached the target position TP and the target position has become the present position NP.

Figure 32:
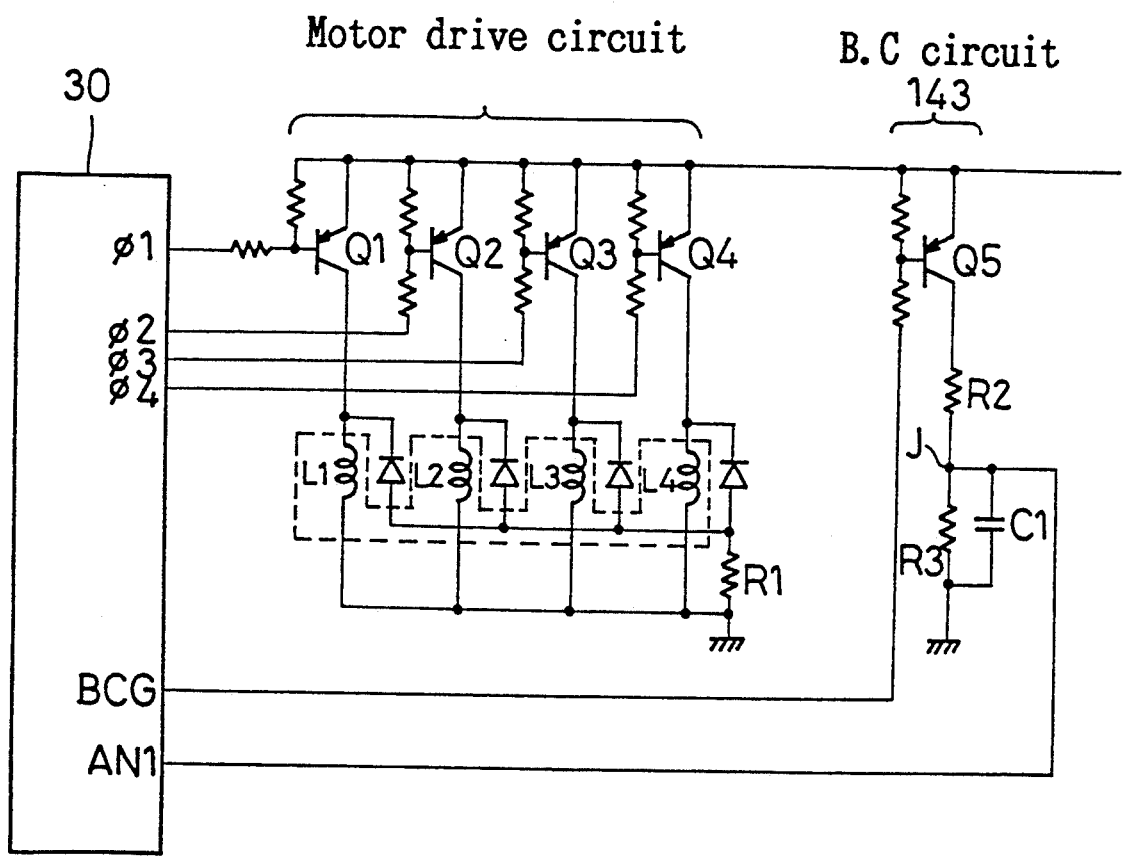
FIG. 32 is a circuit diagram of a battery check circuit.

Next, the battery check routine will be described referring to FIG. 27. First, at step #2000, the level of the BCG terminal of the microcomputer 30 is set to be low. By this, a transistor Q5 of a battery check circuit shown in FIG. 32 is turned on to apply its collector current. Since the collector current charges a condenser C1 at first, a voltage of a middle junction point J of resistances R2 and R3 increases and never be constant during the charging. Therefore, at step #2005, the process waits for a period sufficient for the charging of the condenser C1 to be completed. Thereafter, the memory of a RAM (high order byte CAL. H, and low order byte CAL. L) where measurement data are stored is cleared, and 8 is inputted in the register X of the CPU to set the measurement number to be 8 (step #2020). After the register A is set to be 0 at step #2025, an A/D (analog to digital) converter is started at step #2030 to convert the voltage obtained from the point J shown in FIG. 32 and inputted into the microcomputer 30 from an analog quantity to a digital quantity. After the process waits for the A/D converting operation to be completed at the next step #2035, a carry flag CY is set to be 0 at the next step #2040, and data ADRR representing the voltage of the point J is added to the content of the register A at step #2045. After the addition, whether or not the carry flag CY is 1 is determined at step #2051. That is, when an overflow is caused as a result of the addition, CY equals 1, so that the process proceeds to the next step #2052, where CAL. H is increased by one. In the above-described data addition, eight measurement data are added one by one. At step #2055, a number X with respect to the measurement number is reduced by 1. At the next step #2060, whether the number X becomes 0 or not is determined. When it does not become 0, the process returns to step #2030 and the routine starting at step #2030 is repeated. After the routine starting at step #2030 is repeated eight times, the number X becomes 0, and then, the process proceeds to step #2062, where the value of the register A is inputted into CAL. L. The value is the low order byte of the added measured value. Next, the process proceeds to step #2065, where the level of the terminal BCG of the microcomputer 30 is set to be high (that is, BCG=1). By this, the transistor Q5 is turned off, so that the voltage of the point J decreases as the electric charge of the condenser C1 is discharged to become a ground potential (initial condition).

At step #2070, to obtain the average value of the eight measurement values, the total of the measurement values is divided by eight, and the obtained average value is stored in the register A. (CAL. H) and (CAL. L) show the high order byte and the low order byte, respectively, as shown when steps #2010 and #2015 were described. The data calculated at step #2070 as described above are stored in an address ANODATA of the RAM from the register A at the next step #2075. Next, at step #2080, the value X added to a reference value of the battery check is set to be 0.

Then, whether a battery check flag is 1 or not is determined at step #2085. When it is 1, the above value X is set to be 0.2, and the process proceeds to step #2095. When it is not 1, the process directly proceeds to step #2095. This is because the reference value for the determination should be different between when the battery check flag is 1 and when it is not 1. At step #2095, the reference value is subtracted from the data A. At the next step #2100, whether the subtraction result is smaller than 0 or not is determined. Naturally, the above judgement of whether the subtraction result is smaller than 0 or not is a determination of whether A < (E·BCLK+X) or not. Here, for example, E·BCLK is 4.0 V and the value X is 0.2 V. Therefore, the reference value is 4.0 V when the battery flag is not 1, and 4.2 V, when the battery flag is 1. The reference value of 4.0 V is the limit value of the motor driving, and therefore, the motor cannot be driven when the battery voltage is smaller than 4.0 V. Accordingly, the battery voltage is determined to approach the limit value of the motor driving when it is reduced to 4.2 V (the reference value of 4.0 V+0.2 V). The reference value of 4.2 V is provided because it is necessary to reserve a sufficient voltage for moving lens to the predetermined position before the motor driving becomes impossible. In the battery check when the main switch is turned on (step #230 shown in FIG. 23), the reference value is 4.0 V since the battery check flag is not 1, and the battery check is performed based on whether or not the average value of the eight detected values is smaller than 4.0 V. On the other hand, in the battery check (step #760 in FIG. 25) during an AF operation (that is, when the motor is driven), the reference value is 4.2 V since the BC flag is 1, and the battery check is performed based on whether or not the average value of the eight detected values is smaller than the reference value 4.2 V.

Next, as a result of the above battery checks, when the data are smaller than the reference value, after the carry flag is set to be 1 at step #2105, the process returns; when the data are larger than the reference value, the process directly returns. The determination of whether or not the battery voltage is sufficient at steps #235 and #765, respectively, after the battery check of steps #230 and #760 is performed based on whether the carry flag is 1 or not. That is, the battery voltage is determined to be sufficient when the carry flag is 0 (CY=0); it is determined not to be sufficient when the carry flag is 1 (CY=1).

Figure 29:
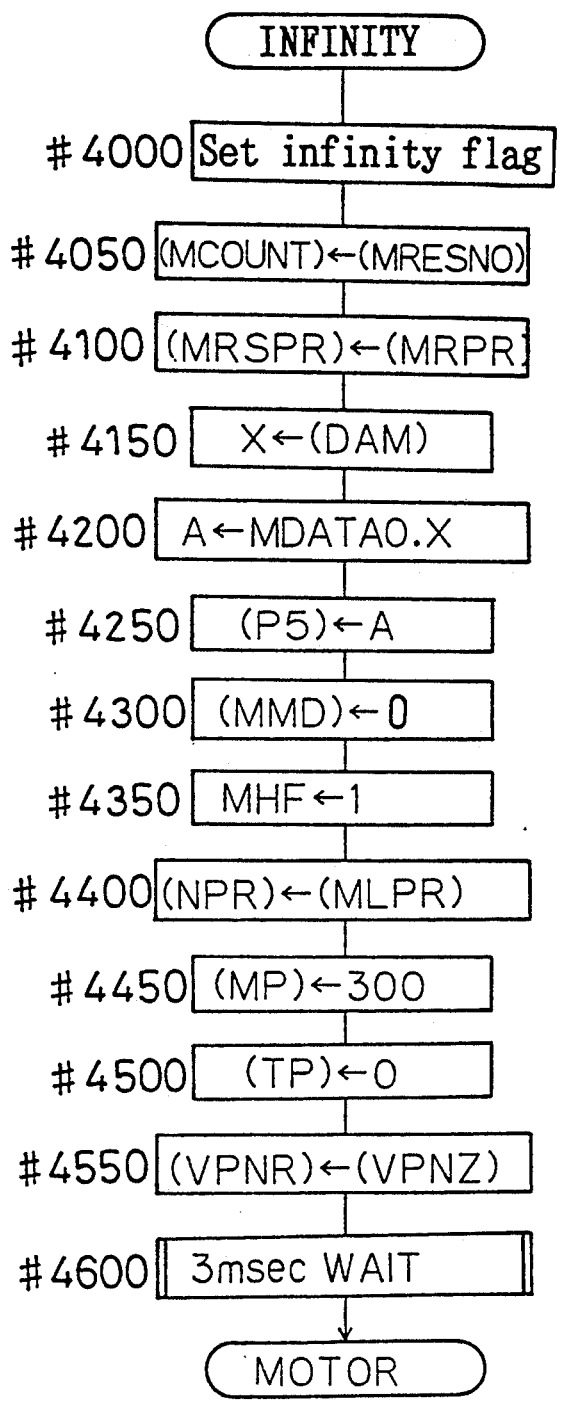

Next, a routine INFINITY shown in FIG. 29 will be described. The routine INFINITY is always executed when the main switch 145 is turned on as performed at step #260 of the routine RESET shown in FIG. 23. In the routine INFINITY, first, the infinity flag is set at step #4000, and a pulse count MRESNO representing the distance W (see FIG. 34) from a lens position when the infinity switch is turned on to the stop plate is provided in the infinity counter MCOUNT (step #4050). Next, at step #4100, a pulse rate MRPR for motor drive when the infinity switch is ON is provided in a MRSP of the RAM. When the infinity switch is ON, since the load to the pulse motor is larger than usual, the pulse rate is set to be smaller than usual to increase torque of the motor.

Next, at step #4150, the content of the address DAM of the RAM is inputted into the register X of the CPU, and at step #4200, the motor data MDATAO. X is inputted into the register A. Then, the content of the register A is read out and supplied to the output port P5 at step #4250. At step #4300, the motor mode MMD is set to be 0, and at step #4350, the flag MHF is set to be 1. The flag MHF is set to be 1 because the lens is always moved to the infinity position ∞ in this case. Next, at step #4400, the lowest pulse rate at the time of starting of the motor is made to be the motor drive pulse rate. At step #4450, a pulse count of 300 which covers from the infinity position ∞ to the near side is made to be MP. At step #4500, TP is set to be 0, and at step #4550, VPNR is set to be in its initial condition. At step #4600, the process waits for 3 msec until the motor starts to rotate, and jumps to a motor drive routine MOTOR shown in FIG. 26.

In the above-described embodiment, the lens is moved to a predetermined position when the battery voltage becomes equal to or smaller than a predetermined value (reference value), and after the lens movement is completed, the AF operation is stopped. This operation will be described referring to the above-mentioned flow chart. When the main switch 145 is ON and the AF switch 146 are turned on, the process proceeds to step #760 by way of step #750 shown in FIG. 25, where the battery check is performed. Then, when the battery voltage is determined not to be sufficient at the next step #765, steps #770 and 775 are executed, and the process enters the routine MPCAL and returns to step #550. At that time, a predetermined position is set at step #775 (see FIG. 28). Next, when the process again proceeds to step #750 shown in FIG. 25, since the battery check flag has been reset to be 0 at the above-described step #770, the process proceeds to steps #790 and #795, and finally to #800, where the lens is moved to the above-mentioned predetermined position by the motor. Thereafter, the process proceeds to step #805. Since the battery check reset flag is set in a battery check reset routine (shown in FIG. 28) corresponding to the above-mentioned step #775, the process proceeds to step #810 and enters the routine BCNG (step #815). The process further proceeds to step #240 shown in FIG. 23, and the AF operation is not performed.

In the above-described implementation, in order to obtain an in-focus condition on an object, the lens movement amount is calculated by processing at the system controller 140 an electric signal obtained based on the image of the object formed on the CCD line sensor 25 at the focusing condition detection module 19; the calculation result thereof is transmitted to the motor 22 as an electric signal; and by rotating the motor 22 by a necessary amount, the objective lenses 13 and 14 move forward or backward through the reduction gear unit 23 connected to a rotating shaft of the motor 22.

Hereupon, the operations, from when the AF switch 146 is turned on to when the electrical signal representing a lens movement amount is transmitted to the motor, are performed in an instant in a manner of electronic circuit, the time required for the operations may be ignored. The problem is the time spent by mechanism systems driven by electric signals. In this embodiment, the movement speed of the lens is determined by the reduction ratio of the reduction portion 23 of the reduction gear unit 23 and the rotation amount of the motor 22. Since the movement speed of the lens corresponds to the time required for obtaining an in-focus condition in an AF operation, it is not proper to set the speed to an extremely low value because of the above-described reason.

The accommodation speed of the human eye from the natural condition (the farthest point that can clearly be viewed by the naked eye, that is, the infinity point) to the near point (the nearest point that can clearly be viewed by the naked eye) is approximately one second; that from the near point to the far point is approximately 0.6 seconds (quoted from 56 page of "Science of the Eye" by Masao Nita, second edition of the revision, published by Bunkoudou Ltd.). Thereupon, in this embodiment, the setting of the motor 22 and the reduction gear unit 23 makes the movement speed of the objective lenses 13 and 14 between the near point and infinity shorter than 0.6 seconds.

Figure 37:
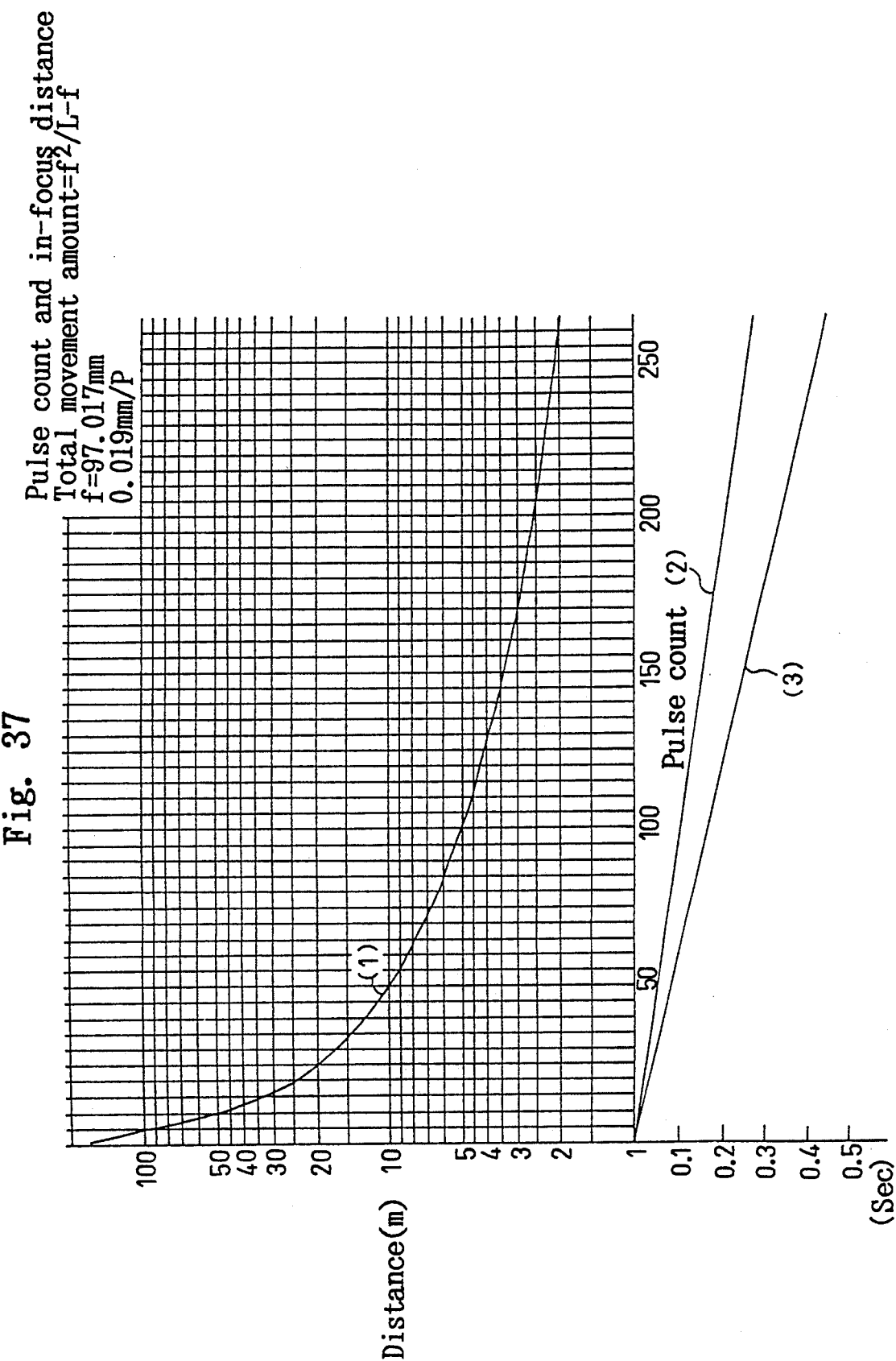
FIG. 37 shows the relation between a pulse count given to a pulse motor and an in-focus distance of an object, and the relation between the pulse count and a pulse transmitting time.

This will concretely be described referring to FIG. 37. In the figure, the curved line (1) represents the relation between the pulse count (the abscissa), which is given to the pulse motor 22 when the lens is moved from infinity to the near point, and the in-focus distance (the ordinate) of an object. The lens movement amount is defined as $f^2/L - f$, wherein f represents the focal length of the lens and L represents the distance from the lens to the object.

When the movement amount represented by pulses transmitted through the reduction gear from the pulse motor is 0.019 mm per pulse, for the movement from infinity to 2 m, from the above equation, $$(f^2/L - f)/0.019 = 260 \text{ pulses}$$

are required, wherein f=97.017 mm. Here, the time required for transmitting 260 pulses is determined by the specifications of the motor used. As examples, in the case shown by the line (2) in FIG. 37, the time is 260/1000=0.26 sec at the motor of 1000 PPS; in the case shown by the line (3), it is 260/600=0.43 at the motor of 600 PPS. As a matter of course, when a trapezoid speed control method as shown in FIG. 16 is adopted, the above-mentioned 1000 PPS and 600 PPS may be considered as the average pulse rate. As described above, in the previously determined movement range (between the infinity point and the near point) of the lens, the driving time of the lens can freely be set according to the specifications and reduction ratio of the motor used. In this embodiment, it is set to a time shorter than 0.6 seconds.

It should be noted that although the motor is described as the pulse motor in this embodiment, the same effect can be obtained when the DC motor is used.

By the way, the determination on whether or not the lens should be driven at the above-described steps #580 and #585 is based on the in-focus range GZP. When the in-focus range GZP is too large, the lens is not moved unless a considerably large image shift is caused, which is, as described above, inconvenient for elderly people since a satisfactory in-focus condition cannot be obtained.

Figure 38:
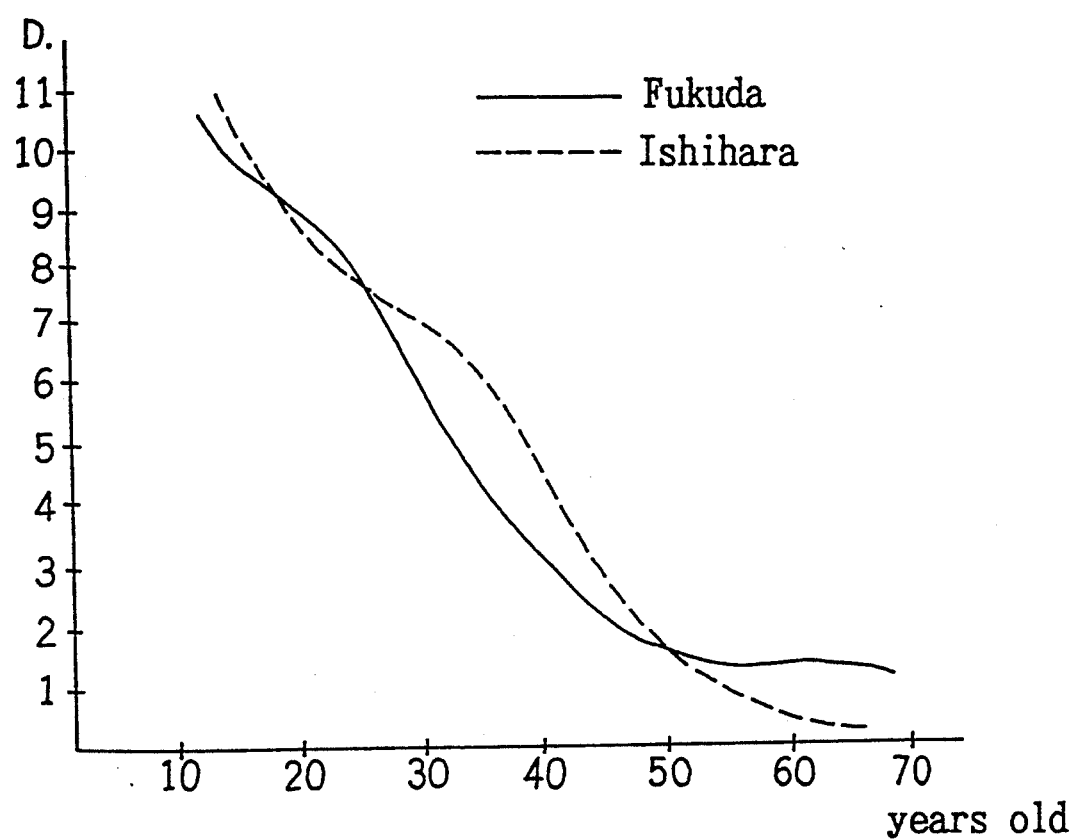
FIG. 38 shows curves representing a focal point adjusting ability of human eye according to ages.

That is, in trying to view objects clearly, the human eye changes the radius of curvature of its crystalline lens in order to obtain the in-focus condition in a limited range (different according to the visual acuity and age). The accommodation ability of the human eye is largely influenced by age as shown in FIG. 38 (corresponding to FIG. 104 appearing on page 56 of "Science of the eye" by Masao Nita, second edition of the revision, published by Bunkoudou Ltd.). Although it is more than 10 diopters at the age of approximately 10, gradually decreased by the aging, it becomes approximately 1 diopter at the age of 60. In the figure, the solid line represents the data collected by Mr. Fukuda; the dotted line, the data collected by Mr. Ishihara.

Thereupon, in this embodiment, the in-focus range is set to be equal to or less than 1 diopter. Here, 1 diopter, which is the function of the focal length of the eyepiece, is represented by $f^2/1000$ mm. For example, when the focal length f of the eyepiece is f=11.7 mm, 1 diopter is $$(11.7)^2/1000 = 0.14 \text{ mm.}$$

When the lens movement amount by the pulse motor 22 and the reduction gear unit 23 is 0.019 mm per pulse, 7 pulses are required for the lens movement corresponding to 1 diopter. The seven pulses are the in-focus zone pulse count GZP, that is, the in-focus range.

Zero diopter is excluded since it is meaningless as the in-focus range.

In this embodiment, the in-focus range is changed according to the distance from the object as described above (see FIG. 36). In that case, the maximum in-focus range GZMAX is set to be equal to or less than 1 diopter.

The value of the in-focus range, which does not always have to be the above value, is previously stored in the $E^2PROM$, and is transmitted to the RAM when it is used.

Next, an embodiment shown in FIGS. 39 to 45 will be described. In the figures, the same portions as those of the embodiments shown in FIGS. 1 to 38 are represented by the same numerals. In this embodiment, a power focusing function is provided on the binocular 1.

Figure 39:
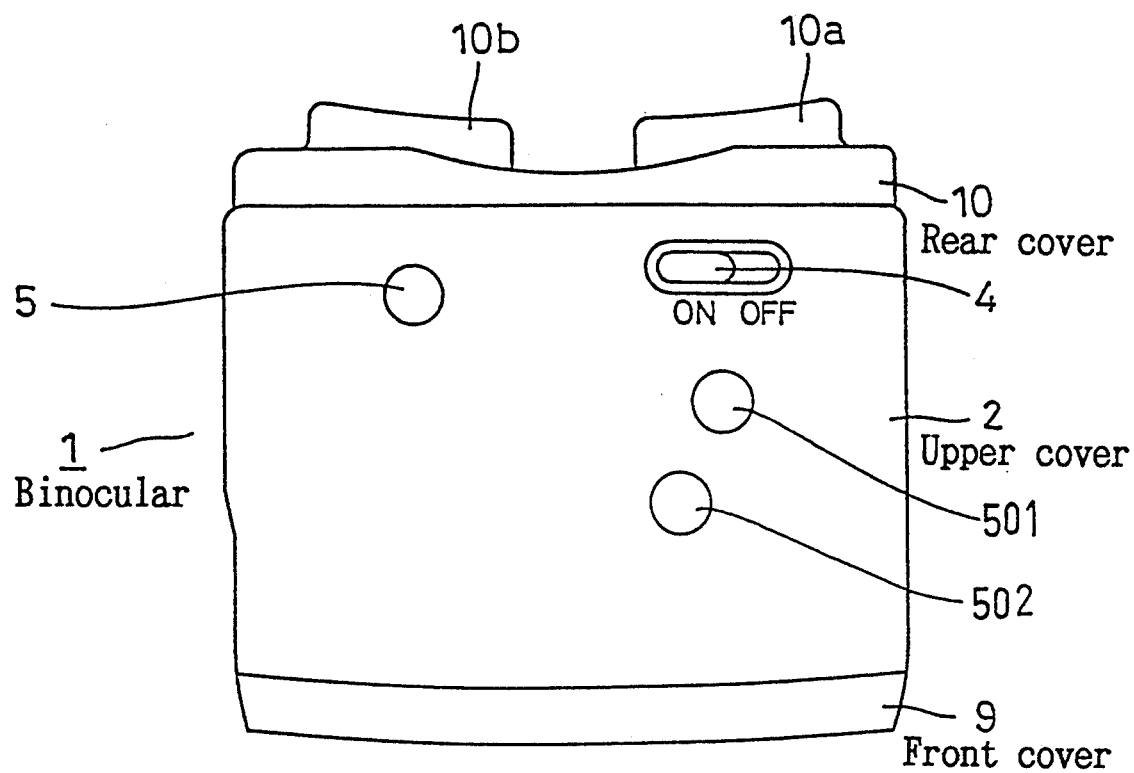
FIG. 39 is a plan view of a binocular which is an another embodiment of the present invention.

As shown in FIG. 39, on the upper cover 2 of the housing, push button operation members 501 and 502 for manual power focusing are provided. The operation member 501 is operated when the lens is moved toward the near side in the manual power focusing operation mode, and the operation member 502 is operated when the lens is moved toward the infinity side. The operation members 501 and 502 are usually arranged at positions where they are operated by the forefinger and the middle finger of the left hand of the user, respectively, so that they are easily operated while the body of the binocular 1 is being held.

Figure 40:
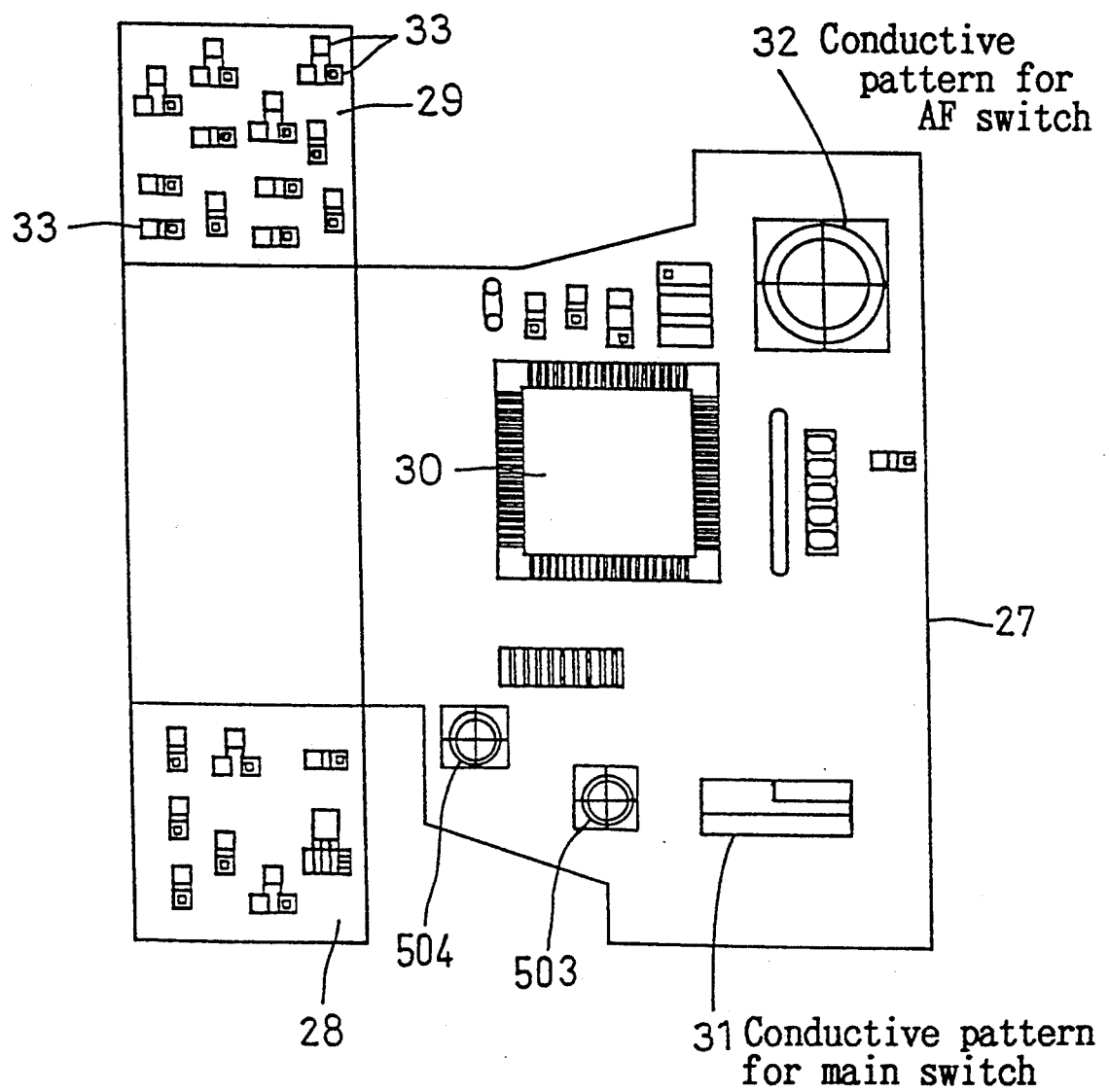
FIG. 40 is a plan view showing a circuit substrate employed for the embodiment of the present invention.

Corresponding to the operation members 501 and 502, a pattern 503 for a near side direction power focusing switch and a pattern 504 for an infinity side direction power focusing switch are provided on the circuit substrate 27 as shown in FIG. 40.

Figure 41:
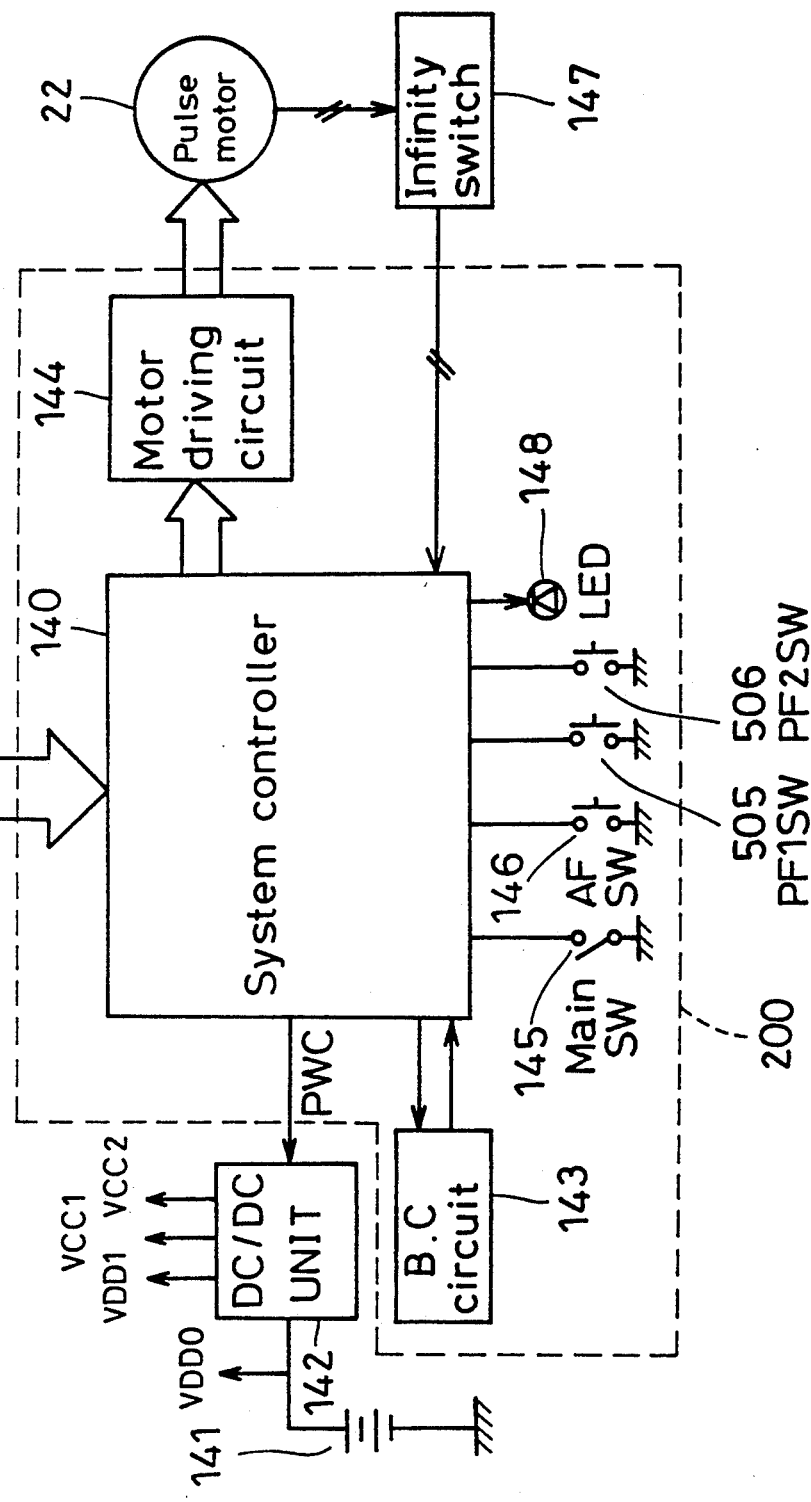
FIG. 41 is circuit diagram of a circuit which is the embodiment of FIG. 39 of the present invention.

Moreover, to the system controller 140, a push-type near side direction power focusing switch 505 and an infinity side direction power focusing switch 506 are connected as shown in FIG. 41.

As for the excitation method of the motor, in this embodiment, the above-described one-/two-phase excitation method is employed in a power focusing operation as described later, and further, the motor is driven at a constant speed of 2000 PPS. The speed of 200 PPS in the one-/two-phase excitation method, which corresponds to a speed of 100 PPS in the two-phase excitation method, is a relatively low speed. This is because a power focusing operation becomes difficult if the speed (therefore, the moving speed of the lens) is high since the user adjusts the focus in the power focusing. Although it is possible to drive the motor at a low speed of 100 PPS in the two-phase excitation method in the power focusing operation, the vibration of the motor and the electric power consumption increase at a speed of 100 PPS in the two-phase excitation method. Reversely speaking, if the motor is driven at the same speed in the one-/two-phase excitation method, the vibration and the electric power consumption are restrained small.

Next, a control operation by the microcomputer 30 constituting the system controller 140 of FIG. 41 will be described referring to the flow charts shown in FIGS. 42 to 44A and 44B.

Figure 42:
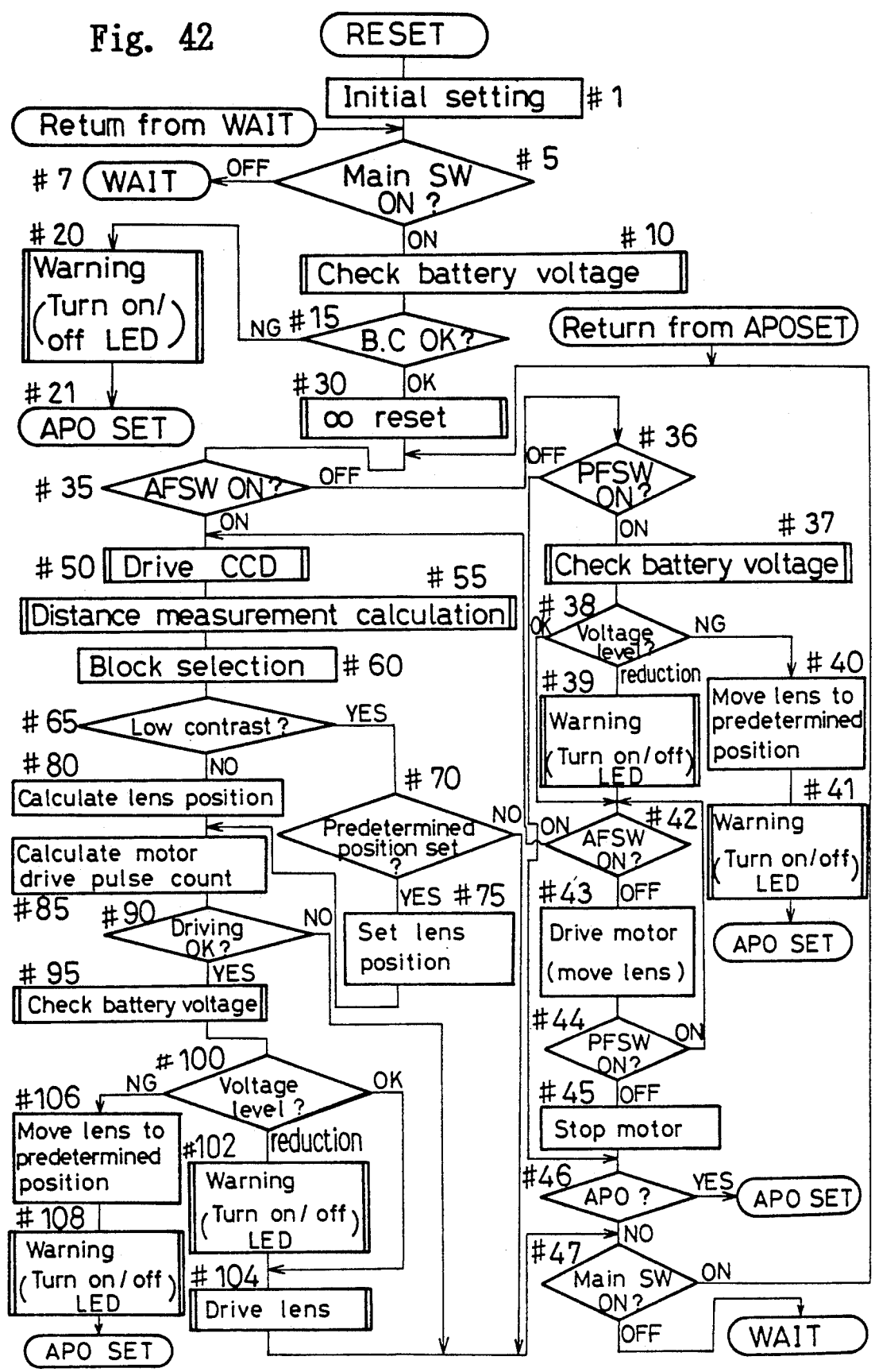
FIG. 42 is a schematic flow chart showing the control of a microcomputer constituting a system controller in the embodiment of FIG. 39.

FIG. 42 shows a schematic flow of a general operation of this embodiment. Firstly, when a battery 141 is attached to the binocular 1, a reset operation is performed in each part of the microcomputer 30 to conduct an initial setting (step #1). Whether or not a main switch 145 is on is important after the initial setting. At step #5, whether or not the main switch 145 is ON is determined. When it is OFF, the process proceeds to step #7 and enters a wait condition. That is, the microcomputer 30 does not operate although electric power is provided. When the main switch 145 is detected to be ON at step #5, the process proceeds to the next step #10 where the voltage of the battery is checked. At step #15, a result of the battery check, that is, whether or not the battery voltage is sufficient is determined. When it is not sufficient, the process proceeds to step #20, where a warning is displayed. The warning is displayed by a light emitting diode (LED) 148. Thereafter, the process enters standby 2 (APOSET to be described later) (step #21). When the battery voltage is determined to be sufficient at step #15, the process proceeds to the next step #30 where a lens is moved to an infinity position.

After the lens is moved to the infinity position at step #30, whether an AF switch 146 is ON or OFF is detected at step #35. When it is OFF, the process proceeds to step #36, where whether or not the power focusing switch is ON is detected. When the power focusing switch is ON, after the battery is checked (step #37), the voltage level of the battery is determined at step #38. When the battery voltage is equal to or lower than a predetermined reference value, after the lens is moved to the predetermined position at step #40, the warning is displayed (step #41), and the process enters the standby 2. When the battery voltage exceeds the reference value although having been decreased, after the warning is displayed at step #39, the process proceeds to step #42. When the voltage is sufficient, the process directly proceeds to step #42. Although it is not shown in this flow chart, the above-described battery check is performed only when the power focusing switch is turned from OFF to ON. At step #42, whether or not the AF switch 146 is ON is determined again. When the AF switch 146 is OFF, the motor is driven (that is, the lens is moved) as a power focusing operation at step #43, and at the next step #44, the condition of the power focusing switch is checked again. When the power focusing switch is ON, the process returns to step #43, where the motor driving is continued. When the power focusing switch is OFF, the motor is stopped (step #45). After the motor is stopped, or when the power focusing switch is OFF at the above-described step #36, the process proceeds to step #46, where whether or not the auto power off function has been set is determined. When the auto power off function has been set, the process enters the standby 2 (APOSET). On the contrary, when the auto power off function has not been set, the process proceeds to the next step #47, where whether or not the main switch 145 is ON is determined. When the main switch 145 is OFF, the process enters the standby 1 (the wait condition). When it is ON, the process returns to the above-described step #35, where whether or not the AF switch 146 is ON is determined. When the AF switch 146 is ON at step #35 or step #42, a CCD is driven at step #50. Then, after a distance is calculated at step #55, a block for measuring a distance is selected at step #60.

Next, at step #65, a low contrast judgment is made. When the contrast is determined to be low, the process proceeds to step #70, where the lens should be set at a predetermined position or not is determined. When the lens does not have to be set at the predetermined position, the process proceeds to step #47. When it should be set, it is set at the predetermined position at step #75, and the process proceeds to step #85.

When the contrast is determined not to be low at step #65, the process proceeds to step #80, where a move-out position of the lens is calculated, and then, proceeds to step #85. At step #85, a pulse count for driving the motor to move the lens to the move-out position is calculated. Since the motor is not required to be driven when the move-out position of the lens is in the in-focus range, whether or not the motor should be driven is determined at step #90. When the motor drive is determined to be unnecessary, the process returns to step #47. When it is determined to be necessary, the process proceeds to step #95, where the battery is checked, and further to step #100, where whether or not the battery voltage for driving the motor exceeds the limit is determined based on the battery voltage detected at step #95. When it exceeds the limit, the process proceeds to step #106, where the lens is moved to the predetermined position, and then, proceeds to step #108, where a warning is displayed. When the battery voltage has considerably been decreased although the motor driving limit is not exceeded at the above-described step #100, after the warning is displayed at step #102, the process proceeds to step #104. When the voltage is sufficient, the process directly proceeds to step #104, and after driving the motor at step #104, the process returns to step #47.

This flow chart is premised on the case where, for driving the stepping motor, only the two-phase excitation driving is used in the AF operation and the one-/two-phase excitation driving is used in the power focusing operation.

Next, the operation shown in FIG. 42 will be described in detail referring to the flow charts shown in FIGS. 43 to 45.

Figure 43:
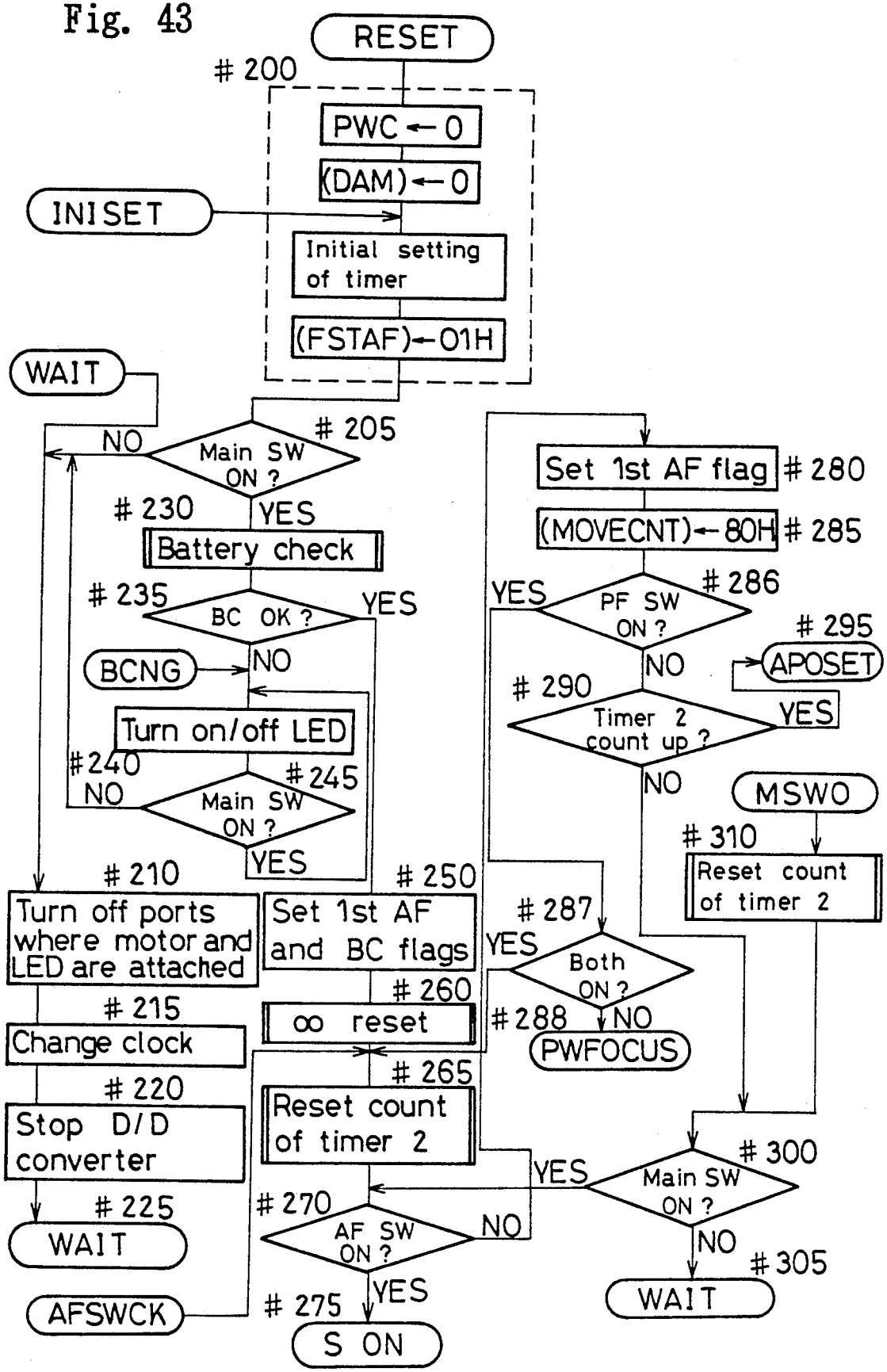
FIG. 43 is a flow chart of the operation shown in FIG. 42.

When a battery is fitted into the battery holder of the binocular 1, a reset routine shown in FIG. 43 is executed. Then, an initial setting is performed at step #200.

After the initial setting is completed, whether or not the main switch 145 is ON is determined. When the main switch 145 is OFF, the process proceeds to the steps from #210 to #220 where the process enters a WAIT condition. First, at step #210, output ports, to which the stepping motor 22 and the LED 148 are connected, of the the microcomputer 30 is turned off. Next, at step #215, a clock frequency of the microcomputer 30 is changed. Then, at step #220, the DC/DC converter unit 142 is stopped, so that the process enters the WAIT condition (step #225).

When the main switch 145 is ON at the step #205, the process proceeds to step #230, where the battery is checked. At the next step #235, the result of the battery check is determined. When the battery voltage is not sufficient, a warning is displayed by alternately turning on and off the LED 148 (step #240). The warning by the LED 148 is continuously displayed when the main switch 145 is ON as comprehended from step #245. When the main switch 145 is turned off, the process returns from step #245 to step #210, where the process enters the WAIT condition.

When the battery is determined to be sufficient at step #235, the process proceeds to step #250, where the first AF flag and a battery check flag are set. After the setting is completed, an infinity ($\infty$) reset is performed at step #260. After the infinity reset is completed, a count of a timer 2 is reset (step #265). That is, the time for entering an APO (auto power off) SET is set.

Next, at step #270, whether or not the AF 146 switch is ON is determined. When it is ON, the process proceeds to a routine SON shown in FIG. 24. When it is OFF, the process proceeds to step #280, where the first AF flag is set. Thereafter, a move count MOVECNT is set to be 8$\phi$H so that the motor starts for the first try (step #285). Thereafter, whether or not the power focusing switch is ON is determined at step #286. When it is ON, the process proceeds to step #287, where whether or not both of the near side direction power focusing switch 505 and the infinity side direction power focusing switch 506 are on is determined. When both of the two switches 505 and 506 are ON, since it is not clear to which of the near side direction and the infinity side direction the user intends to move the lens, the process returns to step #265, without the power focusing operation being performed. The process returns to step #265 to re-execute a part of the operation sequence because it is considered that the user has an intention to perform the power focusing operation in this case.

When only one of the two switches 505 and 506 is ON, the process proceeds to step #288, and enters a routine of power focusing. The detail of the routine of power focusing will be described later referring to FIGS. 44A and 44B. When the power focusing switch is OFF at the above-mentioned step #286, whether or not the timer 2 has proceeded to a predetermined count value is determined at step #290. When it has proceeded to the predetermined count value, the process proceeds to a routine APOSET (step #295). After the routine APOSET is completed, the process returns to step #265.

When the timer 2 is determined not to have proceeded to a predetermined count value at step #290, the process proceeds to the next step #300, where whether or not the main switch 145 is ON is determined. When it is OFF, the process enters the wait condition (step #305). When it is ON, the process returns to step #270, and the operations of the succeeding steps are performed.

Figure 44B:
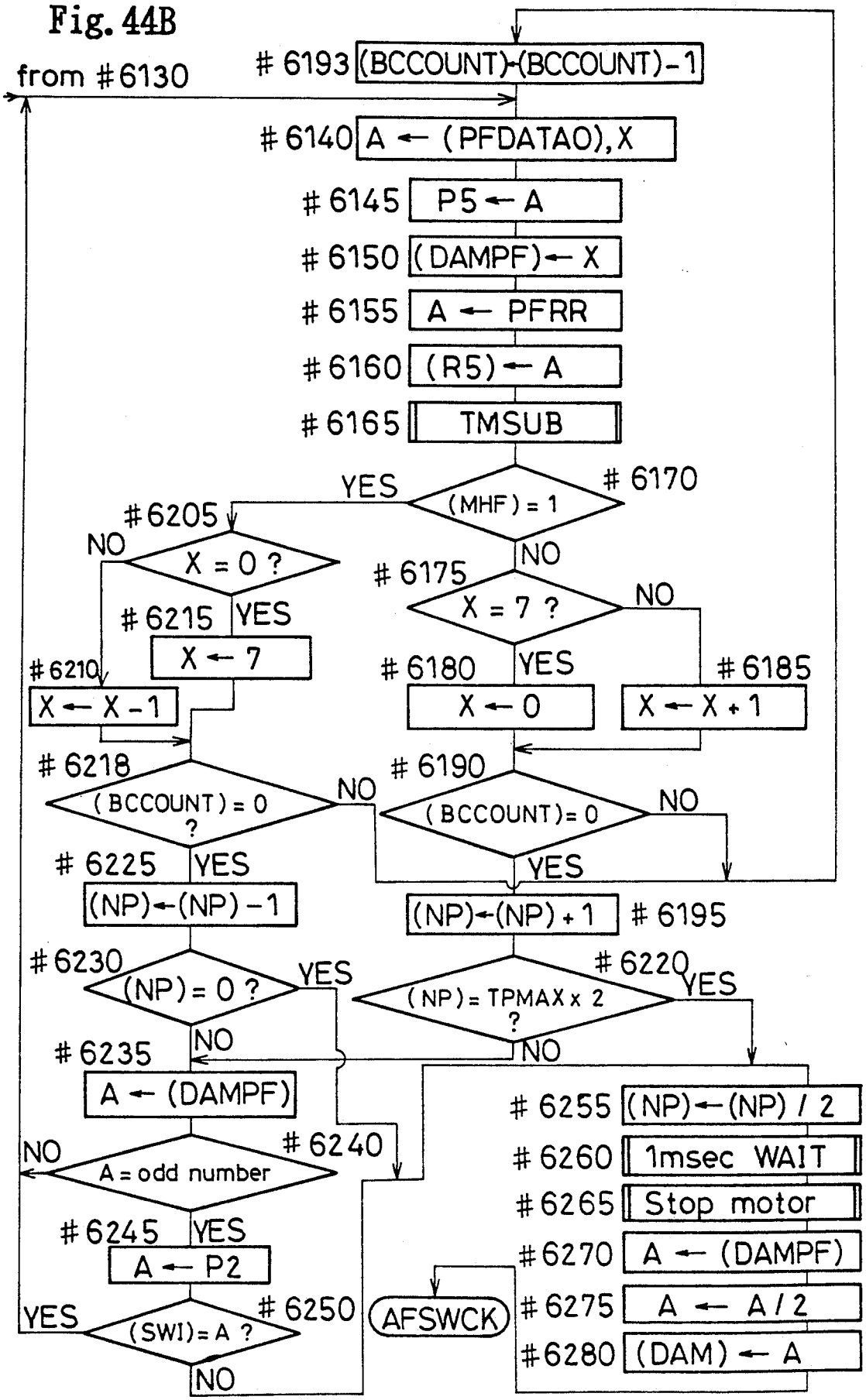

Next, the routine of power focusing shown in FIGS. 44A and 44B will be described. Firstly at step #6000, the address of the motor driving data of the previous operation is transmitted from the DAM to the register A. Subsequently, after doubled at step #6005, the data are transmitted to an address DAMPF for storing the address of power focusing driving data (step #6010). The operations of the above-mentioned steps #6000 to #6010 are performed in order to cope with that the driving data of the one-/two-phase excitation shown in (b) of FIG. 45 are made by doubling the data number of the driving data of the two-phase excitation shown in (a) of FIG. 45 and inserting the data for driving the one-phase excitation between the data for driving the two-phase excitation. That is, when the motor 22 stopped by the two-phase excitation of the previous operation is driven by the same driving data as those of the previous operation, the address of the driving data of the one-/two-phase excitation is obtained by doubling the address of the driving data of the two-phase excitation data.

After doubling the address of the driving data of the previous operation and storing them in the address DAMPF as described above, the microcomputer 30 transmits the data on the condition of the switches from a switch input port P2 to the register A at step #6015. In the switch input port P2, the data on the main switch 145, the AF switch 146, the near side direction power focusing switch 505 and the infinity side direction power focusing switch 506 are stored. Further, the switch data transmitted to the register A are stored in a memory SW1 (step #6020). Thereafter, 0 is inputted to the register X at step #6025, and at the next step #6030, whether or not the infinity side direction power focusing switch 506 is ON is determined. When it is ON, 1 is inputted to the register X (step #6035), and when it is OFF, the content of the register X is maintained intact (that is, 0). The value of the register X represents the direction in the power focusing operation: when X=1, toward the infinity side; and when X=0, toward the near side. When the infinity side direction power focusing switch 506 is turned on, 1 is inputted to the register X as described above, and thereafter, whether or not NP=0 is determined at step #6040. NP represents the present position of the lens. When NP=0, the lens cannot be moved further toward the infinity since it is in its infinity focusing position. Therefore, the process enters the routine MSWO and proceeds to step #310 shown in FIG. 43.

On the other hand, when the infinity side direction power focusing switch 506 is not ON (that is, when the near side direction power focusing switch 505 is ON) at step #6030, whether or not NP is TPMAX is determined at step #6045. Since TPMAX represents the nearest, when NP=TPMAX, the lens cannot be moved further toward the near side. Therefore, the process enters the routine MSWO and proceeds to step #310 shown in FIG. 43. When the position of the lens is not infinity and not the nearest position respectively at the above-mentioned steps #6040 and #6045, the process proceeds to step #6050, where NP is set to a value twice the above-mentioned NP representing the present position. This is because in the one-/two-phase excitation used in the power focusing operation where the pulse count twice that of the two-phase excitation used in the AF operation is required, the pulse count has to be doubled also with respect to the present position.

Next, after the driving direction data is transmitted to the register A at step #6055, whether or not MHF representing the rotation direction of the previous operation is the same as the present direction A is determined at step #6060. When it is the same, after setting the backlash correction counter BCCOUNT to 1 at step #6090, the process proceeds to step #6095. When the previous direction is the opposite, the present direction stored in the register A is made the rotation direction flag MHF at step #6065; the backlash correction value BCH is transmitted to the register A (step #6070); the value is doubled (step #6075); and after 1 is added, the value is set in the backlash counter BCCOUNT (steps #6080 and #6085). BCH is doubled at the above-mentioned step #6075 so that the BCH, which is for the two-phase excitation, is converted into the BCH for the one-/two-phase excitation. Moreover, the backlash counter BCCOUNT 1 is set to 1 at step #6090 and 1 is added to the register A at step #6080 so that the same data as those of the previous operation is outputted for the first pulse. By the first pulse, the motor is not driven.

At step #6095 succeeding steps #6085 and #6090, the address of the one-/two-phase excitation driving data of the above-described address DAMPF are transmitted to the register X. Next, at step #6100, power focusing driving data PFDATAO,X are inputted to the register A. In the one-/two-phase excitation, there are eight kinds of power focusing driving data as shown in (b) of FIG. 45. Therefore, X is 0 to 7. The lens driving data of the register A are transmitted to the output port P5 for driving the motor at step #6105. Thereafter, whether or not the battery check flag has been set is determined at step #6110. When it has been set, the process waits for 1 msec at step #6115. The object of the waiting is the same as that at step #755 in FIG. 25.

At step #6120, the battery check flag is reset. This is in order that when the power focusing switch 505 or 506 continues to be ON, that is, when the process passes through the routine of power focusing many times, the battery check is performed not every time but only when the power focusing switch 505 or 506 is turned from off to on.

At step #6125, the battery check is performed. The battery check is shown in the above-described FIG. 27. After the battery check, whether or not the carry flag CY is 0 is determined at step #6130. When it is not 0, the battery voltage is found to be lower than the reference value as a result of the battery check. Therefore, after a routine of battery reset for moving the lens to the predetermined value is executed (step #6135), the process enters the routine MPCAL and proceeds to step #550 in FIG. 24. When the carry flag CY is 1, since the battery voltage is sufficient, the process proceeds to step #6140, where the power focusing driving data are loaded on the register A. Thereafter, the power focusing driving data are supplied to the output port P5 at step #6145, and data X representing that the driving data is the Xth data are stored in the data address memory at step #6150. Subsequently, a pulse rate PFPR in the one-/two-phase excitation is inputted to the register A at step #6155. The pulse rate PFPR is, specifically, 200 PPS as described above, at which the user can adjust the focus. The pulse rate is inputted to the memory R5 (step #6160), and the time corresponding to the pulse rate is set at step #6165.

Next, the process proceeds to step #6170, where the rotation direction is confirmed. Specifically, whether or not the flag MHF, showing the rotation direction, is 1 is determined. When MHF=1 (that is, toward the infinity side), the process proceeds to step #6205, where whether X=0 or not is determined. As is understood from (b) of FIG. 45, when MHF=1, since the direction is 7→6→5→...→0→7, X is set to 7 when X=0 (step #6215) and is decreased by 1 when X≠0 (step #6210). When MHF≠1 (that is, toward the near side) at the above-mentioned step #6170, the process proceeds to step #6175, where whether X=7 or not is determined. At this time (that is, when MHF=0), since the direction is 0→1→2→...→7→0, X is set to 0 when X=7 (step #6180) and is increased by 1 when X≠7 (step #6185). After the above-described steps #6210 and #6215, the process proceeds to step #6218, and after the steps #6180 and #6185, to step #6190, in both of which case, whether or not the backlash correction counter BCCOUNT is 0 is determined.

When the backlash correction counter BCCOUNT is not 0, the BCCOUNT is decreased by 1 at step #6193, and the routines from step #6140 are re-executed. Motor driving pulses are outputted every time until the BCCOUNT becomes 0. However, since the pulses only perform the backlash correction, the present position of the lens is not changed although the motor is driven.

When the backlash correction count BCCOUNT becomes 0 at the above-described steps #6190 and #6218, since the position of the lens is changed, the process proceeds respectively to steps #6195 and #6225, where the lens position NP is increased (step #6195) or decreased (step #6225). Thereafter, the process proceeds respectively to steps #6220 and #6230, where whether or not NP becomes TPMAX×2 (the nearest side) (in the case of step #6220) and whether or not NP becomes 0 (infinity side) in the case of step #6230) is determined. When NP becomes TPMAX×2, or 0, the process proceeds to the flow of stop motor shown by steps #6255 to #6280. When the determination result at the above-described steps #6220 and #6230 is NO, however, the process proceeds to step #6235, where the content of the address for the power focusing is transmitted to the register A, and at the next step #6240, whether the content is an even number or not is determined. This is for previously correcting the following: since the step angle of the motor adopting the one-/two-phase excitation is half as large as that of the motor adopting the two-phase excitation, if the address ends with an odd number, the position is shifted by half the step angle when process enters the AF operation later (for the AF operation, the two-phase excitation is adopted as described above). When the address is an odd number, the process again returns to step #6140 and executes the flow thereafter in order that the address resultingly ends with an even number. After the data of the input port P2 for the switch are transmitted to the register A at step #6245, whether or not the input condition of a switch has been changed is determined at step #6250. Specifically, the switch condition data inputted into the memory SW1 at step #6020 are compared with the switch condition data inputted into the register A at step #6245.

When the content of the memory SW1 coincides with that of the register A, since the condition of the switch has not been changed, the process returns to step #6140. When the switch condition has been changed, the process proceeds to the motor stop routine shown by steps #6255 to #6280. The motor stop routine is executed when the input condition of a switch is changed or when the lens is moved to the nearest position or infinity. Firstly, NP is set to ½ at step #6255. This is for adjusting NP to the two-phase excitation method before the process enters the main routine. Then, after the process waits for 1 msec at step #6260, the motor is stopped at step #6265. At the succeeding steps #6270 to #6280, the address of the data is set to ½ and is stored in the DAM before the process returns to the main routine. After this operation, the process enters a routine AFSWCK and returns to step #265 shown in FIG. 21.

In the above-described flow chart, when the operation member 5 for AF and the operation members 501 and 502 for power focusing are simultaneously operated and thereby the AF switch 146 and either of the power focusing switches 505 and 506 are turned on, since the process enters not the routine where the power focusing operation is performed but the routine SON after the determination at step #270 shown in FIG. 43, the power focusing operation is not performed, and the AF operation is given priority.

When either of the operation members 501 and 502 for power focusing is operated in the condition where the operation member 5 for AF is operated first and consequently the AF switch 146 is on, the AF operation is given priority similarly to the above-described case.

However, when the operation member 5 for AF is operated to turn on the AF switch 146 in the condition where the operation member 501 or 502 are operated first and consequently the power focusing switch 505 or 506 is ON, the switch input condition is determined to have been charged at step #6250 in FIG. 44. After the motor is stopped at steps #6255 to #6265, the process returns to step #265 shown in FIG. 43 after passing through steps #6270 to #6280. Then, the process enters the routine SON by determining that the AF switch is On at the next step #270, so that the AF operation is given priority. Thereby, the in-focus condition is quickly obtained by the AF operation.

Obviously, many modifications and variations of the present invention are possible in light of the above teachings. It is therefore to be understood that within the scope of the appended claims, the invention may be practiced other than as specifically described.

What is claimed is:

1. A telescope comprising:
   an optical system constituting the telescope;
   calculation means for calculating an amount of deviation of the optical system from an in-focus position where an object image can be observed under the in-focus condition;
   discriminating means for discriminating whether or not the deviation amount is within a predetermined range obtained from a focus accommodation range of a human eye; and
   optical system driving means for driving the optical system to the in-focus position when the deviation amount exceeds the range as a result of the discrimination by the discriminating means.

2. A telescope as claimed in claim 1, wherein the optical system driving means drives the optical system in order to remove said deviation in a shorter time than a time required for accommodating a human eye until the object image is observed under an in-focus condition.

3. A telescope as claimed in claim 1, further comprising: focus condition detecting means having an objective lens, for receiving a light coming from the object, and defocus amount calculating means for calculating a defocus amount of the objective lens.

4. A telescope as claimed in claim 3, wherein said discriminating means discriminates whether the deviation amount is within a predetermined range by deciding whether the defocus amount calculated by said defocus amount calculating means is within a prescribed range.

5. A telescope comprising:
   deviation amount calculating means for calculating a deviation amount of an optical system from a position where an object image is observed under an in-focus condition constituting the telescope;
   optical system driving means for driving the optical system; and
   driving amount calculating means for calculating a driving amount, of the driving means, to a position where the in-focus condition is obtained based on a deviation amount calculated by the deviation amount calculating means;
   wherein said optical system driving means drives the optical system by a driving amount calculated by said optical system driving amount calculating means in a shorter time than a time required for accommodating a human eye until the object image is observed under the in-focus condition.

6. A telescope as claimed in claim 5, wherein the optical system driving means comprise a motor and a reduction gear for reducing a rotatory power of the motor and transmitting it to the optical system.

7. A telescope as claimed in claim 6, wherein said motor is a stepping motor.

8. A telescope as claimed in claim 5, wherein the optical system driving means drive the optical system in a range between its infinity focusing position and nearest focusing position.

9. A telescope as claimed in claim 5, wherein a driving time when the optical system operates in a range between its infinity focusing position and nearest focusing position is approximately 0.6 seconds.

10. A telescope comprising:
a viewing optical system constituting the telescope;
focus condition detecting means having an objective lens for receiving a light coming from an object, and generating an electrical signal corresponding to an image shift amount of the object based on the light received through the objective lens;
optical system driving amount calculating means for calculating a driving amount, of the viewing optical system, to an in-focus position where an object image formed by said viewing optical system can be observed under the in-focus condition based on an output by the focus condition detecting means; and
optical system driving means comprising a stepping motor for driving the viewing optical system based on an output by the optical system driving amount calculating means.

11. A telescope as claimed in claim 10, wherein the optical system driving means drive either of an object lens and eyepiece of the telescope.

12. A telescope as claimed in claim 10, wherein the optical system driving means are capable of changing a driving mode of said stepping motor by changing an excitation method.

13. A telescope as claimed in claim 12, wherein the optical system driving means change the excitation method of the motor when the optical system has moved to the vicinity of an infocus position.

14. A telescope as claimed in claim 12, wherein the optical system driving means change the excitation method of the motor when a predetermined time has passed after the motor is started.

15. A telescope as claimed in claim 10, further comprising position detecting means for detecting that the optical system is situated at an end of infinity side.

16. A telescope as claimed in claim 10, further comprising driving direction discriminating means for discriminating a driving direction of the optical system.

17. A telescope as claimed in claim 16, wherein a blacklash correction of a mechanism which drives the optical system is made when the driving direction is reversed as a result of a driving direction discrimination.

18. A telescope as claimed in claim 16, wherein a driving direction discrimination is repetitively performed by the driving direction discrimination means.
optical system driving means comprising a stepping motor for driving the viewing optical system based on an output by the optical system driving amount calculating means.

19. A telescope for observing objects at a near distance and a far distance, comprising:
focus condition detecting means for detecting a focus condition of an optical system constituting the telescope;
calculating means for calculating a direction and an amount to be moved of the optical system to an in-focus position where an object image is observed under the in-focus condition according to a result of a focus condition detection;
optical system driving means for driving the optical system with an output by the calculating means; and
inhibiting means for inhibiting a driving of the optical system when the calculated direction to be moved is toward a near distance and the calculated amount exceeds a predetermined amount.

20. A telescope as claimed in claim 19, further comprising optical system position detecting means, and wherein an operation of the inhibiting means is inhibited when the optical system is situated on a near distance side of a predetermined position.

21. A telescope as claimed in claim 19, wherein calculation is repeated plural times, and consequently, an operation of the inhibiting means is inhibited when calculated amount exceeding a predetermined amount is detected predetermined times or more.

22. A telescope as claimed in claim 19, further comprising operating means for activating the optical system, and wherein the focus condition detecting means repeats its detecting operation while the operating means is being operated.

23. A telescope as claimed in claim 22, wherein an operation of the inhibiting means is inhibited in a first-time focus condition detecting operation.

24. A telescope as claimed in claim 22, wherein the calculating means judges that the in-focus condition is obtained when the amount to be moved is smaller than a predetermined amount, and said predetermined amount in a first-time focus condition detecting operation is smaller than a predetermined amount in a second-time focus condition detecting operation.

25. A telescope as claimed in claim 19, wherein said focus condition detecting means has an objective lens, for receiving a light coming from the object, and defocus calculating means for calculating a defocus amount and direction of the objective lens.

26. A telescope as claimed in claim 25, wherein said inhibiting means inhibits the driving of the optical system when a driving direction of the calculated defocus is toward a near distance side and the defocus amount exceeds a prescribed amount.

27. A binocular system for permitting an observer to view objects from a near position to a far position with his or her eyes, comprising:
an optical system having movable lens components for providing an image of an object;
a focus detecting means for determining a focus condition of the object in the optical system;
driving means for driving the movable lens components in response to the focus detecting means to focus the optical system image for the observer; and
discriminating means discriminating whether the focus condition is within a predetermined in-focus range relative to a focusing ability of the observer's eyes and adjusting the driving of the driving means accordingly.

28. The binocular system of claim 27, wherein the driving means includes a stepper motor and means for changing an excitation mode of the stepper motor.

29. The binocular system of claim 27, further including means for varying the drive of the driving means to conserve power.

30. The binocular system of claim 27, further including a battery source of power for the driving means and means for monitoring the battery source to drive the movable lens components to a predetermined position at a predetermined battery power.

31. The binocular system of claim 27, further including means to prevent an erroneous focusing on a near position when the object is at a far position.

* * * * *